(12) United States Patent
Holcombe

(10) Patent No.: US 12,062,910 B2
(45) Date of Patent: Aug. 13, 2024

(54) TWO-WAY ELECTRICAL POWER DISTRIBUTION NETWORK

(71) Applicant: Elexsys IP Pty Ltd, Queensland (AU)

(72) Inventor: Bevan Holcombe, Queensland (AU)

(73) Assignee: Elexsis Pty Ltd, Queensland (AU)

( * ) Notice: Subject to any disclaimer, the term of this patent is extended or adjusted under 35 U.S.C. 154(b) by 101 days.

(21) Appl. No.: 17/641,425

(22) PCT Filed: Sep. 9, 2020

(86) PCT No.: PCT/AU2020/050954
§ 371 (c)(1),
(2) Date: Mar. 8, 2022

(87) PCT Pub. No.: WO2021/046600
PCT Pub. Date: Mar. 18, 2021

(65) Prior Publication Data
US 2023/0223751 A1    Jul. 13, 2023

(30) Foreign Application Priority Data

Sep. 9, 2019  (AU) ............................... 2019903323
Aug. 13, 2020  (AU) ............................... 2020902874

(51) Int. Cl.
*H02J 1/08* (2006.01)
*H02J 3/00* (2006.01)
(Continued)

(52) U.S. Cl.
CPC .............. *H02J 1/084* (2020.01); *H02J 3/007* (2020.01); *H02J 13/00002* (2020.01); *H02M 1/322* (2021.05)

(58) Field of Classification Search
None
See application file for complete search history.

(56) References Cited

U.S. PATENT DOCUMENTS

| 4,287,465 A | 9/1981 | Godard et al. |
| 4,811,184 A | 3/1989 | Koninsky et al. |

(Continued)

FOREIGN PATENT DOCUMENTS

| AU | 2011201247 A1 | 3/2011 |
| CN | 109167377 A | 1/2019 |

(Continued)

OTHER PUBLICATIONS

Aman, et al. "Optimal placement and sizing of a DG based on a new power stability index and line losses," Electrical Power and Energy Systems 43 (2012) 1296-1304. 9 pages.

(Continued)

*Primary Examiner* — Jared Fureman
*Assistant Examiner* — Joel Barnett
(74) *Attorney, Agent, or Firm* — Fish IP Law, LLP; Tomas A. Prieto

(57) ABSTRACT

The invention relates to a two-way electrical power distribution network including: a high electrical power distribution bus; medium voltage electrical power feed lines; low voltage distribution lines, wherein the low voltage distribution lines are connected to load(s) and/or source(s); and, medium voltage electrical power regulating apparatus including: a DC contactor having DC terminals; a transmission network connector connected to the medium voltage electrical power feed line including: live terminal(s) connected to live connection(s) and a neutral terminal connected to a neutral of the medium voltage electrical power feed line; switches connected to the DC contactor; and electronic controlling devices coupled to the switches and control the switches to independently regulate electrical power on each of the live connection and the neutral connection of the medium voltage electrical power feed line to thereby main- (Continued)

tain a voltage in the electrical power distribution bus during different load and source conditions.

20 Claims, 30 Drawing Sheets

(51) Int. Cl.
*H02J 13/00* (2006.01)
*H02M 1/32* (2007.01)

(56) References Cited

U.S. PATENT DOCUMENTS

| | | | |
|---|---|---|---|
| 6,040,778 | A | 3/2000 | Hopkins et al. |
| 6,198,611 | B1 | 3/2001 | Macbeth |
| 6,278,279 | B1 | 8/2001 | Daun-Lindberg et al. |
| 6,504,692 | B1 | 1/2003 | Macbeth et al. |
| 6,611,443 | B2 | 8/2003 | Gaudreau |
| 7,161,335 | B2 | 1/2007 | Wei et al. |
| 7,327,588 | B2 | 2/2008 | Ollila |
| 8,085,517 | B2 | 12/2011 | Weems, II et al. |
| 8,437,883 | B2 | 5/2013 | Powell et al. |
| 8,577,510 | B2 | 11/2013 | Powell et al. |
| 9,325,174 | B2 | 4/2016 | Tyler et al. |
| 9,354,641 | B2 | 5/2016 | Peskin et al. |
| 9,450,514 | B2 | 9/2016 | Purhonen et al. |
| 11,522,365 | B1 | 12/2022 | Cooper |
| 2007/0188137 | A1 | 8/2007 | Scheucher |
| 2008/0129307 | A1 | 6/2008 | Yu et al. |
| 2008/0298103 | A1 | 12/2008 | Bendre et al. |
| 2008/0315685 | A1 | 12/2008 | Mandalakas et al. |
| 2009/0180226 | A1 | 7/2009 | Rogoll et al. |
| 2009/0244877 | A1 | 10/2009 | Yeh et al. |
| 2011/0210611 | A1 | 9/2011 | Ledenev et al. |
| 2011/0227422 | A1 | 9/2011 | Kumar et al. |
| 2012/0072041 | A1 | 3/2012 | Miller et al. |
| 2012/0081934 | A1 | 4/2012 | Garrity et al. |
| 2012/0174961 | A1 | 7/2012 | Larson et al. |
| 2012/0256483 | A1 | 10/2012 | Nakashima et al. |
| 2013/0207466 | A1 | 8/2013 | Lee et al. |
| 2014/0070536 | A1* | 3/2014 | Wagoner .......... H02P 9/007 290/44 |
| 2014/0070617 | A1 | 3/2014 | Detmers et al. |
| 2014/0070756 | A1 | 3/2014 | Kearns et al. |
| 2015/0103574 | A1 | 4/2015 | Hintz |
| 2016/0226254 | A1 | 8/2016 | Cheng et al. |
| 2016/0373044 | A1 | 12/2016 | Chi |
| 2017/0201189 | A1 | 7/2017 | Li et al. |
| 2018/0026550 | A1 | 1/2018 | Dent |
| 2018/0041072 | A1 | 2/2018 | Clifton et al. |
| 2018/0329382 | A1 | 11/2018 | Somani et al. |
| 2018/0331543 | A1 | 11/2018 | Palombini et al. |
| 2019/0252877 | A1* | 8/2019 | Oresti .......... H02J 13/00034 |
| 2020/0021236 | A1 | 1/2020 | Pan et al. |
| 2020/0274459 | A1 | 8/2020 | Premm et al. |

FOREIGN PATENT DOCUMENTS

| | | |
|---|---|---|
| DE | 102005030907 B4 | 1/2012 |
| EP | 0428377 B1 | 1/1996 |
| EP | 2782204 A1 | 11/2012 |
| EP | 2457313 B1 | 3/2014 |
| EP | 2741388 B1 | 10/2015 |
| JP | 2018110466 A | 8/2019 |
| JP | 2019004673 A | 2/2021 |
| KR | 100703927 B1 | 4/2007 |
| KR | 101849054 B1 | 4/2018 |
| WO | 199944276 A1 | 9/1999 |
| WO | 2010132369 A1 | 11/2010 |
| WO | 2012100263 A2 | 7/2012 |
| WO | 2014078904 A1 | 5/2014 |
| WO | 2016007565 A1 | 1/2016 |
| WO | 2017161059 A1 | 9/2017 |
| WO | 2018179715 A1 | 10/2018 |
| WO | 2020163911 A1 | 8/2020 |
| WO | 2020163912 A1 | 8/2020 |
| WO | 2021046597 A1 | 3/2021 |
| WO | 2021046600 A1 | 3/2021 |

OTHER PUBLICATIONS

Doi, et al. "Mid-Point Siting of FACTS Devices in Transmission Lines," IEEE Transactions on Power Delivery, vol. 12, No. 4, Oct. 1997. 7 pages.
International Preliminary Report on Patentability dated Mar. 9, 2022, from related PCT application No. PCT/AU2020/050954, filed on Sep. 9, 2020. 7 pages.
Aman et al., "Optimal Placement and Sizing of a DG Based on a New Power Stability Index and Line Losses," Electrical Power and Energy Systems, May 26, 2012, pp. 1296-1304, vol. 43.
Li et al., "A Review of the Single Phase Photovoltaic Module Integrated Converter Topologies With Three Different DC Link Configurations," IEEE Transactions on Power Electronics, May 2008, pp. 1320-1333, vol. 23, No. 3.
Ooi et al., "Mid-Point Siting of FACTS Devices in Transmission Lines," IEEE Transactions on Power Delivery, Oct. 1997, pp. 1717-1722, vol. 12, No. 4.
Wolfs et al., "Improvements to LV Distribution System PV Penetration Limits using a dSTATCOM with Reduced DC Bus Capacitance," IEEE Power and Energy Society General Meeting (PES), 2013.
International Preliminary Report on Patentability for International Application No. PCT/AU2020/050116, dated Aug. 26, 2021, 6 pages.
International Preliminary Report on Patentability for International Application No. PCT/AU2020/050117, dated Aug. 26, 2021, 6 pages.
International Preliminary Report on Patentability dated Mar. 9, 2022, for related PCT application No. PCT/AU2020/050951, filed on Sep. 9, 2020. 7 pages.

* cited by examiner

TWO-WAY ELECTRICAL POWER DISTRIBUTION NETWORK

BACKGROUND OF THE INVENTION

The present invention relates to an electrical power distribution network, and in one particular example, an electrical power distribution network with an electrical power regulating apparatus for providing a two-way electrical transmission or distribution network.

DESCRIPTION OF THE PRIOR ART

In a power transmission or distribution system, a power regulating device is implemented to regulate the supply of power over a wide range of load conditions. Voltage regulation is challenging, hence the distribution feeders are carefully designed to supply voltage within a permitted envelope while considering variations in customer loads. As customer-owned renewable power generation continues to grow its popularity, rooftop solar power generation and commercial-scaled solar farms are predicted to become a major contributor to the total electricity supply in the years to come. This makes voltage regulation even more challenging as feed-in power needs to be taken into consideration in addition to the existing issues with customer load variations.

Network operators have used a combination of transformer tap changers (on-load and off-load), voltage regulators and conductor sizing to control voltage excursions and maintain statutory limits. However, these designs are limited for managing voltage in a one-way network. Furthermore, the systems are often not configured to be adjusted dynamically. For example, tap transformers typically need to be disconnected to be adjusted, meaning such mechanisms cannot respond to voltage changes in real time and instead need to be configured to accommodate any load/feed-in variations that occur over many weeks, months or even years. As a result, these arrangements are often not capable of managing voltages on a network when there is potential feed in from renewable power sources, or at best will only allow power to be fed in subject to limitations. As a result, renewable energy exports to the network are often limited, preventing renewable energy sources being fully exploited.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF THE PRESENT INVENTION

In one broad form an aspect of the present invention seeks to provide an apparatus for regulating electrical power in an electricity transmission network, the apparatus including: a DC contactor having DC terminals configured to be connected to a DC device; a transmission network connector configured to be connected to the electricity transmission network and including: at least one live terminal configured to be connected to at least one live connection of the electricity transmission network; and, a neutral terminal configured to be connected to at least one of a neutral or earth of the electricity transmission network; a plurality of switches connected to the DC contactor; one or more electronic controlling devices coupled to the switches and being configured to control the switches to selectively connect the DC terminals and the at least one live terminal and the neutral terminal to thereby independently regulate electrical power on each of the at least one live connection and the neutral connection, the one or more electronic controlling devices being configured to: receive a voltage reading of the at least one live connection; calculate an average of the voltage reading for the at least one live connection; if the average is larger than a predetermined upper value, control the switches to selectively connect the at least one live connection to the DC device and thereby reduce voltage on the at least one live connection; if the average is less than a predetermined lower value, control the switches to selectively connect the at least one live connection to the DC device and thereby increase voltage supplied on the live connection.

In one embodiment the one or more electronic controlling devices are configured to increase the voltage by at least one of sourcing a reactive power; increasing a reactive power; absorbing a real power; and decreasing a real power.

In one embodiment the one or more electronic controlling devices being configured to decrease the voltage by at least one of sourcing a real power; increasing a real power; absorbing a reactive power and decreasing a reactive power.

In one embodiment the one or more electronic controlling devices are configured to receive the voltage reading at least one of: at least every microsecond; at least every second; and between ever microsecond and every second.

In one embodiment the one or more electronic controlling devices are configured to calculate a moving average at least one of: within a window of 10 minutes; and within a window of a microsecond, with subsequent stability averaging occurring at least every 10 minutes.

In one embodiment the electricity transmission network is a multi-phase transmission network and the one or more electronic controlling devices are configured to alter the voltage of multiple live connections independently of each other.

In one embodiment the apparatus is configured to be connected on a circuit at an optimal position.

In one embodiment an accumulated voltage differential from a grid connection to the optimal position is about 40% to 60% of a total accumulated voltage differential along the circuit.

In one embodiment an accumulated voltage differential from a grid connection to the optimal position is about 50% of a total accumulated voltage differential along the circuit.

In one embodiment the total accumulated differential voltage is an average of at least one of: a total accumulated voltage differential at maximum feed-in; a total accumulated voltage differential at minimum load; and a total accumulated voltage differential at maximum load.

In one embodiment the one or more electronics controlling devices are configured to control the switches to operate in a current mode or a voltage mode.

In one embodiment the one or more electronics controlling devices are configured to control the switches to change between operating in a current mode and a voltage mode.

In one embodiment, when in the current mode, the one or more electronics controlling devices are configured to control the switches so that each of the least one live terminals or the DC terminals have a predetermined current waveform.

In one embodiment, when in the voltage mode, the one or more electronics controlling devices are configured to control the switches so that each of the least one live terminals or the DC terminals have a predetermined voltage waveform.

In one embodiment the apparatus further includes one or more filters for suppressing noise on the at least one connection.

In one embodiment the apparatus further includes a snubber circuit connected between the one or more filters and the DC contactor for suppressing noise.

In one embodiment the neutral connection is decoupled from an earth.

In one embodiment the switches include a plurality of silicon carbide MOSFET switches.

In one embodiment the switches include a plurality of symmetrical half-bridge topology arms connecting to the at least one live connection and the neutral connection.

In one embodiment the one or more filters include at least one of: an electromagnetic interference (EMI) choke; a differential-mode choke connected to the at least one live connection and the neutral connection for filtering noise; and a common-mode choke connected to the switches for suppressing interference.

In one embodiment the switches have a plurality of capacitors configured to at least one of: smooth fluctuations in DC power; and, store enough energy to complete each switching cycle with a full-phase offset range.

In one embodiment the plurality of capacitors are connected to a failsafe mechanism to discharge the capacitors in the event of a fault.

In one embodiment the capacitors are connected through an interleaving structure with a multi-layer printed circuit board (PCB).

In one embodiment the interleaving structure includes one or more through-holes connecting a positive contact of one of the capacitors to one or more positive layers of the PCB and a negative contact of one of the capacitor to one or more negative layers of the PCB.

In one embodiment the multi-layer PCB defines alternating polarity layers to cancel generated magnetic fields.

In one embodiment the multi-layer PCB includes eight electrically conductive layers.

In one embodiment the multi-layer PCB has at least two outer electrically conductive negative layers.

In one embodiment the failsafe mechanism includes at least one of: a hardware failsafe mechanism being configured to disconnect the DC contactor or the transmission network connector in the event of a fault; and a software failsafe mechanism, in the event of a fault, being configured to at least one of: rapidly connect and disconnect the capacitors to earth; and turn off the DC contactor or the transmission network connector.

In one embodiment the one or more electronic controlling devices include a master controller and a slave controller.

In one embodiment the DC device includes at least one of: a battery; a solar power generator; a hydrokinetic power generator; and a wind power generator.

In one embodiment the transmission network connector includes at least one of: an AC contactor; an AC relay; and an AC circuit breaker for each of the at least one live terminal.

In one embodiment the apparatus further includes a load connector configured to be connected to a load and including: at least one load terminal configured to be connected to the load; and a load neutral terminal configured to be connected to at least one of a neutral or earth of the load.

In one embodiment the load connector includes a DC circuit breaker for each of the at least one load terminal.

In one embodiment the apparatus further includes a communication interface connected to the one or more electronic controlling devices for communicating with an external device.

In one broad form an aspect of the present invention seeks to provide a method of regulating electrical power in an electricity transmission network, the method includes using an electrical power regulating apparatus including: a DC contactor having DC terminals configured to be connected to a DC device; a transmission network connector configured to be connected to the electricity transmission network and including: at least one live terminal configured to be connected to at least one live connection of the electricity transmission network; and a neutral terminal configured to be connected to at least one of a neutral or earth of the electricity transmission network; a plurality of switches connected to the DC contactor; one or more electronic controlling devices coupled to the switches and being configured to control the switches to selectively connect the DC terminals and the at least one live terminal and the neutral terminal to thereby independently regulate electrical power on each of the at least one live connection and the neutral connection, the method including, in the one or more electronic controlling devices: receiving a voltage reading of the at least one live connection; calculating an average of the voltage reading for the at least one live connection; if the average is larger than a predetermined upper value, controlling the switches to selectively connect the at least one live connection to the DC device and thereby reduce voltage on the at least one live connection; if the average is less than a predetermined lower value, controlling the switches to selectively connect the at least one live connection to the DC device and thereby increase voltage supplied on the live connection.

In one embodiment the method of increasing the voltage includes at least one of: sourcing a reactive power; increasing a reactive power; absorbing a real power; and decreasing a real power.

In one embodiment the method of decreasing the voltage includes at least one of: sourcing a real power; increasing a real power; absorbing a reactive power; and decreasing a reactive power.

In one embodiment the method of receiving the voltage reading includes receiving the voltage reading at least one of: at least every microsecond; at least every second; and, between every microsecond and every second.

In one embodiment the method of calculating the average includes, in the one or more electronic controlling devices, calculating a moving average at least one of: within a window of 10 minutes; and, within a window of a microsecond, with subsequent stability averaging occurring at least every 10 minutes.

In one embodiment the electricity transmission network is a multi-phase transmission network and the method includes altering the voltage of multiple live connections independently of each other.

In one embodiment the method includes, in the one or more electronics controlling devices, controlling the switches to operate in a current mode or a voltage mode.

In one embodiment the method includes, in the one or more electronics controlling devices, controlling the switches to change between operating in a current mode and a voltage mode.

In one embodiment, when in the current mode, the method includes, in the one or more electronics controlling devices, controlling the switches so that each of the least one live terminals or the DC terminals have a predetermined current waveform.

In one embodiment, when in the voltage mode, the method includes, in the one or more electronics controlling devices, controlling the switches so that each of the least one live terminals or the DC terminals have a predetermined voltage waveform.

In one broad form an aspect of the present invention seeks to provide a method of determining an optimal position for an electrical power regulating apparatus to be connected on a circuit, the method includes: determining a total accumulated voltage differential along the circuit; and calculating the optimal position based on the total accumulated voltage differential.

In one embodiment calculating the optimal position includes calculating an accumulated voltage differential from a grid connection to the optimal position to be about 40% to 60% of the total accumulated voltage differential.

In one embodiment calculating the optimal position includes calculating an accumulated voltage differential from a grid connection to the optimal position to be about 50% of the total accumulated voltage differential.

In one embodiment the total accumulated differential voltage is an average of at least one of: a total accumulated voltage differential at maximum feed-in; a total accumulated voltage differential at minimum load; and a total accumulated voltage differential at maximum load.

In one broad form an aspect of the present invention seeks to provide a two-way electrical power distribution network including: an electrical power distribution bus connected to a high voltage transformer; a plurality of medium voltage electrical power feed lines connected to the electrical power distribution bus; a plurality of low voltage distribution lines connected to each feed line, wherein the low voltage distribution lines are connected to at least one of: one or more loads; and one or more sources; and, at least one medium voltage electrical power regulating apparatus connected to at least one of the plurality of the feed lines, wherein the medium voltage electrical power regulating apparatus includes: a DC contactor having DC terminals configured to be connected to a DC device; a transmission network connector configured to be connected to the medium voltage electrical power feed line and including: at least one live terminal configured to be connected to at least one live connection of the medium voltage electrical power feed line; and, a neutral terminal configured to be connected to at least one of a neutral or earth of the medium voltage electrical power feed line; a plurality of switches connected to the DC contactor; and, one or more electronic controlling devices coupled to the switches and being configured to control the switches to selectively connect the DC terminals and the at least one live terminal and the neutral terminal to thereby independently regulate electrical power on each of the at least one live connection and the neutral connection of the medium voltage electrical power feed line to thereby maintain a voltage in the electrical power distribution bus during different load and source conditions.

In one embodiment the one or more electronic controlling devices are configured to: receive a voltage reading of the at least one live connection; calculate an average of the voltage reading for the at least one live connection; if the average is larger than a predetermined upper value, control the switches to selectively connect the at least one live connection to the DC device and thereby reduce voltage on the at least one live connection; and, if the average is less than a predetermined lower value, control the switches to selectively connect the at least one live connection to the DC device and thereby increase voltage supplied on the live connection.

In one embodiment a voltage on the electrical power distribution bus and the medium voltage electrical power feed lines is at least one of: about 5 kV; about 7.2 kV; about 10 kV; about 11 kV; about 12.47 kV; about 15 kV; about 20 kV; about 22 kV; about 25 kV; about 33 kV; about 34.5 kV; and about 35 kV.

In one embodiment a voltage on the low voltage distribution line is at least one of: about 220V to 240V; about 100V to 120V; about 400V; and, about 240V.

In one embodiment the low voltage distribution line is connected to a low-voltage electrical power regulating apparatus.

In one embodiment the predetermined upper value is 5% above a nominal value.

In one embodiment the predetermined lower value is 5% below a nominal value.

In one embodiment the one or more electronic controlling devices are configured to increase the voltage by at least one of: sourcing a reactive power; increasing a reactive power; absorbing a real power and, decreasing a real power.

In one embodiment the one or more electronic controlling devices are configured to decrease the voltage by at least one of: sourcing a real power; increasing a real power; absorbing a reactive power; and, decreasing a reactive power.

In one embodiment the one or more electronic controlling devices are configured to receive the voltage reading at least one of: at least very microsecond; every 15-25 milliseconds; every 35-65 milliseconds; every 100-200 milliseconds; every 500-700 milliseconds; at least every second; between every microsecond and every second; and, every 2-5 seconds.

In one embodiment the one or more electronic controlling devices are configured to calculate a moving average at least one of: within a window of 2 minutes; within a window of 6 minutes; within a window of 10 minutes; within a window of 15 minutes; within a window of 20 minutes; and, within a window of a microsecond, with subsequent stability averaging occurring at least every 10 minutes.

In one embodiment the medium voltage electrical power feed line is a multi-phase transmission network and the one or more electronic controlling devices are configured to alter the voltage of multiple live connections independently of each other.

In one embodiment the medium voltage electrical power regulating apparatus is configured to be connected to the medium voltage electrical power feed line at an optimal position.

In one embodiment an accumulated voltage differential from a high voltage connection to the optimal position is about 40% to 60% of a total accumulated voltage differential along the medium voltage electrical power feed line.

In one embodiment an accumulated voltage differential from a high voltage connection to the optimal position is about 50% of a total accumulated voltage differential along the medium voltage electrical power feed line.

In one embodiment the total accumulated differential voltage is an average of at least one of: a total accumulated voltage differential at maximum feed-in; a total accumulated voltage differential at minimum feed-in; a total accumulated voltage differential at minimum load; a total accumulated voltage differential at maximum load; a total accumulated voltage differential at maximum feed-in and minimum load; and, a total accumulated voltage differential at minimum feed-in and maximum load.

In one embodiment the one or more electronics controlling devices are configured to control the switches to operate in a current mode or a voltage mode.

In one embodiment the one or more electronics controlling devices are configured to control the switches to change between operating in a current mode and a voltage mode.

In one embodiment, when in the current mode, the one or more electronics controlling devices are configured to control the switches so that each of the least one live terminals or the DC terminals have a predetermined current waveform.

In one embodiment, when in the voltage mode, the one or more electronics controlling devices are configured to control the switches so that each of the least one live terminals or the DC terminals have a predetermined voltage waveform.

In one embodiment the medium voltage electrical power regulating apparatus further includes one or more filters for suppressing noise on the at least one connection.

In one embodiment the medium voltage electrical power regulating apparatus further includes a snubber circuit connected between the one or more filters and the DC contactor for suppressing noise.

In one embodiment the neutral connection is decoupled from an earth.

In one embodiment the switches include a plurality of silicon carbide MOSFET switches.

In one embodiment the switches include a plurality of symmetrical half-bridge topology arms connecting to the at least one live connection and the neutral connection.

In one embodiment the one or more filters include at least one of: an electromagnetic interference (EMI) choke; a differential-mode choke connected to the at least one live connection and the neutral connection for filtering noise; and, a common-mode choke connected to the switches for suppressing interference.

In one embodiment the switches have a plurality of capacitors configured smooth to fluctuations in DC power.

In one embodiment the plurality of capacitors are connected to a failsafe mechanism to discharge the capacitors in the event of a fault.

In one embodiment the capacitors are connected through an interleaving structure with a multi-layer printed circuit board (PCB).

In one embodiment the interleaving structure includes one or more through-holes connecting a positive contact of one of the capacitors to one or more positive layers of the PCB and a negative contact of one of the capacitor to one or more negative layers of the PCB.

In one embodiment the multi-layer PCB defines alternating polarity layers to cancel generated magnetic fields.

In one embodiment the multi-layer PCB includes eight electrically conductive layers.

In one embodiment the multi-layer PCB has at least two outer electrically conductive negative layers.

In one embodiment the failsafe mechanism includes at least one of: a hardware failsafe mechanism being configured to disconnect the DC contactor or the transmission network connector in the event of a fault; and a software failsafe mechanism, in the event of a fault, being configured to at least one of: rapidly connect and disconnect the capacitors to earth; and turn off the DC contactor or the transmission network connector.

In one embodiment the one or more electronic controlling devices include a master controller and a slave controller.

In one embodiment the DC device includes at least one of: a battery; a solar power generator; a hydrokinetic power generator; and, a wind power generator.

In one embodiment the transmission network connector includes at least one of: an AC contactor; an AC relay; and, an AC circuit breaker for each of the at least one live terminal.

In one embodiment the medium voltage electrical power regulating apparatus further includes a load connector configured to be connected to a load and including: at least one load terminal configured to be connected to the load; and, a load neutral terminal configured to be connected to at least one of a neutral or earth of the load.

In one embodiment the load connector includes a DC circuit breaker for each of the at least one load terminal.

In one embodiment the medium voltage electrical power regulating apparatus further includes a communication interface connected to the one or more electronic controlling devices for communicating with an external device.

In one broad form an aspect of the present invention seeks to provide a method of providing a two-way electrical power distribution network, the method including connecting an electrical power regulating apparatus to a medium electrical power feed line being connected to an electrical power distribution bus, the electrical power regulating apparatus including: a DC contactor having DC terminals configured to be connected to a DC device; a transmission network connector configured to be connected to the medium voltage electrical power feed line and including: at least one live terminal configured to be connected to at least one live connection of the medium voltage electrical power feed line; and, a neutral terminal configured to be connected to at least one of a neutral or earth of the medium voltage electrical power feed line; a plurality of switches connected to the DC contactor; and, one or more electronic controlling devices coupled to the switches and being configured to control the switches to selectively connect the DC terminals and the at least one live terminal and the neutral terminal to thereby independently regulate electrical power on each of the at least one live connection and the neutral connection of the medium voltage electrical power feed line to thereby maintain a voltage in the electrical power distribution bus during different load and source conditions.

In one embodiment the one or more electronic controlling devices are configured to: receive a voltage reading of the at least one live connection; calculate an average of the voltage reading for the at least one live connection; if the average is larger than a predetermined upper value, control the switches to selectively connect the at least one live connection to the DC device and thereby reduce voltage on the at least one live connection; and, if the average is less than a predetermined lower value, control the switches to selectively connect the at least one live connection to the DC device and thereby increase voltage supplied on the live connection.

In one embodiment a voltage on the electrical power distribution bus and the medium voltage electrical power feed lines is at least one of: about 5 kV; about 7.2 kV; about 10 kV; about 11 kV; about 12.47 kV; about 15 kV; about 20 kV; about 22 kV; about 25 kV; about 33 kV; about 34.5 kV; and, about 35 kV.

In one embodiment the predetermined upper value is 5% above a nominal value.

In one embodiment the predetermined lower value is 5% below a nominal value.

In one embodiment the method of increasing the voltage includes at least one of: sourcing a reactive power; increasing a reactive power; absorbing a real power; and, decreasing a real power.

In one embodiment the method of decreasing the voltage includes at least one of: sourcing a real power; increasing a real power; absorbing a reactive power; and, decreasing a reactive power.

In one embodiment the one or more electronic controlling devices are configured to receive the voltage reading at least one of: at least every microsecond; every 15-25 milliseconds; every 35-65 milliseconds; every 100-200 milliseconds; every 500-700 milliseconds; at least every second; between every microsecond and every second; and, every 2-5 seconds.

In one embodiment the method of calculating the average includes, in the one or more electronic controlling devices are configured to calculate a moving average at least one of: within a window of 2 minutes; within a window of 6 minutes; within a window of 10 minutes; within a window of 15 minutes; within a window of 20 minutes; and, within a window of a microsecond, with subsequent stability averaging occurring at least every 10 minutes.

In one embodiment the electricity transmission network is a multi-phase transmission network and the method includes altering the voltage of multiple live connections independently of each other.

In one embodiment the medium voltage electrical power regulating apparatus is configured to be connected to the medium voltage electrical power feed line at an optimal position.

In one embodiment an accumulated voltage differential from a high voltage connection to the optimal position is about 40% to 60% of a total accumulated voltage differential along the medium voltage electrical power feed line.

In one embodiment an accumulated voltage differential from a high voltage connection to the optimal position is about 50% of a total accumulated voltage differential along the medium voltage electrical power feed line.

In one embodiment the total accumulated differential voltage is an average of at least one of: a total accumulated voltage differential at maximum feed-in; a total accumulated voltage differential at minimum feed-in; a total accumulated voltage differential at minimum load; a total accumulated voltage differential at maximum load; a total accumulated voltage differential at maximum feed-in and minimum load; and, a total accumulated voltage differential at minimum feed-in and maximum load.

In one embodiment the method includes, in the one or more electronics controlling devices, controlling the switches to operate in a current mode or a voltage mode.

In one embodiment the method includes, in the one or more electronics controlling devices, controlling the switches to change between operating in a current mode and a voltage mode.

In one embodiment, when in the current mode, the method includes, in the one or more electronics controlling devices, controlling the switches so that each of the least one live terminals or the DC terminals have a predetermined current waveform.

In one embodiment, when in the voltage mode, the method includes, in the one or more electronics controlling devices, controlling the switches so that each of the least one live terminals or the DC terminals have a predetermined voltage waveform.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
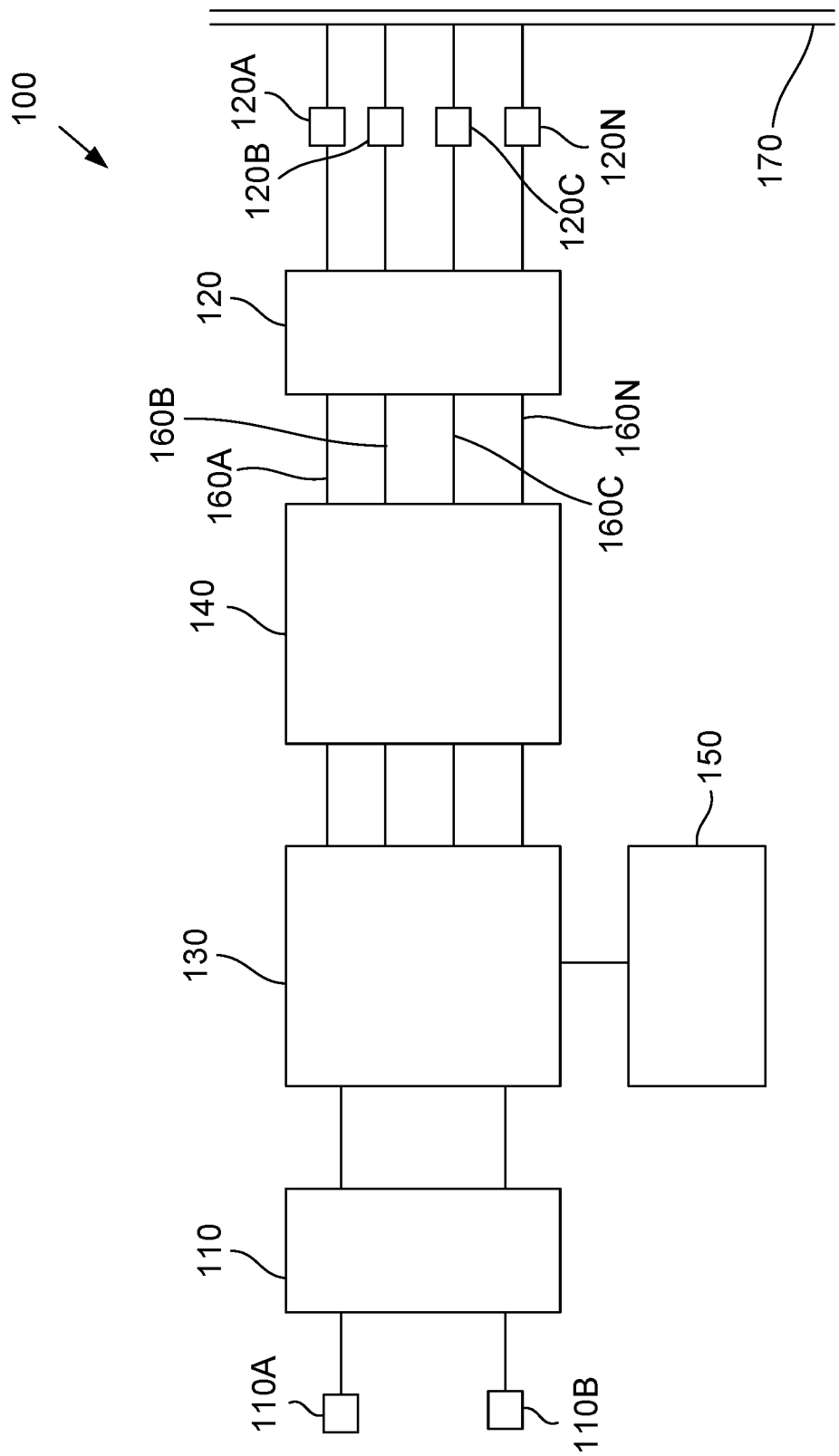
FIG. 1 is a schematic diagram of an example of an electrical power regulating apparatus.

An example of an electrical power regulating apparatus will now be described with reference to FIG. 1.

An electrical power regulating apparatus 100 configured to regulate electrical power in an electricity transmission network. The electrical power regulating apparatus 100 includes a DC contactor 110, a transmission network connector 120, a plurality of switches 130, a one or more filters 140, one or more electronic controlling devices 150, at least one live connection 160A, 160B, 160C, and a neutral connection 160N.

The DC contactor 110 having DC terminals 110A, 110B is configured to connect to a DC device (not shown). The DC device may be DC power supply, such as at least one of a battery, a solar power generator; a hydrokinetic power generator, a wind power generator, or the like.

The transmission network connector 120 is configured to be connected to the electricity transmission network, in this example, via a transmission bus 170. The transmission network connector 120 includes at least one live terminal 120A, 120B, 120C, and the live terminals 120A, 120B, 120C are configured to be connected to the electricity transmission network. The transmission network connector 120 further includes a neutral terminal 120N being configured to be connected to at least one of a neutral or earth of the electricity transmission network.

One or more filters 140 are provided that are configured to suppress noise on the at least one connection 160A, 160B, 160C. In this example, the transmission network connector 120 is coupled to the one or more filters 140 with at least one live connection 160A, 160B, 160C and a neutral connection 160N. The live connections 160A, 160B, 160C are connected their respective live terminal 120A, 120B, 120C, and the neutral connection 160N is connected to the neutral terminal 120N. However, it will be appreciated that other suitable configuration could be used.

The plurality of switches 130 is connected to the DC contactor and provide onward connectivity to the transmission network connector, in this example by being connected to the one or more filters 140, and specifically with the least one live connections 160A, 160B, 160C and a neutral connection 160N.

The switches 140 are further coupled with the one or more electronic controlling devices 150. The one or more electronic controlling devices 150 are configured to control the switches 140 to selectively connect the DC terminals 110A, 110B and the at least one live connection 160A, 160B, 160C and the neutral connection 160N to thereby independently regulate electrical power on each of the at least one live connection 160A, 160B, 160C and the neutral connection 160N.

Accordingly, the one or more controlling devices 150 may be formed from any suitable controlling device that is capable of controlling the switches 130, and could include a microprocessor, microchip processor, logic gate configuration, firmware optionally associated with implementing logic such as an FPGA (Field Programmable Gate Array), or any other electronic device, system or arrangement. Furthermore, for ease of illustration the remaining description will refer to an electronic controlling device, but it will be appreciated that multiple controlling devices could be used, with controlling distributed between the devices as needed, and that reference to the singular encompasses the plural arrangement and vice versa.

Figure 2:
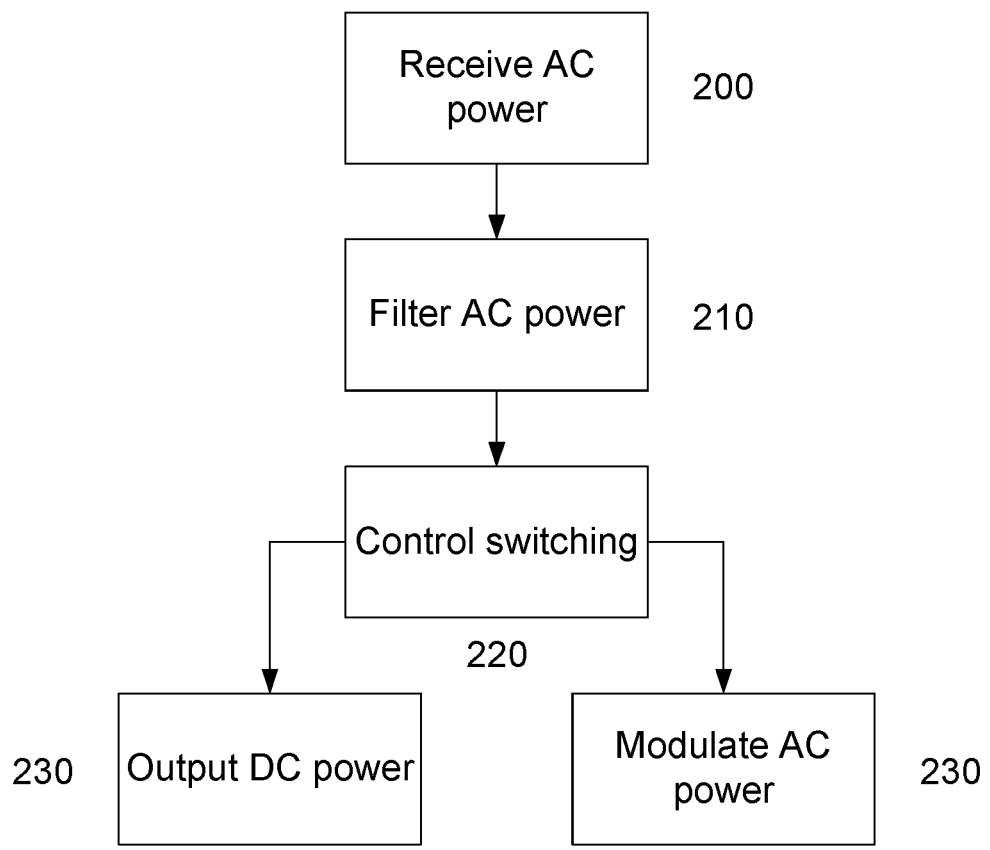
FIG. 2 is a flow chart of an example of an operation of an electrical power regulating apparatus.

An example of operation of the electrical power regulating apparatus 100 will now be described with reference to FIG. 2.

In this example, the electrical power regulating apparatus 100 connects to the electricity transmission network. At step 200, the one or more live terminals 120A, 120B, 120C of the electrical power regulating apparatus 100 receives electrical power from the electricity transmission network, and the neutral terminal 120N is connected to the neutral or earth of the electricity transmission network. In one example, each of the one or more live terminals 120A, 120B, 120C receives a respective phase of the electrical power from the electricity transmission network.

The live connections 160A, 160B, 160C are connected to the respective live terminals 120A, 120B, 120C to carry a respective phase of the AC power. At step 210, the AC power carried on the live connections 160A, 160B, 160 and the neutral connection 160N are passed through to the one or more filters 140 for filtering noise and/or interference of the AC power.

The filtered AC power is passed to the switches 130 with the one or more live connection 160A, 160B, 160C and the neutral connection 160N. At step 220, the electronic controlling device 150 controls the switches 130 of the one or more live connection 160A, 160B, 160C and the neutral connection 160N. The switches 130 are controlled to selectively connect the DC terminals 110A, 110B and the at least one live connection 160A, 160B, 160C and the neutral connection 160N, so that electrical power on each of the one or more live connection 160A, 160B, 160C and the neutral connection 160N are independently regulated. This allows DC power to be output to the DC terminals 110A, 110B at step 230, for example to charge a battery.

Alternatively, this allows DC power supplied to the DC terminals from the DC device to be used to modulate power on the live connection 160A, 160B, 160C and the neutral connection 160N at step 240. For example, the electrical power regulating apparatus 100 can independently regulates the electrical power on each of the one or more live connections 160A, 160B, 160C and the neutral connection 160N, for example by adjusting a phase, magnitude or condition of the voltages or current on the connections, which can in turn be used to accommodate unbalanced voltage or current input on each of the live connections and allows adjustment of the voltage and/or current on each of the live connections thereby conditions and/or regulates the power. As the electrical power regulating apparatus 100 is able to independently regulate the electrical power on each of the one or more live connections 160A, 160B, 160C and the neutral connection 160N, this allows the electrical power regulating apparatus 100 to operate with an unbalanced load or as an unbalanced supply. This also allows the electrical power regulating apparatus 100 to be implemented in any one of a three-phase, two-phase and a single-phase system, and operates to regulate voltage and/or current of the system.

It should be appreciated that the electrical power regulating apparatus 100 herein described regulates for AC-to-DC power system is for exemplary only. The electrical regulating apparatus 100 is capable of regulating DC-to-AC power systems, AC-to-AC power systems or DC-to-DC power systems.

A number of further features will now be described.

The electronics controlling device is configured to control the switches to operate in a current mode or a voltage mode. Additionally, the electronics controlling device is configured to control the switches to change between operating in a current mode and a voltage mode. This allows the electrical power regulating apparats to provide a suitable voltage or current to meet an output requirement and transitions between the modes when the requirement changes.

Accordingly, when in the current mode, the electronics controlling device is configured to control the switches so that each of the least one live terminals or the DC terminals have a predetermined current waveform. Similarly, when in the voltage mode, the electronics controlling device is configured to control the switches so that each of the least one live terminals or the DC terminals have a predetermined voltage waveform. This allows the electrical power regulating apparats to provide voltage or current waveforms that meets the requirements of the DC device or the electricity transmission network.

The electrical power regulating apparatus may further include a snubber circuit connected between the one or more filters and the DC contactor for suppressing noise.

In one example, the neutral connection is decoupled from an earth, such as an earth of the electricity transmission network, which can be achieve using one or more capacitors, or the like. This allows the neutral connection to be regulated or modulated, which in turn provides greater flexibility in terms of the overall control the system can provide.

The switches may be a plurality of symmetrical half-bridge topology arms that connect to the at least one live connection and the neutral connection, which allows selectable switching of the live connections and the neutral connection. Additionally, the switches may be silicon carbide MOSFET switches, which is advantageously allows the switches to be physically compact.

In one example, the one or more filters may be at least one of: an electromagnetic interference (EMI) choke; a differential-mode choke connected to the at least one live connection and the neutral connection for filtering noise; and a common-mode choke connected to the switches for suppressing interference. The one or more filters advantageously eliminate the noise or interference from the electricity transmission network or the switches.

The switches may have a plurality of capacitors configured to store ample energy to complete each switching cycle with a full-phase offset range and hence smooth fluctuations in DC power, so that it facilitates in protecting the DC devices by providing DC power with minimal fluctuations. The capacitors may be any one of film capacitors, ceramic capacitors and electrolytic capacitors. It should be appreciated that other types of capacitors can also suitable.

The plurality of capacitors may be connected through an interleaving structure with a multi-layer PCB to further minimize noise caused by the PCB tracks. In one example, the interleaving structure includes one or more through-holes connecting a positive contact of one of the capacitors to one or more positive layers of the PCB and a negative contact of one of the capacitor to one or more negative layers of the PCB. Additionally, the multi-layer PCB may define alternating polarity layers so as to cancel magnetic fields generated by each layer of PCB. In one example, the multi-layer PCB including eight electrically conductive layers having electrically conductive negative layers, wherein two of the negative layers are outer layers and alternating polarities in between layers.

In one example, the plurality of capacitors may be further connected to a failsafe mechanism to discharge the capacitors in the event of a fault. The fault can be over-current, voltage overshoot, loss of power, controlling device failure and/or communication failure.

The failsafe mechanism may be a hardware failsafe mechanism and/or a software failsafe mechanism. In this example, the hardware failsafe mechanism is configured to disconnect the DC contactor or the transmission network connector in the event of the fault, whereas the software failsafe mechanism is configured to rapidly connect and disconnect the capacitors to earth and/or turn off the DC contactor or the transmission network connector. The failsafe mechanism provides protection to the electronics of the apparatus, such as the MOSFET switches, microcontrollers, from being damaged by over-current or voltage overshoot.

The electronic controlling device may include a master controller and a slave controller.

The transmission network connector may include at least one of an AC contactor; an AC relay; and an AC circuit breaker for each of the at least one live terminal.

Additionally the electrical power regulating apparatus may include a load connector for connecting to a load. The load connector may include at least one load terminal connected to the load and a load neutral terminal connected to at least one of a neutral or earth of the load. Similarly, the load connector may include a DC circuit breaker for each of the at least one load terminal.

The electrical power regulating apparatus may further include a communication interface connected to the electronic controlling device for communicating with an external device. The communication interface may be WAN, Bluetooth, WLAN and/or suitable serial ports to allow the electrical power regulating apparatus to be controlled or configured by an external computer.

Figure 3:
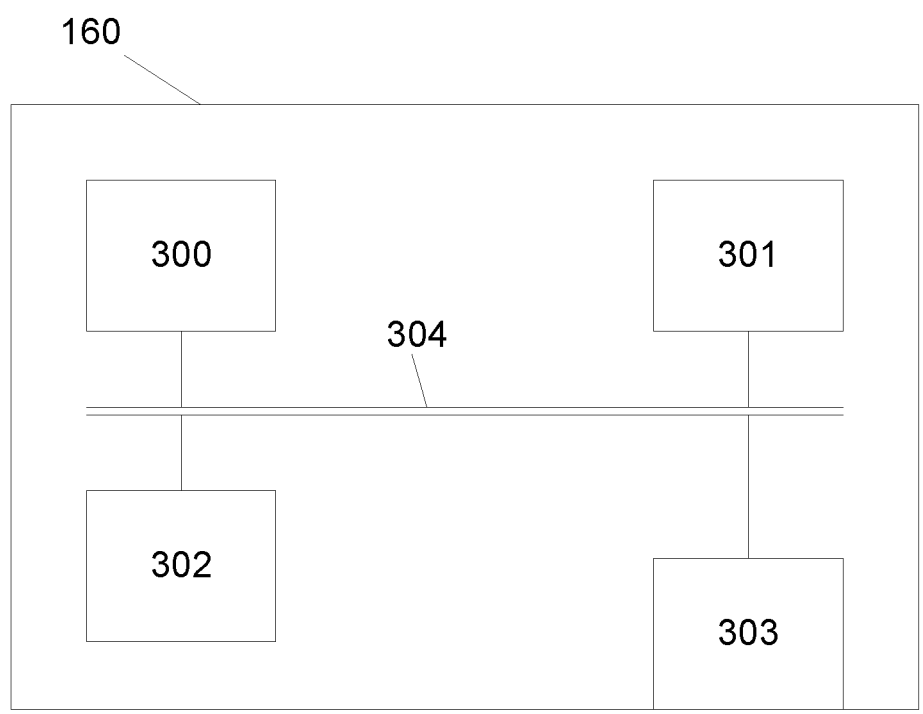
FIG. 3 is a schematic diagram of an example of a processing system.

An example of an electronic controlling device will now be described with reference to FIG. 3.

In this example, the electronic controlling device 160 includes at least one microprocessor 300, a memory 301, an optional input/output device 302, such as a keyboard and/or display, an interface 303, interconnected via a bus 304 as shown. In this example the interface 303 can be utilized for connecting the electronic controlling device 160 to peripheral devices, such as communications networks, or the like.

In use, the microprocessor 300 executes instructions in the form of applications software stored in the memory 301 to allow the required processes to be performed, including controlling the electronic controlling device 160. The applications software may include one or more software modules, and may be executed in a suitable execution environment, such as an operating system environment, or the like.

Accordingly, it will be appreciated that the electronic controlling device 160 may be formed from any suitable control system and could include be any electronic processing device such as a microprocessor, microchip processor, logic gate configuration, firmware optionally associated with implementing logic such as an FPGA (Field Programmable Gate Array), or any other electronic device, system or arrangement.

However, it will be appreciated that the above described configuration assumed for the purpose of the following examples is not essential, and numerous other configurations may be used. It will also be appreciated that the partitioning of functionality between the different processing systems may vary, depending on the particular implementation.

Figure 4:
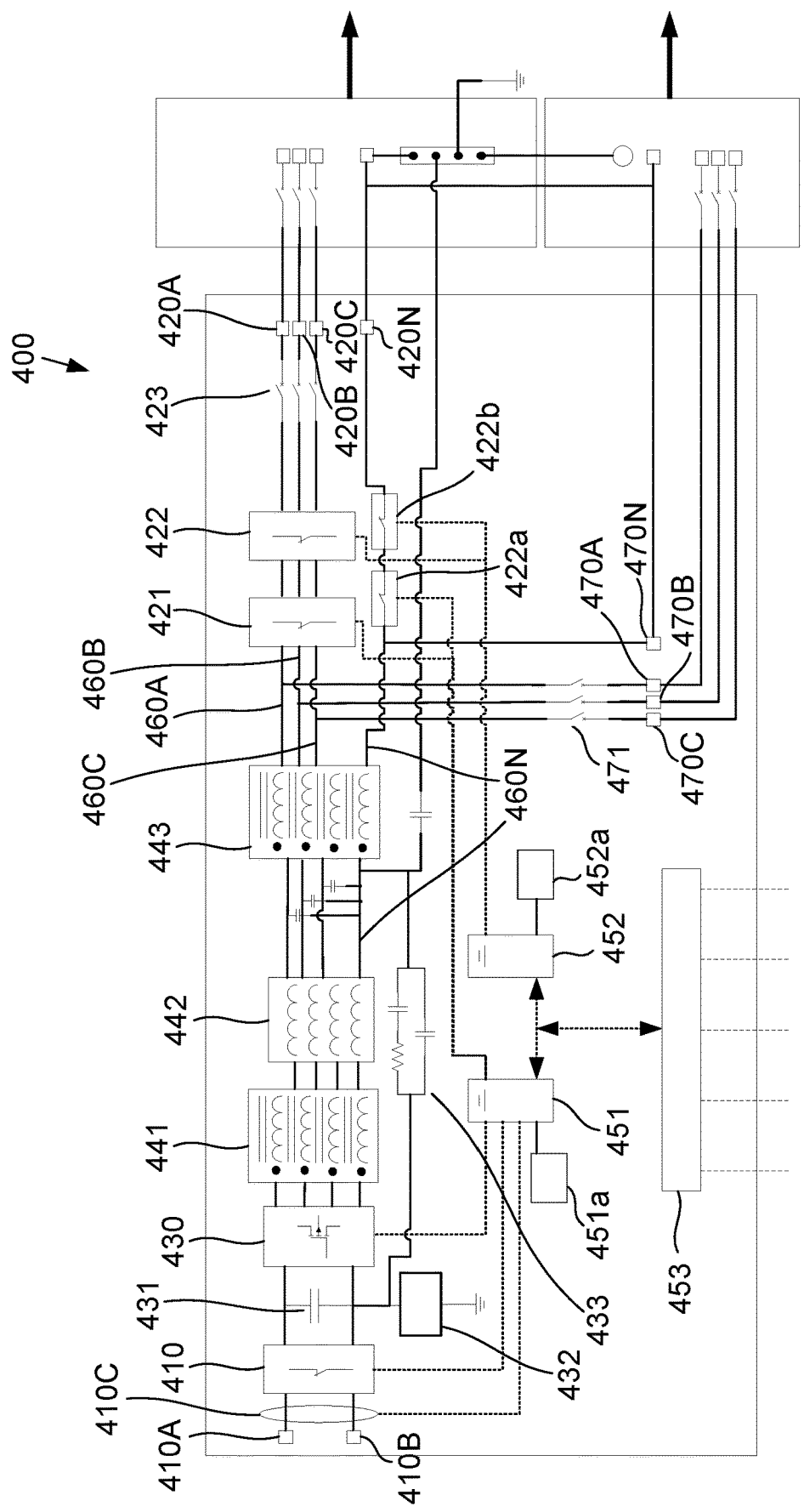
FIG. 4 is a schematic diagram of an example of an electrical power regulating apparatus.

An example of the electrical power regulating apparatus will now be described in more detail with reference to FIG. 4.

An electrical power regulating apparatus 400 configured to regulate electrical power in an electricity transmission network. The electrical power regulating apparatus 400 includes a DC contactor 410, a plurality of capacitors 431, a plurality of switches 430, a common-mode (CM) choke 441, a differential-mode (DM) choke 442, an EMI choke 443, a grid connector, and a load connector. The grid connector includes an AC connector 421, an AC relay 422, AC circuit breakers 423, and three AC terminals 420A, 420B, 420C and an AC neutral connector 420N. The load connector includes load circuit breakers 471 and three load terminals 470A, 470B, 470C and the load neutral connector 470N. The electrical power regulating apparatus 400 also includes three connections 460A, 460B, 460C, and a neutral connection 460N. The three connections 460A, 460B, 460C are connected to the respective live connection with the AC terminals 420A, 420B, 420C. The neutral connection The DC contactor 410 having DC terminals 410A, 410B. The DC terminals 410A, 410B are configured to connect to a battery and a low voltage (LV) solar power generator. In this example, the DC contactor 410 includes at least one mechanical switch for switching both terminals 410A, 410B. Mechanical switches are robust and reliable, and can be configured to have a high breaking capabilities in voltage and current to improve electrical safety.

In one embodiment, a safety interlocking mechanism is implemented. The safety interlocking mechanism may include interlocking multiple AC contactors and/or interlocking both the AC and DC contactors. The safety interlocking mechanism may utilizes an on-board processor, such as one of the controlling devices 451, 452, and a supplementary external processor to switch on the supply. The on-board processor monitors the status of the electrical power regulating apparatus 400 while the external processor monitoring at safety considerations, such as battery voltage and/or battery polarity. Both processors crosscheck each other before operating the contactor.

A DC bus sensor 410C is implemented to monitor the current at the DC terminals 410A, 410B. The DC bus sensor 410C is coupled to the controlling device 451 and allows leakage current or residual current to be detected. In an example, a Sigma-Delta configuration is used for the DC bus sensor 410C, which provides high voltage isolation and accuracy in sensing.

DC Capacitors

The DC contactor 410 is connected to the switches 430 via the capacitors 431. In this example, the capacitors 431 are polypropylene capacitors. The polypropylene capacitors are capable of operating with relatively high ripple currents, which allows the users to control higher order harmonics without decreasing capacitor life. Polypropylene capacitor also have self-healing capabilities, which allows the size of the capacitors to be reduced for providing a required capacitance and accommodating transient voltage.

Figure 5A:
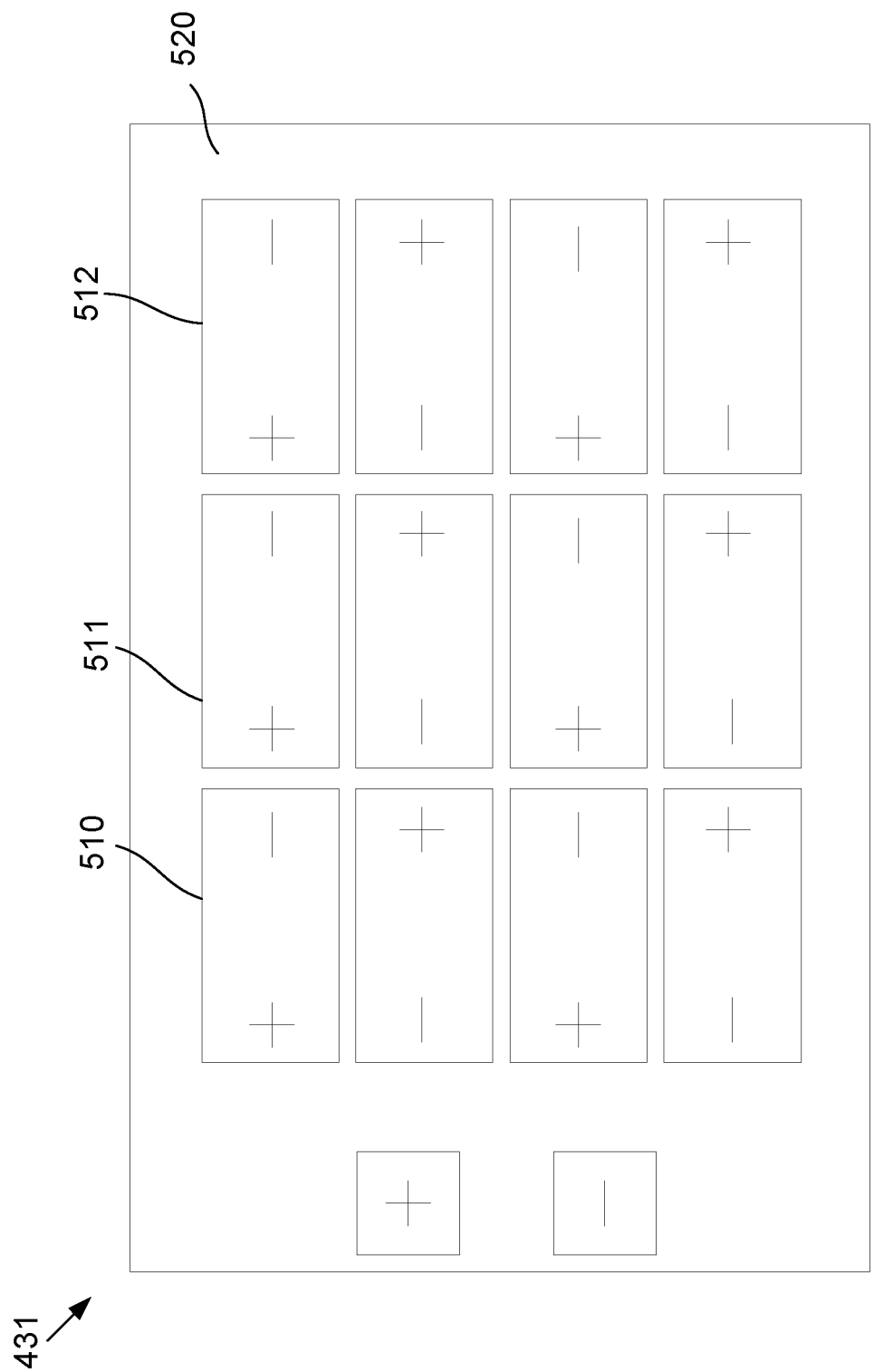
FIGS. 5A and 5B are schematic diagrams of capacitors on a printed circuit board of an electrical power regulating apparatus.

In this example, there are twelve capacitors in the electrical power regulating apparatus 400. The capacitors are mounted on a multi-layer printed circuit board (PCB) in a three-by-four array arrangement. The tracks connecting the capacitors are on the multi-layer PCB with an interleaving structure to minimize parasitic inductance. The interleaving structure is described in more detail with reference to FIGS. 5A and 5B. As illustrated in FIG. 5A, the twelve capacitors are placed on the board 520 in an alternating polarity manner. Accordingly, a positive contact of a capacitor 511 is positioned adjacent to a negative contact of a capacitor 512. Furthermore, the board 520 has eight layers and each layer is plated with copper which makes the layer conductible, thereby minimizing the 'trace' inductance effect. The layers are connected to either the positive or the negative of the capacitor contacts, which makes an alternating polarity pattern of the layers.

Figure 5B:
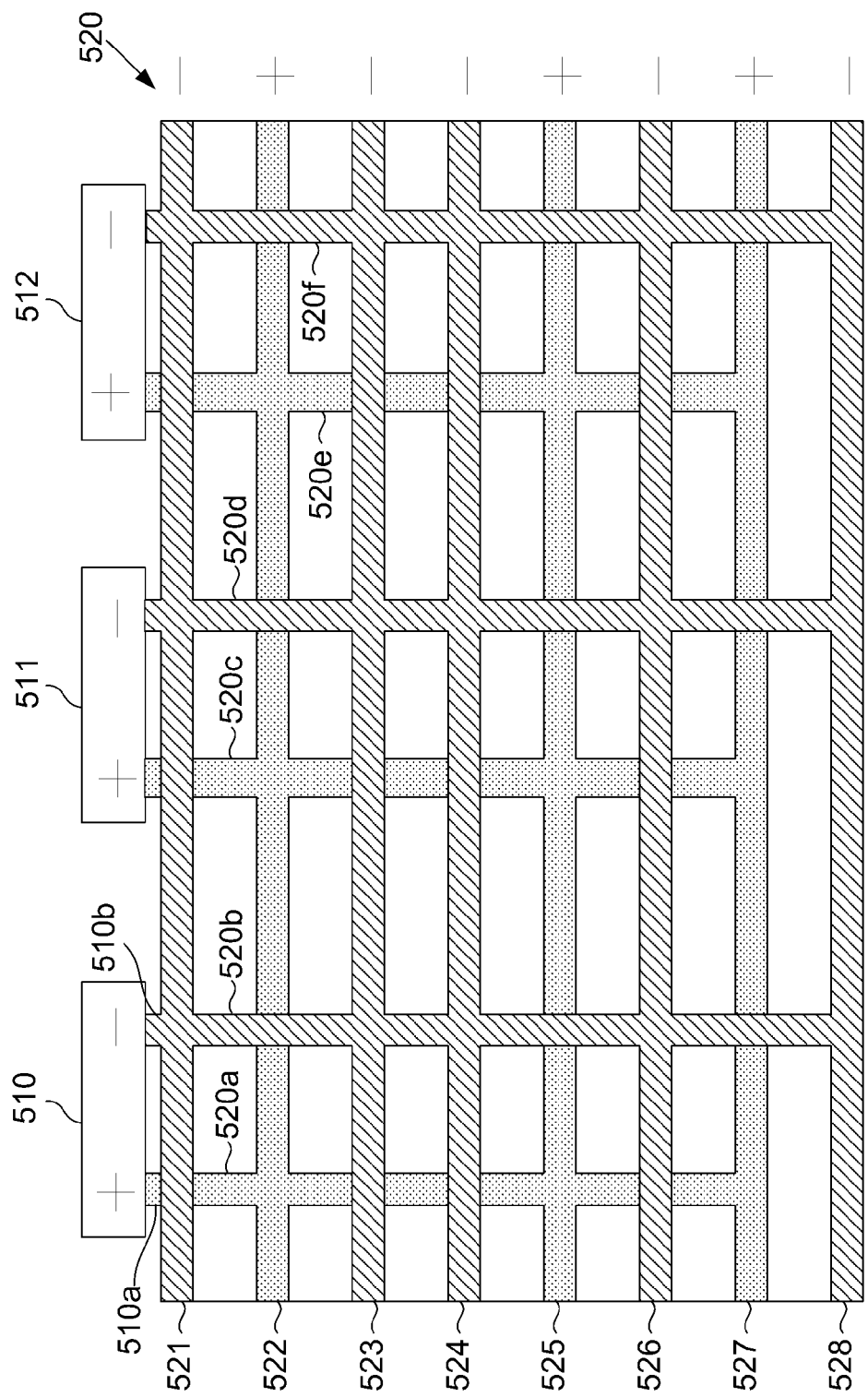

Referring to FIG. 5B, the capacitor 510 has a positive contact 510a and a negative contact 510b. The positive contact 510b is in contact with the second layer 522, the fifth layer 525 and the seventh layer 527 by a through-hole (also called 'via') structure 520a of the board 520. The negative contact 510b is soldered on the first layer 521, whilst in contact with other layers 523, 524, 526 and 528 with a through-hole structure 520b. Similarly, capacitors 511, 512 are connected to the board 520 with through-hole structures 520c, 520d and 520e, 520f as illustrated in FIG. 5B. In one example, the interleaved structure uses eight layers with approximately 2 oz copper per layer, and the layers are separated with FR4 PCB material with a thickness of approximately 0.4 mm. It should be appreciated that other suitable materials and/or thickness may be used depending on different system requirement.

The interleaving structure allows the parasitic inductance to be reduced as the current is distributed across multiple layers. There are also no 'tracks' on the layers which induces inductance. The parallel layers with alternating polarity may increase the parasitic capacitance to complement the capacitors. As described, there is an alternating plate pattern between positive and negative, thereby minimizing parasitic inductance and increasing total capacitance. This also improves the equivalent series resistance (ESR) and temperatures as there is less eddy current circulation (phenomenon where induced currents from magnetic fields interact with traces/wires). With a more stable temperature the change in capacitance due to temperature during operation is reduced.

In this example, the top layer 521 and bottom layer 528 are negative, so that the board 520 has a minimal electromagnetic interference (EMI) and therefore an improvement in the electromagnetic compatibility (EMC). The interleaving structure also reduces EMI currents that are induced within the board 520, and thereby reducing overall magnitude of noise within the board 520.

The electrical power regulating apparatus 400 also includes a failsafe system 433 coupling the capacitors 432 to earth and controls the discharging of the capacitors in the event of a fault. The failsafe system 433 includes a software failsafe and a hardware failsafe mechanisms. When a voltage abnormality is detected, the software failsafe mechanism switches the capacitors on and off rapidly to safely discharge the capacitors. Moreover, if power is lost, the hardware failsafe mechanism opens the DC and AC contactors. The hardware failsafe mechanism also includes an external DC battery fuse and an external AC grid fuse.

Switches

Figure 6:
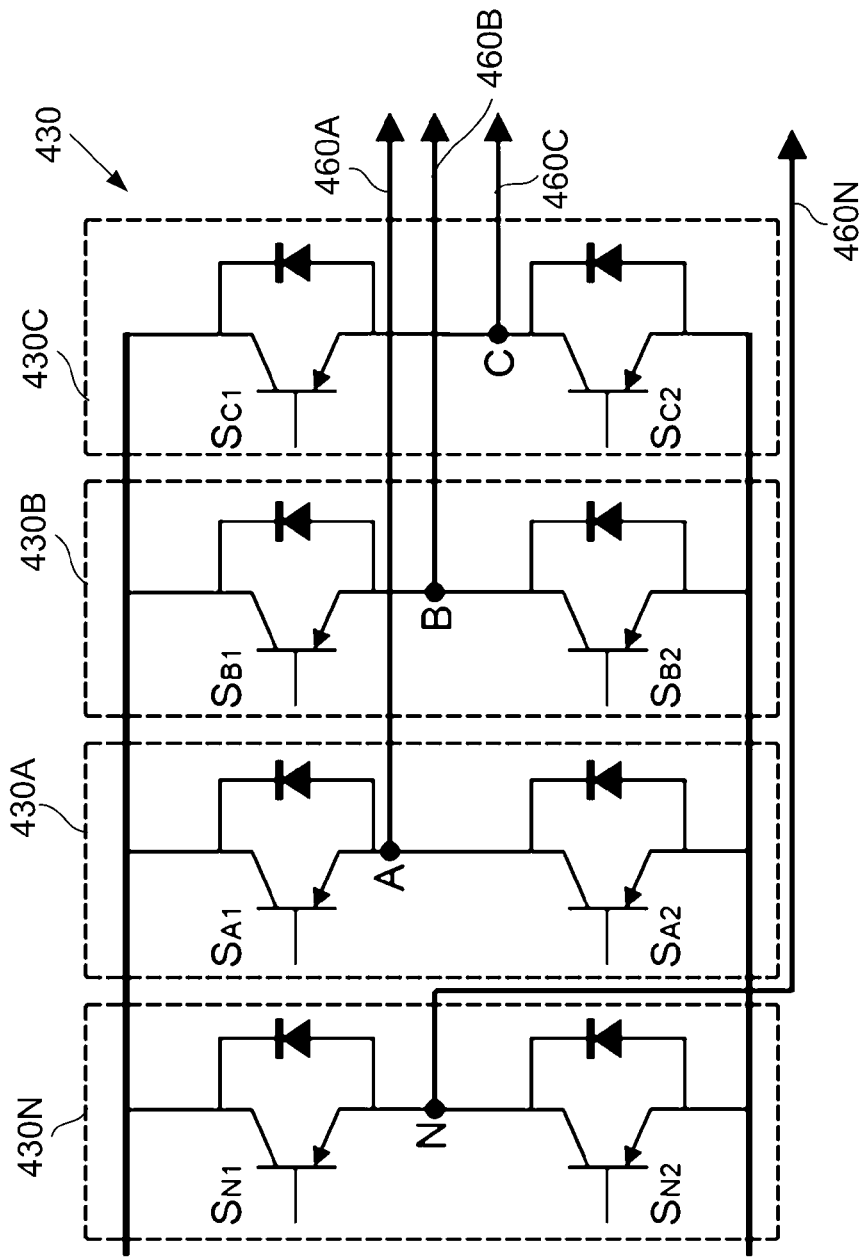
FIG. 6 is a schematic diagram of an example of switches of an electrical power regulating apparatus.

The capacitors 431 are connected to the switches 430 for modulating the each of the three connections 460A, 460B, 460C, and the neutral connection 460N. FIG. 6 shows an example of the switches 430, which includes four symmetrical half bridge topology arms 430A, 430B, 430C, 430N connecting to each of the three connections 460A, 460B, 460C and the neutral connection 460N. Each symmetrical half bridge topology arms includes two MOSFET switches. In this example, the MOSFET switches are silicon carbide switches, particularly, 1200V 55A SCT3040 MOSFET in compliant with the ROHM standard.

The switching characteristics, such as rise time, fall time, and dead-time, of the switches 430 can be configured by hardware design and/or the controlling devices 451, 452 to optimize the performance. The switches 430 can operate in higher switching frequencies (approximately 100kHz) due to a reduction of the primary side to secondary side capacitance as the specific isolation devices are used. This also allows high voltage isolation barrier to increase noise immunity and provide high voltage protection between primary side and secondary side. The switches 430 may further include a snubber circuit 433 to reduce the voltage changes over time (dv/dt) to meet the EMI/EMC requirements.

CM Choke

The CM choke 441 is coupled to the switches 430 to suppress and/or reject high frequency common mode current. The live connections 460A, 460B, 460C and the neutral connection 460N are connected to the CM choke 441 and passed through a core. The core of the CM choke 441 may be a powder core and can be configured to operate in high frequency with low loss. The CM choke 441 is also configured to operate in wider temperature range condition while maintaining low energy losses. Furthermore, in one example, the CM choke 441 may be insulated from an outer chassis of the electrical power regulating apparatus 400, so that high frequency magnetic coupling to the surrounding equipment is minimized. The windings of the CM choke 441 may be of a non-interleaved structure, thereby reducing coupling noise propagating to adjacent conductors. Additionally, the winding may be copper flat bar winding, which minimizes copper losses in low and high frequencies. Flat bar winding may also reduce skin effect when compared to round windings. The increased surface area of the flat bar winding may help with heat dissipation of the CM choke 441.

DM Choke

The CM choke 441 is coupled to a DM choke 442, which acts like a bandpass filter and smooths high frequency from the PWM generated by the switches 430. The DM choke 442 may include individual differential mode inductors that are built of EE cores. The EE cores are compact and easier to manufacture when compared to toroidal cores. The EE core may also shields from high frequency noise and stray magnetic fields. Additionally, the core of the DM choke 442 may be made of a high saturation-point powder core material, so that the DM choke 442 can be configured to operate in high frequency with low loss. This allows the DM choke to have a consistent filter performance, and the inductor to have an overrated capacity a short term. The DM choke 441 can be configured to operate in wider temperature range condition while maintaining low energy losses. Furthermore, the DM choke 442 may be insulated from an outer chassis of the electrical power regulating apparatus 400, so that high frequency magnetic coupling to the surrounding equipment is minimized.

The winding of the DM choke 442 includes copper film winding, which may be thin and flat copper film, to minimize copper loss in low and high frequencies. Copper film winding may also reduce skin effect when compared to round windings. The increased surface area of the film winding may help with heat dissipation of the DM choke 442. The use of film winding also allows an increase in the number of turns without compromising in size and/or skin effect losses.

EMI Filter

The DM choke 442 is coupled to an EMI filter 443, which filters out high frequency electromagnetic interference. This may help preventing any stray common mode current from exporting to the grid, any common mode current from grid impacting the control circuitry. The EMI filter 443 includes a ring core with nano-crystalline material. Solid enameled copper wire may be used around core material to minimize copper losses, particularly at 50 Hz. The EMI filter 443 includes symmetrical windings to minimize leakage inductance. The EMI filter 443 may also include Y capacitors (Y2 rated) in its PCB design.

It should be appreciated that current and/or voltage measurements may be implemented at any point in the electrical power regulating apparatus 400. In one example, the AC current and voltage measurements are implemented between the DM choke 442 and the EMI choke 443. The AC current may be measured with a LEM (100-p) 100A high precision hall-effect sensor.

The electrical power regulating apparatus 400 includes Class X capacitors (X2 rated) between the DM choke 442 and the EMI choke 443. The X capacitors can be useful for high voltage applications to minimize high voltage transients. This also allows shielding signal traces from power traces on the PCB and also provide protection from primary side to secondary side. As illustrated in FIG. 4, an earth link is provided at this point for the neutral connection 460N through a decoupling capacitor.

Load Contactor

In this example, the electrical power regulating apparatus 400 includes the load connector, so that the electrical power regulating apparatus 400 can provide UPS functionality while connected to the grid. The load connector has a 63 A circuit breaker 471 for each live connection 460A, 460B, 460C. The connectors may be Amphenol connectors. As the electrical power regulating apparatus 400 is able to compensate the harmonic components to match the load component, this allows the harmonic content to be managed and not passed through to the grid. This also provides the load with a "clean" AC source. The electrical power regulating apparatus 400 can operate with an unbalanced load condition as the neutral connection 460N can be modulated.

This allows the electrical power regulating apparatus 400 to be a source to the load regardless to whether the load is a three-phase, two-phase or a single-phase load. This is particularly useful for off grid loads with large induction machines, such as farming equipment, conveyor belts, fridges etc.

AC Contactor

The AC contactor 421 is coupled to the EMI filter 443 for connecting to the grid. The AC contactor 421 may be a Semmens three-phase (AC-3 rated) contactor with 38 kW breaking capacity which has low power consumption, such as less than 4 W. The AC contactor 421 is also robust, reliability and able to break high fault currents while providing short switch on and off response times. The AC contactor 421 may include internal sensors in communications with at least one of the controlling devices 451, 452, so that the AC contactor operational status is monitored and controlled.

AC Relay

An AC relay 422, 422a, 422b are coupled between the AC contact 421 and the grid to provide an additional isolation. As illustrated in FIG. 4, the neutral connection 460N are separately coupled to two AC relay 422a, 422b. The AC relay 422, 422a, 422b are in communication with at least one of the controlling devices 451, 452. Additionally, the AC contactor 421 and the AC relay 422 are controlled by different controlling devices 451, 452. This allows the AC contactor 421 and the AC relay 422 to perform interlocking which provide additional safety. Similarly, the two AC relay 422a, 422b are also controlled by different controlling devices 451, 452 to provide additional safety to the neutral connection 460N.

Circuit Breaker

Similar to the load connection circuit breakers 471, circuit breakers 423 are coupled to each of the live connections to form the isolation barrier between the AC terminals 420A, 420B, 420C and the AC contactor 421. This provides additional overcurrent protection to the electrical power regulating apparatus 400. The circuit breakers 423 are rated at 63A to allow operations in various temperatures and no prematurely breakage due to temperature.

MCU

The controlling devices 451, 452 may be two on-board microprocessors. A first microprocessor 451 includes executable programs to control the operation of the apparatus 400, and a second microprocessor 452 is functioned as a safety interlocking controller. An analogue measurement 451a and a temperature measurement 452a may be coupled to the microprocessors 451, 452 respectively. Furthermore, a communication interface 453 is also connected to the microprocessors 451, 452. The communication interface 453 may include one or more interface for Modbus (TCP/IP), USB, RS232/485, Ethernet, demand response mode (DRM) communications. This allows external processors to communicate with the apparatus 400 for monitoring, controlling and/or configuration the apparatus 400.

The electrical power regulating apparatus provides at least the following advantages:

Fast response, often under 20 milliseconds
Continuous control of voltage
Addresses flicker issues
Addresses voltage unbalance issues
Low power losses
Capable of generating a 415V three-phase output and interface a three-phase system to one battery. This provides cost advantages in that only one battery and battery management system per apparatus is needed. This also results in a smaller unit as the higher modulation frequency made possible by using MOSFETS. Smaller size means smaller cabinets, saving both space and materials
Being a four-quadrant device, enables it to be flexible to manage both active and reactive power. This makes it advantageous in managing battery energy storage systems, solar photovoltaic (PV) installations and distribution system voltages
Reliable as the capacitors and other components are all high-quality components as no electrolytic capacitors are used
The operation may be automatic based on the program in it, with little need for maintenance and servicing.

VAR (Volt-Amp Reactance) Management

Figure 7:
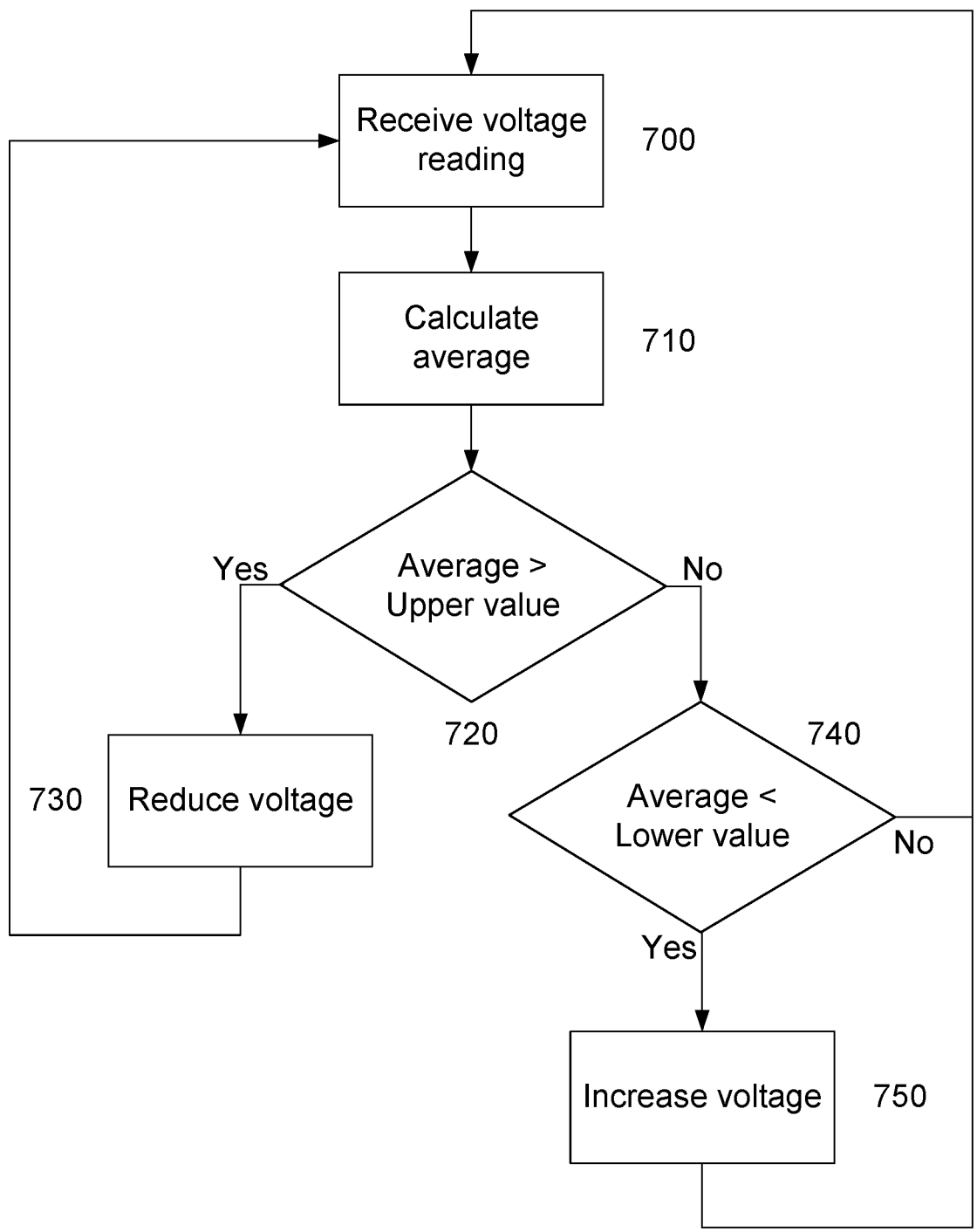
FIG. 7 is a flow chart of an example of a method of regulating electrical power.

An example of method of regulating electrical power will now be described with reference to FIG. 7.

In this example, a method of regulating electrical power in an electricity transmission network, the method includes using the electrical power regulating apparatus 100 substantially similar to that described above. The electrical power regulating apparatus 100 includes a DC contactor 110, a transmission network connector 120, a plurality of switches 130, one or more electronic controlling devices 150, at least one live connection 160A, 160B, 160C, and a neutral connection 160N. The DC contactor 110 having DC terminals 110A, 110B is configured to connect to a DC device (not shown). The transmission network connector 120 is configured to be connected to the electricity transmission network, in this example, via a transmission bus 170. The transmission network connector 120 includes at least one live terminal 120A, 120B, 120C, and the live terminals 120A, 120B, 120C are configured to be connected to the electricity transmission network. The transmission network connector 120 further includes a neutral terminal 120N being configured to be connected to at least one of a neutral or earth of the electricity transmission network.

The plurality of switches 130 is connected to the DC contactor and provide onward connectivity to the transmission network connector, in this example by being connected to the least one live connections 160A, 160B, 160C and a neutral connection 160N. It should be appreciated that the one or more filters 140 may be optionally implemented between the switches 130 and the at least one live terminal 120A, 120B, 120C for filtering noise and/or interference on the at least one live connection 160A, 160B, 160C.

The switches 140 are further coupled with the one or more electronic controlling devices 150. The one or more electronic controlling devices 150 are configured to control the switches 140 to selectively connect the DC terminals 110A, 110B and the at least one live connection 160A, 160B, 160C and the neutral connection 160N to thereby independently regulate electrical power on each of the at least one live connection 160A, 160B, 160C and the neutral connection 160N.

Accordingly, the one or more electronic controlling devices 150 may be formed from any suitable controlling device that is capable of controlling the switches 130, and could include a microprocessor, microchip processor, logic gate configuration, firmware optionally associated with implementing logic such as an FPGA (Field Programmable Gate Array), or any other electronic device, system or arrangement. Furthermore, for ease of illustration the remaining description will refer to an electronic controlling device, but it will be appreciated that multiple controlling devices could be used, with controlling distributed between the devices as needed, and that reference to the singular encompasses the plural arrangement and vice versa.

In use, the apparatus is configured to adjust the voltage in the network, in order to maintain the voltage within defined limits. To achieve this, the apparatus is configured so that the one or more electronic controlling devices 150 receive a voltage reading of the at least one live connection at step 700. This could include a voltage for each of multiple live connections corresponding to multiple phases in a multi-phase network, or a single live connection in a single phase network.

Subsequently at step 710, the one or more controlling devices 150 calculate an average of the voltage reading for the at least one live connection. The average is typically a rolling average over a set time period, such as a few seconds to a few minutes, although this isn't essential and other averages could be used.

At step 720, the one or more controlling devices determine if the average is larger than a predetermined upper value. If yes, at step 730, the one or more electronic controlling devices controls the switches to selectively connect the at least one live connection to the DC device and thereby reduce voltage on the at least one live connection.

If no, at step 740, the one or more electronic controlling devices determine if the average is less than a predetermined lower value. If so, the one or more electronic controlling devices control the switches to selectively connect the at least one live connection to the DC device and thereby increase voltage supplied on the live connection at step 750.

Thus, the above described method and apparatus use an electrical power regulating apparatus to regulate the power supplied on one or more live connections on an electricity transmission network, and in one particular example on a feeder line of an electricity transmission network. Specifically, the apparatus operates by selectively connecting live and/or neutral connections to a DC device, such as a DC load or source, allowing voltage levels in the network to be controlled, and maintained within desired operating limits, irrespective of power feed-in or power drain on the network. Advantageously, the apparatus allows the electricity transmission network to manage voltages substantially in real time. This allows the network to more readily accommodate varying feed-in power as well as customer load variations, allowing renewable energy sources to be more fully exploited.

The method may be used in a single phase or a multi-phase network. In this latter case, the neutral connection can be controlled so that each phase on the live connections can be independently controlled. This allows the apparatus to operate without the need to balance the three phases and independently provide voltage for each phase.

Advantageously, the method allows the electrical power regulating apparatus to regulate the power in an unbalanced electricity transmission network. Accordingly, the electrical power regulating apparatus may be installed anywhere on the transmission network to increase or decrease voltage supplied to the live connection(s) and thereby regulate the voltage. Furthermore, this can be achieved simply by connecting the electrical power regulating apparatus to the network, and does not otherwise require reconfiguration of the network, allowing this to be easily retrofitted to existing network infrastructure.

In addition to the above descriptions, a number of further features will now be described.

In one example, increasing the voltage may include increasing or sourcing a reactive power and/or decreasing or absorbing a real power. Additionally, decreasing the voltage may include increasing a real power and/or decreasing a reactive power. This allows the reactive power to be regulated reactive power and real power of the electricity transmission network and thereby creating leading or lagging reactive power. This is achieved by effectively introducing inductance or capacitance into the network by operating the apparatus to act as a capacitor or an inductor.

In one example, receiving the voltage reading include receiving the voltage reading every second or in a range of microseconds to seconds. This allows monitoring and regulating of the voltage to be responsive and at a relatively high frequency. However, this is not essential and the voltage could be determined at higher or lower frequencies, depending on the preferred implementation and control requirements associated with the network.

In one example, calculating the moving average includes calculating the moving average within a window of 10 minutes. This allows the average to be calculated over a period of time, which may accommodate short term voltage fluctuations or instabilities. Thus, for example, this avoids the apparatus reacting to a short term spike or voltage drop. However, it will be appreciated that the average could be calculated over other windows, such as a few milliseconds to a few minutes.

In one example, the electricity transmission network is a multi-phase transmission network and altering the output power of multiple ones of the live connections independently of each other. This allows each of the live connections to be independently regulated.

In one example, the apparatus is configured to be connected on a circuit at an optimal position. The electrical power regulating apparatus may be implemented behind a customer meter or in front of the meter on the distribution network. The optimal position may also be on a circuit suppling to various loads.

In one example, the optimal position on the circuit occurs where an accumulated voltage differential is about 40% to 60% of the total accumulated voltage differential on the circuit, or more preferably about 50% of the total accumulated voltage differential. This allows the apparatus to effectively regulate the feed voltage along the circuit by compensating for the voltage differential between the grid and the apparatus. The voltage feed to the loads after the apparatus is then maintained within a permitted envelope. In one example, a circuit of the electricity transmission network includes ten load positions (L1 to L10) with equal loads. The voltage differential ($\Delta V$) between each load position is the same, so that the voltage differential between the grid connection to L1 is $\Delta V$, between the grid connection to L2 is $2\Delta V$, between the grid connection to L3 is $3\Delta V$, and so on. The accumulated voltage differential at L3 is the sum of $\Delta V$, $2\Delta V$ and $3\Delta V$, which is $6\Delta V$, and a total accumulated voltage differential is $55\Delta V$ accordingly. In this example, the optimal position is the position where the accumulated voltage differential is about 50% of $55\Delta V$ ($\approx 27.5\Delta V$). According to the load arrangements, the optimal position is at L7 where the accumulated voltage differential is $28\Delta V$ and is closest to 50% of the total accumulated voltage differential.

It should be appreciated that the circuit of the electricity transmission network may include various loads and/or power generators at each position. The total accumulated voltage differential may vary as the loads and/or power generation vary with time, so a statistical calculation of the total accumulated voltage differential may be taken for the purpose of optimal position determination. In one example, the total accumulated voltage differential is an average of at least one of the total accumulated voltage differential at maximum feed-in and the total accumulated voltage differential at maximum load. The voltage the total accumulated voltage differential at maximum at maximum feed-in is the voltage differential when most feed-in occurs, and which typically coincides with load demand being minimum. In one example, the load demand is minimum in day time, when the load may be partially supplied by its own solar power generators. Similarly, the voltage differential at maximum load is the feeding voltage when load demand is maximum. In one example, the load demand is maximum in night time, when household usage is high and minimum supplies from the solar power generators.

Figure 8:
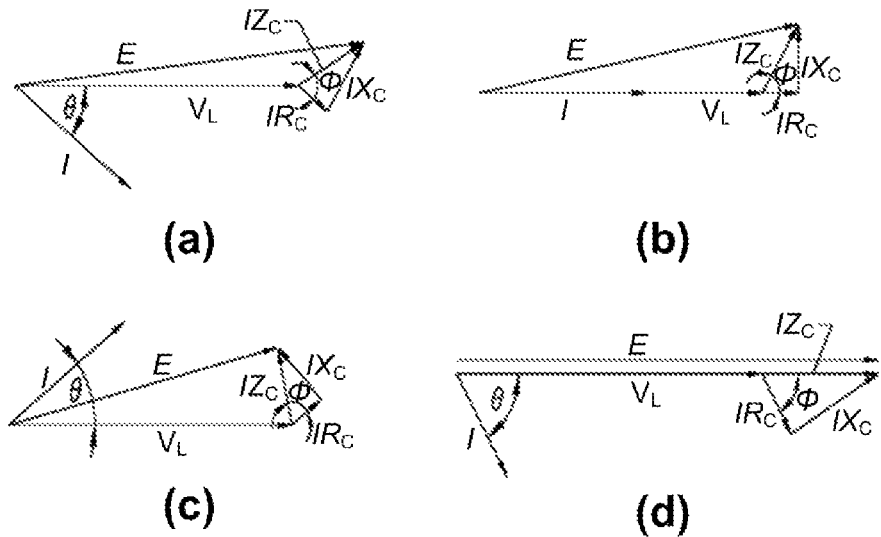
FIGS. 8(a) to (d) are phasor diagrams illustrating voltage differentials with load power factors.

In another example, the calculation of voltage differential based on load power factor can be explained in Section 4.5 of Australian Standard AS3008, as shown in FIG. 8. The complete formulae for voltage differential across the series impedance of a transmission line or transformer is $$\Delta V = I_P \cdot R + I_Q X = I\cos\theta \cdot R + I\sin\theta \cdot X$$
$$= I\cos\theta \cdot Z\cos\emptyset + I\sin\theta \cdot Z\sin\emptyset$$
$$= I \cdot Z\cos(\theta - \emptyset)$$
$$V_S = V_R + I \cdot Z\cos(\theta - \emptyset)$$

where $I = I/\theta$ = the load current;
$I_P = I\cos\overline{\theta}$ = the real or in-phase component of load current;
$I_Q = I\sin\theta$ = the imaginary, quadrature or reactive component of load current;

pf=cos θ=the displacement power factor, where θ=the phase delay of the fundamental of the component of the load current relative to the load voltage;

Z=Z/∅=transmission line impedance=R+jX;

R=Z cos ∅, =Z sin ∅, and thus tan ∅=X/R.

The voltage rise for a unity power factor load current at the load end is only seen across the resistive portion of the transmission line and transformer impedance. Equally, a purely reactive load will only cause a voltage drop (if inductive, that is, absorbing VARs from the grid) or rise (if capacitive, injecting VARs) across the reactive portion of the transmission line and transformer impedance.

The issue of distributed load along a medium voltage (MV) or LV feeder requires slightly different equations, although it is based on the same principle.

Two-Way Grid

Figure 9:
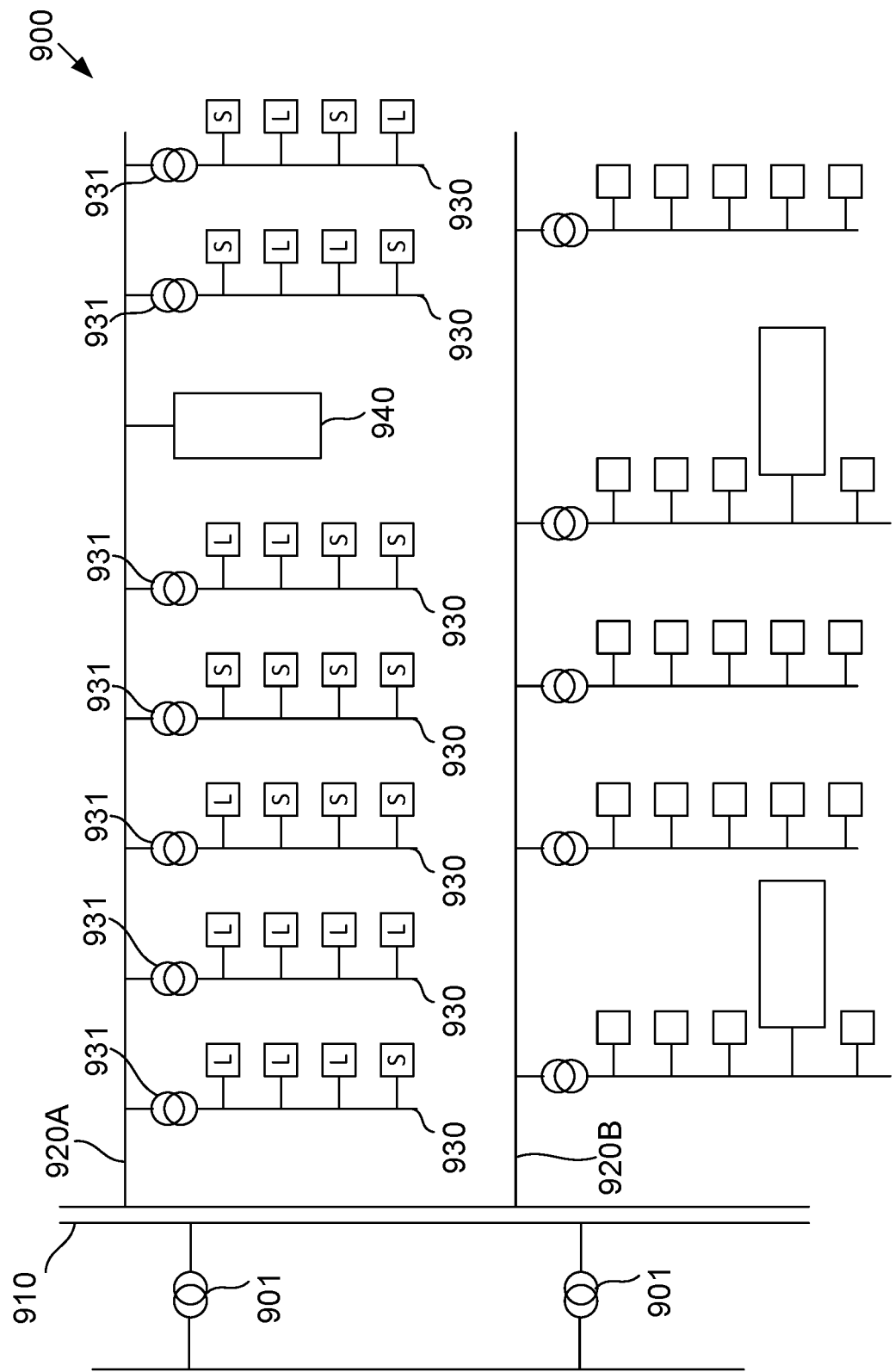
FIG. 9 is a schematic diagram of a two-way electrical power distribution network.

With the electrical power regulating apparatus and the method of regulating electrical power in an electricity transmission network, a two-way grid may be constructed. An example of a two-way electrical power distribution network will now be described with reference to FIG. 9.

A two-way electrical power distribution network 900 includes an electrical power distribution bus 910 connected to high voltage transformers 901.

The voltage on the electrical power distribution bus and the medium voltage electrical power feed lines may be different in different countries or state depending on the existing infrastructure and/or statutory limitations. The voltage on the electrical power distribution bus and the medium voltage electrical feed lines may be at least one of about 5 kV, about 7.2 kV, about 10 kV, about 11 kV, about 12.47 kV, about 15 kV, about 20 kV, about 22 kV, about 25 kV, about 33 kV, about 34.5 kV, and about 35 kV. In the example of Australia, the voltage on the electrical power distribution bus and the medium voltage electrical feed lines is about 11 kV.

A plurality of medium voltage electrical power feed lines 920A, 920B are connected to the electrical power distribution bus 910. A plurality of low voltage distribution lines 930 are connected to each feed line 920A, 920B. The voltage on the low voltage distribution line may be different in different countries or state depending on the existing infrastructure and/or statutory limitations. The voltage on the low voltage distribution line may be at least one of about 220V to 240V, about 100V to 120V, about 400V, and, about 240V. In the example of Australia, the voltage on the low voltage distribution lines is about 220V to 240V.

The low voltage distribution lines 930 are further connected to one or more loads (L) and/or one or more sources (S). In this example, the low voltage distribution lines 930 are connected to the medium voltage electrical power feed lines 920A, 920B via a low voltage transformers 931. The two-way electrical power distribution network 900 includes a medium voltage electrical power regulating apparatus 940 connected to the medium voltage electrical power feed lines 920A to thereby maintain a voltage in the electrical power distribution bus 910 during different load and source conditions.

The medium voltage electrical power regulating apparatus 940 is substantially similar to the electrical power regulating apparatus 100 described above. Accordingly, the medium voltage electrical power regulating apparatus 940 includes a DC contactor having DC terminals configured to be connected to a DC device; a transmission network connector configured to be connected to the medium voltage electrical power feed line 920A. The medium voltage electrical power regulating apparatus 940 includes live terminal(s) connected to live connection(s) of the medium voltage electrical power feed line 920A and a neutral terminal configured to connected to a neutral or earth of the medium voltage electrical power feed line 920A. The medium voltage electrical power regulating apparatus 940 further includes a plurality of switches connected to the DC contactor and one or more electronic controlling devices coupled to the switches. The electronic controlling device(s) controls the switches to selectively connect the DC terminals and the live terminal(s) and the neutral terminal to thereby independently regulate electrical power on each of the live connection(s) and the neutral connection of the medium voltage electrical power feed line 920A and thereby maintain a voltage in the electrical power distribution bus 910 during different load and source conditions.

This arrangement allows the electrical power regulating apparatus to regulate the voltage on the medium voltage electrical power feed line, which thereby maintains the voltage within a statutory limit under various load and generation conditions. In the condition when feed-in/generation is much greater than load consumption, this arrangement allows the medium voltage electrical power feed lines to carry the feed-in/generation while being within the statutory voltage limit and stable. By carrying the large amount of feed-in power stably on the power feed lines, the feed-in power can be exported to a substation or a high voltage network for use. This arrangement further allows the voltage on the power distribution bus to be stabilized or maintained within a limit. Therefore, this arrangement enables more feed-in/generation to be exported while maintaining the voltage on the power distribution bus stable, and thereby a two-way power network is realized.

In addition to the above descriptions, a number of further features will now be described.

In one example, the one or more electronic controlling devices receive a voltage reading of the at least one live connection. The one or more electronic controlling devices may receive the voltage reading every 15-25 milliseconds, every 35-65 milliseconds, every 100-200 milliseconds, every 500-700 milliseconds, every second, or every 2-5 seconds. It should be appreciated that the frequency of receiving voltage readings may be any frequency that a metering system is capable of taking.

The one or more electronic controlling devices subsequently calculate an average of the voltage reading for the at least one live connection. In one example, the one or more electronic controlling devices calculate a moving average of the voltage readings, and the moving average is calculated by averaging voltage readings taken in a window of time. The window may be 2 minutes, 6 minutes, 10 minutes, 15 minutes, or 20 minutes. Additionally, the moving window may also be of a variable length or a constant length.

Upon calculating the moving average, if the average is larger than a predetermined upper value, the one or more electronic controlling devices control the switches to selectively connect the at least one live connection to the DC device and thereby reduce voltage on the at least one live connection. If the average is less than a predetermined lower value, the one or more electronic controlling devices control the switches to selectively connect the at least one live connection to the DC device and thereby increase voltage supplied on the live connection.

This allows the electrical power regulating apparatus to frequently monitor the voltage on one or more of the live connections on the medium voltage electrical power feed line and effectively regulate the voltage on one or more of the live connections.

In one example, the predetermined upper value is about 5% above a nominal value, and the predetermined lower value is about 5% below a nominal value. It should be appreciated that the predetermined upper or lower value may be of any value, and they may be based on the system capability and/or statutory limitations.

In one example, the one or more electronic controlling devices may increase the voltage by increasing a reactive power and/or decreasing a real power. In another example, the one or more electronic controlling devices may decrease the voltage by increasing a real power and/or decreasing a reactive power. In another word, the one or more electronic controlling devices may control the apparatus to generate leading reactive power or lagging reactive power that in turn increase or decrease a reactive or a real power.

In another example, the low voltage distribution line is connected to a low-voltage electrical power regulating apparatus. This allows a voltage on the low voltage distribution line being regulated, which may further facilitate regulating the voltage on the medium voltage electrical power feed line.

In one example, the medium voltage electrical power feed line is a multi-phase transmission network and the one or more electronic controlling devices are configured to alter the voltage of multiple live connections independently of each other. This allows voltage on each phase to be regulated independently without the need to balance between the phases. This further expand the ability for the two-way power distribution network to be stable under various load conditions and/or generation/feed-in conditions.

In one example, the medium voltage electrical power regulating apparatus is configured to be connected to the medium voltage electrical power feed line at an optimal position.

In one example, an accumulated voltage differential from a high voltage connection to the optimal position is about 40% to 60% of a total accumulated voltage differential along the medium voltage electrical power feed line.

In one example, an accumulated voltage differential from a high voltage connection to the optimal position is about 50% of a total accumulated voltage differential along the medium voltage electrical power feed line.

In one example, the total accumulated differential voltage may be an average of at least one of: a total accumulated voltage differential at maximum feed-in; a total accumulated voltage differential at minimum feed-in; a total accumulated voltage differential at minimum load; a total accumulated voltage differential at maximum load; a total accumulated voltage differential at maximum feed-in and minimum load; and a total accumulated voltage differential at minimum feed-in and maximum load.

Distribution Feeder Voltage Differential Due to Load and Embedded Solar Generation Equation 1 can be developed to simulate the drop or rise in voltage along an 11 kV feeder backbone due to the load utilization and solar generation at any point in time. Changing the number of nodes ($d_{max}$) while keeping the total feeder length the same allows for a more granular analysis.

$$V = Vs - Z\left(\frac{U_t \times U_U \times C_d \times 1000}{100 \times \sqrt{3} \times V_l}e^{-j\theta_1} - \frac{U_s \times S_p \times 1000}{100 \times \sqrt{3} \times V_l}e^{-j\theta_s}\right) \quad \text{Equation (1)}$$

$$\sum_{d=0}^{d_{max}}(d_{max} - d),$$

where V=Line to ground voltage at section d;
$V_s$=Line to ground voltage at sub (11 kV bus);
Z=Feeder impedance in Ohms/Ph/section R+jX;
$U_t$=Utilization of transformer as % of peak daily utilization;
$U_U$=Transformer average utilization in %;
$C_d$=Capacity density in kVA/section (transformer installed capacity);
$V_l$=Nominal line-line voltage in kV;
$\theta_l$=Load phase angle;
$U_s$=Percentage of peak solar insolation (solar radiation reaching a given area);
$S_p$=Solar kVA capacity per distribution transformer;
$\theta_s$=Generation phase angle;
$d_{max}$=Maximum number of feeder sections;
d=Section number.

Voltage Differential Through a Distribution Transformer

The distribution transformers are assessed as an impedance with a net current through them due to either load or solar export.

$$V = Vs - Z\left(\frac{U_t \times U_U \times C_d \times 1000}{100 \times V_s}e^{-j\theta_1} - \frac{U_s \times S_p \times 1000}{100 \times V_s}e^{-j\theta_s}\right) \quad \text{Equation (2)}$$

where V=Phase to ground voltage at section d
$V_s$=Nominal phase to neutral voltage assuming 1.0 pu on the HV
Z=Transformer impedance in Ohms (R+jX)
$U_t$=Utilization of transformer as % of peak daily utilization
$U_U$=Transformer average utilization in %
$C_d$=Capacity density in kVA/section (transformer installed capacity)
$\theta_l$=Load phase angle
$U_s$=Percentage of peak solar insolation (solar radiation reaching a given area)
$S_p$=Solar kVA capacity per distribution transformer
$\theta_s$=Generation phase angle Voltage Differential Along a Low Voltage Circuit The LV feeder is split into sections with each section allocated 4 customers, averaged over three phases. Overhead (OH) conductor is assumed to be LV ABC or Moon, and underground (UG) is assumed to be 240 mm² Al. The voltage along a low voltage circuit is given by:

Equation (3)

$$V = Vs - Zs\left(\frac{U_t \times \frac{4}{3} \times D_{ad} \times 1000}{100 \times V_l}e^{-j\theta_1} - \frac{U_s \times \frac{4}{3} \times S_p \times 1000}{100 \times V_l}e^{-j\theta_s}\right)\sum_{d=0}^{d_{max}}(d_{max} - d),$$

where
V=Line to ground voltage at section d
$V_s$=Line to ground voltage at distribution transformer low voltage terminals
Zs=Feeder impedance in Ohms/Ph/span (OH) or Ohms/Ph/Section (UG) as R+jX
$U_t$=Utilization in percent (percent of ADMD based on load curve)
$D_{ad}$=ADMD in kVA per household, assuming single phase loads
$V_l$=Nominal phase-phase voltage in kV $\theta_l$=Load phase angle
$U_s$=Percentage of peak solar insolation (solar radiation reaching a given area)
$S_p$=Average solar kVA capacity per customer connection, solar kVA/customers/feeder
$\theta_s$=Generation phase angle
$d_{max}$=Maximum number of LV sections. 5 for OH, 9 for UG where street frontage is 30 metres
d=Section number $$Zs = 2 \times S_f \times \frac{Z}{1000},$$

Z is LV line impedance in Ohms/Ph/km, $S_f$ is average street frontage in metres The three formulas can be joined by replacing the first voltage value ($V_s$) of Equation 2 and with the desired section V of Equation 1 and the first voltage value ($V_s$) of Equation 3 with the calculated V of Equation 2 to calculate the total voltage drop/rise from the 11 kV bus down to the end of a selected LV circuit at any section of the feeder backbone.

The following assumptions were made when simulating MV and LV feeders:
- Equation 1 and Equation 3 require the feeder to be split into equal sections, with each section allocated a distribution transformer. For accuracy a section length of 400 m or less is required for the MV feeder. For the LV feeder a typical section length would be the average span between poles. This is typically twice the average street frontage in residential estates. A typical street frontage (size of plot) is 30 m, which makes each LV section 60 m long. Most LV runs are approx. 300 m for OH conductors or 540 m for UG conductors, assuming and ADMD of 3 to 4 kVA per household. The distribution transformer can be set to the size of the average transformer on the MV feeder (total installed capacity divided by number of transformers), or a "typical" size if generic calculations are being performed. A common distribution transformer size is 315 KVA.
- For the purposes of this analysis, it is assumed that the feeder is constructed with the same conductor over its entire length.
- Solar penetration is assumed equal across all transformers on the studied distribution feeder, for example, at 10% solar penetration, all transformers have 10% solar penetration.
- Load utilization is assumed equal across all transformers on the studied distribution feeder.
- Load and solar power factors are assumed equal at all transformers. Load power factor varies depending on region, but 0.95 pf is fairly typical in residential areas. Solar PV was generally set to unity pf, at the onset of growth in solar PV generation.
- All distribution transformers are assumed to have 4% impedance with an X/R ratio of 10. Transformers assumed at tap 5 (nominal) as most of installed transformers are recorded as tap 5.
- Each distribution transformer will typically have at least 2 LV circuits (Thus load or generation on one circuit is half of the transformers current load/generation).

Line Drop Compensation Using Reactive Power

The voltage drop across a transmission line is given by $\Delta V = I \cdot Z \cos(\theta - \emptyset)$, and this can be set to zero if the angle $(\theta - \emptyset) = \pm 90°$; that is by setting the load angle to lead or lag the source or line impedance angle by 90°.

Where the source impedance is dominated by the reactive component, such as at a zone substation bus, the reactive component required to cancel the resistive voltage drop is small, and the leading power factor is very close to unity.

Where the source impedance X/R ratio is closer to unity, such as for an 11 kV feeder, the required leading reactive component to compensate the resistive voltage drop approaches the real power component in magnitude, and the required power factor falls to 0.8 (leading), as shown in the table below.

| | Typical zone substation impedance at the 11 kV bus | Vertical Delta Rural (VDR) with moon at 50° C. |
|---|---|---|
| Impedance of the bus or line, R + jX | 0.15 +j 0.91 Ω | 0.26 + j 0.35 Ω (per km) |
| X/R ratio of bus or line | 6.11 | 1.33 |
| tan X/R (impedance angle) | 80.7° | 53° |
| Required tan(Q/P) = cos(P/S) to compensate bus or line voltage drop | −9.3° | −37.0° |
| Q/P ratio to compensate bus or line volt drop | −0.16 | −0.75 |
| PF required to compensate bus or line volt drop | 0.99 leading | 0.80 leading |

If the load is in fact a generating source (such as a grid connected PV system), then the voltage rise which results from power injected back up the feeder can be compensated by the PV system absorbing VARs, i.e. operating with a leading power factor. A real system may include local load in parallel with embedded PV generation, and depending on conditions may result in reduced demand or perhaps power reversal. In these examples, the actual power factor of the load may be much closer to unity, since only partial voltage drop compensation is required. The existing LDC incorporated into the tap-changer at the substation can be relied upon for the slowly varying load.

The Impact of Distributed Solar PV Generation

Figure 10A:
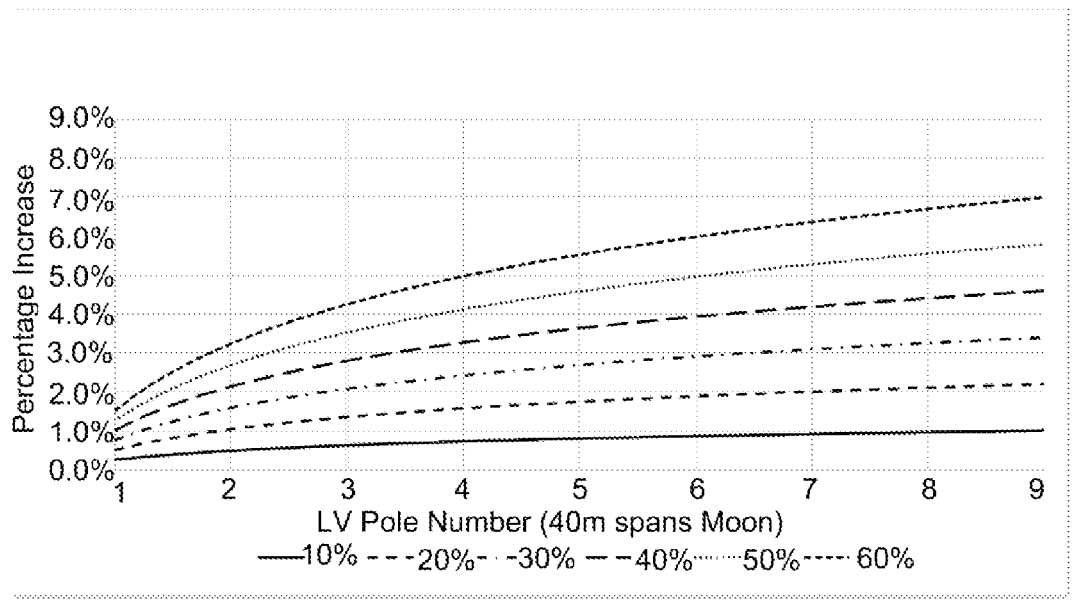
FIG. 10A is a graph illustrating solar power impacts on a low voltage overhead distribution network.
Figure 10B:
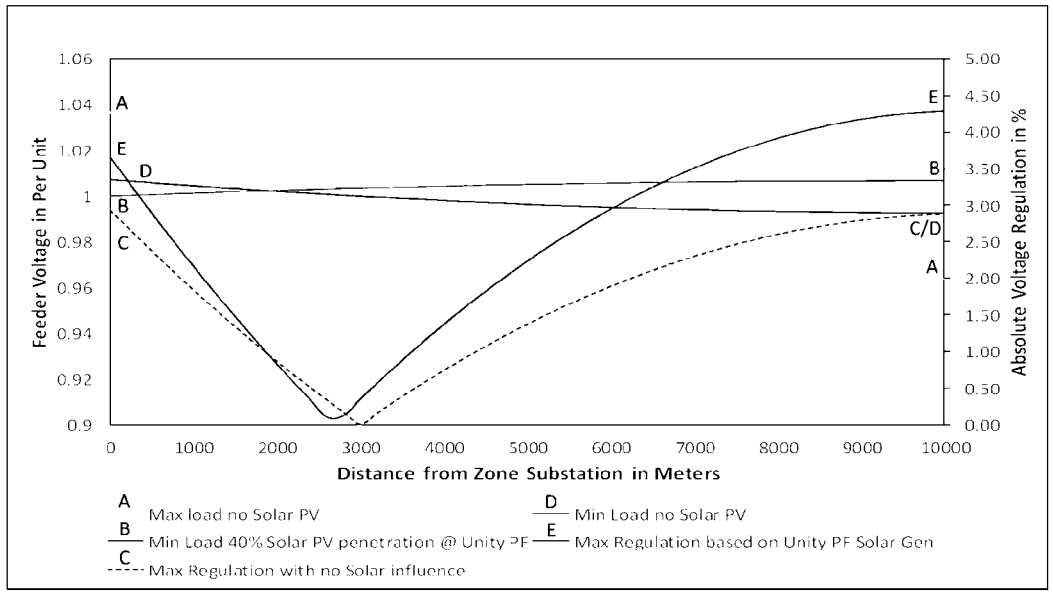
FIG. 10B is a graph illustrating solar power impacts on a medium voltage overhead distribution network.
Figure 10C:
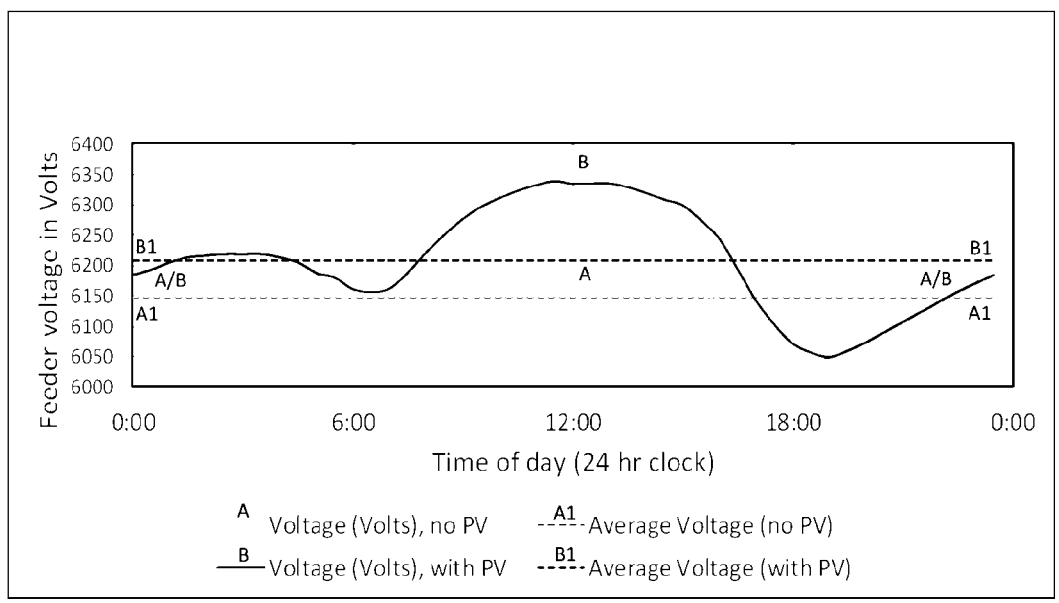
FIG. 10C is a graph illustrating solar power effects on voltage profile.

Based on the above equations, a model may be developed to identify the impacts of solar PV generation. The model shows that residential solar PV generation results in a voltage rise on the LV network of approximately 1.15% for each 10% of solar PV penetration, which may not be linear. The solar PV penetration (in %) is based on the quotient of the aggregate solar PV inverter capacity in KW in a LV supply area, and the distribution transformer capacity in kVA supplying that area. This is shown in FIG. 10A. The medium voltage network may experience a little over 0.5% voltage rise per 10% of solar PV penetration, as shown in FIG. 10B. The impact of solar PV penetration results in a very different voltage profile, particularly at the end of feeders/circuit. The voltage profile at the end of a modeled 11 kV feeder is shown below in FIG. 10C as an example. A summary table below gives an indication of the overall effect, and how it is constituted.

| Solar Penetration | 10% | 20% | 30% | 40% | 50% | 60% |
|---|---|---|---|---|---|---|
| 11 kV Voltage Rise | 0.53% | 1.06% | 1.59% | 2.12% | 2.64% | 3.17% |
| Transformer VR | 0.40% | 0.80% | 1.20% | 1.60% | 2.00% | 2.40% |
| LV Voltage Rise | 1.08% | 2.18% | 3.32% | 4.49% | 5.70% | 6.93% |
| Total | 2.01% | 4.04% | 6.10% | 8.21% | 10.34% | 12.50% |

The impact of this, if unmitigated, may result in voltage limit exceedances in most networks by the time solar PV penetration reaches approximately 30%.

The electrical power regulating apparatus is a capable of and suitable for use as a battery energy storage system management tool, as solar PV generation interface, and as a distribution system voltage management apparatus. Its ability to manage distribution system voltages can be validated by the calculation and modeling described above. This also allows distribution system engineers to determine appropriate sizes and locations to implement the apparatus in order to best mitigate the impacts of solar PV generation.

An example of the method of regulating electrical power will now be described. In this example, reactive power management is used to regulate voltage in electricity transmission network which is based on engineering formula given below.

Both real power (P) and reactive power (Q) affect voltage, and their influences are proportional to the network resistance (R) and reactance (X), respectively. At a location where the network voltage is V the voltage change in a network segment depends on real and reactive power at a customer's connection point according to $$\Delta V \approx \frac{PR + QX}{V}$$

This approximation is valid when the network voltage is large compared to the voltage change, and it assumes a balanced three-phase distribution line. The sign convention is that direction of power flow is towards the customers, that is, P>0 for a load and P<0 when solar generation exceeds load.

Using both P and Q the voltage can be set at a desired level, perhaps according to a conservation voltage reduction (CVR) strategy to reduce power consumption from resistive loads, or perhaps by some other policy. For a completely flat voltage profile, the voltage change can be made zero by setting reactive power so that $$Q\frac{X}{R} = -P$$

To counteract voltage fall (P>0) the customer should supply leading reactive power, i.e. Q<0, like a capacitor. Similarly, to counteract voltage rise (P<0) the customer should consume lagging reactive power, i.e. Q>0, like an inductor.

The influence of the reactive power is thus amplified or diminished by the X/R ratio of the distribution line. This is the ratio of (inductive) reactance per unit length to the resistance per unit length and a range of values are encountered in practice. Higher-voltage distribution and transmission lines may have higher X/R ratios.

Voltage Management on Low Voltage and 11 kv Networks

A radial LV network with typical equipment and loads for an urban network is used to demonstrate the method of regulating electrical power. The results are displayed as a percentage of the distribution transformer terminal voltage which is assumed to be 240±6% VAC.

Figure 11:
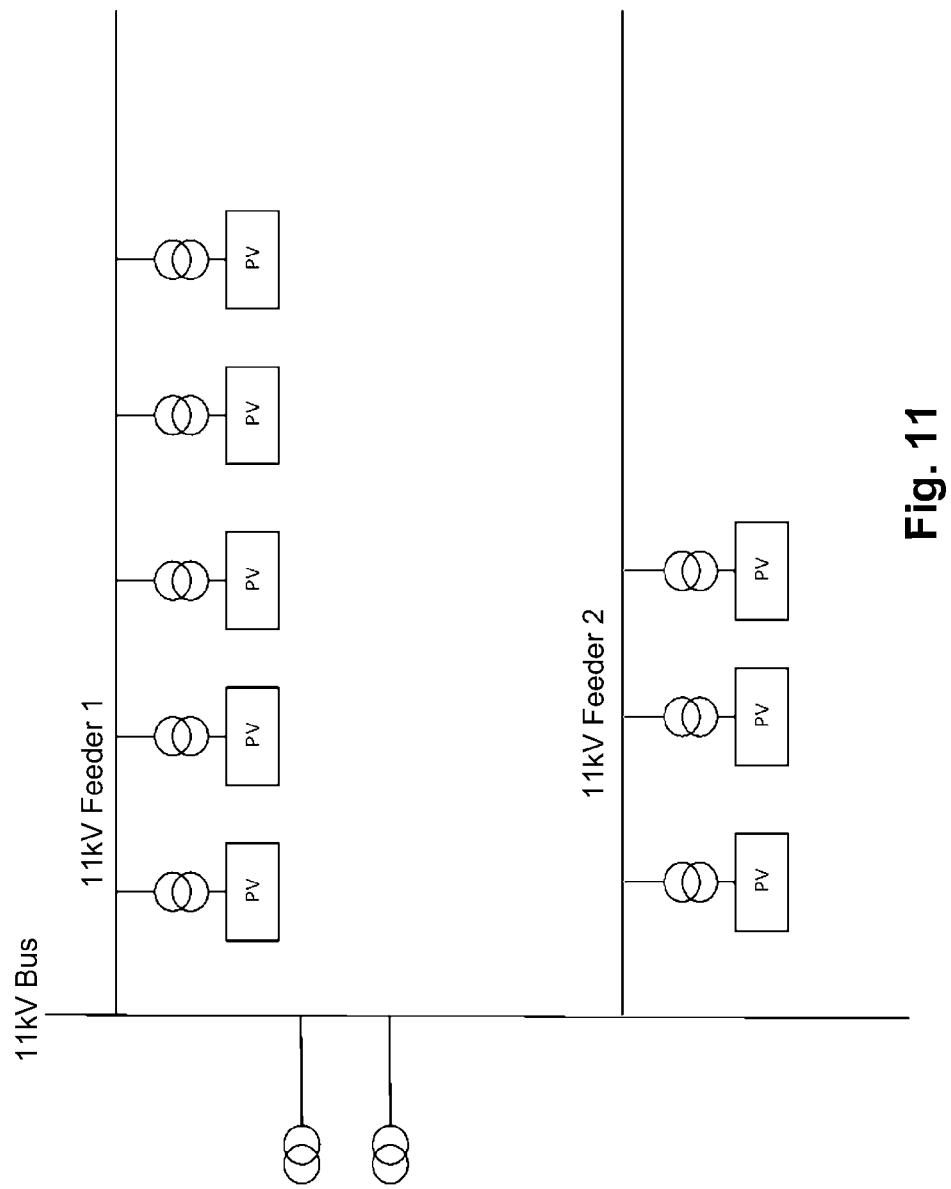
FIG. 11 is a schematic diagram of a low voltage transmission network.

FIG. 11 shows a distribution network consisting of a substation supplying an 11 kV feeder with several distribution transformers with associated LV networks. This network with a single supply source is representative of all networks in Australia. All state jurisdictions require that low voltage be maintained at 240±6% VAC or 230+10% or 230−6% VAC. The substation and distribution transformers have a tapped winding which allows the transformer to output a higher voltage than the nominal 240/230VAC to compensate for the voltage drop with increasing load. The substation transformer has an on-load tap-changer which varies the 11 kV bus voltage with load (i.e. increases 11 kV voltages as load increases). The distribution transformer has an off-load tap-changer. The voltage can only be varied by changing the tap setting with no load. The tap is usually set at installation and can only be changed with a LV area outage.

The effect of PV generation distribution network voltages can be demonstrated by engineering voltage calculations. An OH distribution transformer will have between 1-4 low voltage circuits. Each circuit can be up to 300-400 m in length. Using a simple OH radial network with 10 load points to represent customer loads at 40 m intervals on a 315 kVA transformer, the voltage profile along the circuit can be calculated for various customer loads, solar PV generation, VARS and battery storage. In this example, reactive power management is implemented through the use of the electrical power regulating apparatus on the distribution or at the customer premise.

Voltage Regulation of DER Generation

Figure 12A:
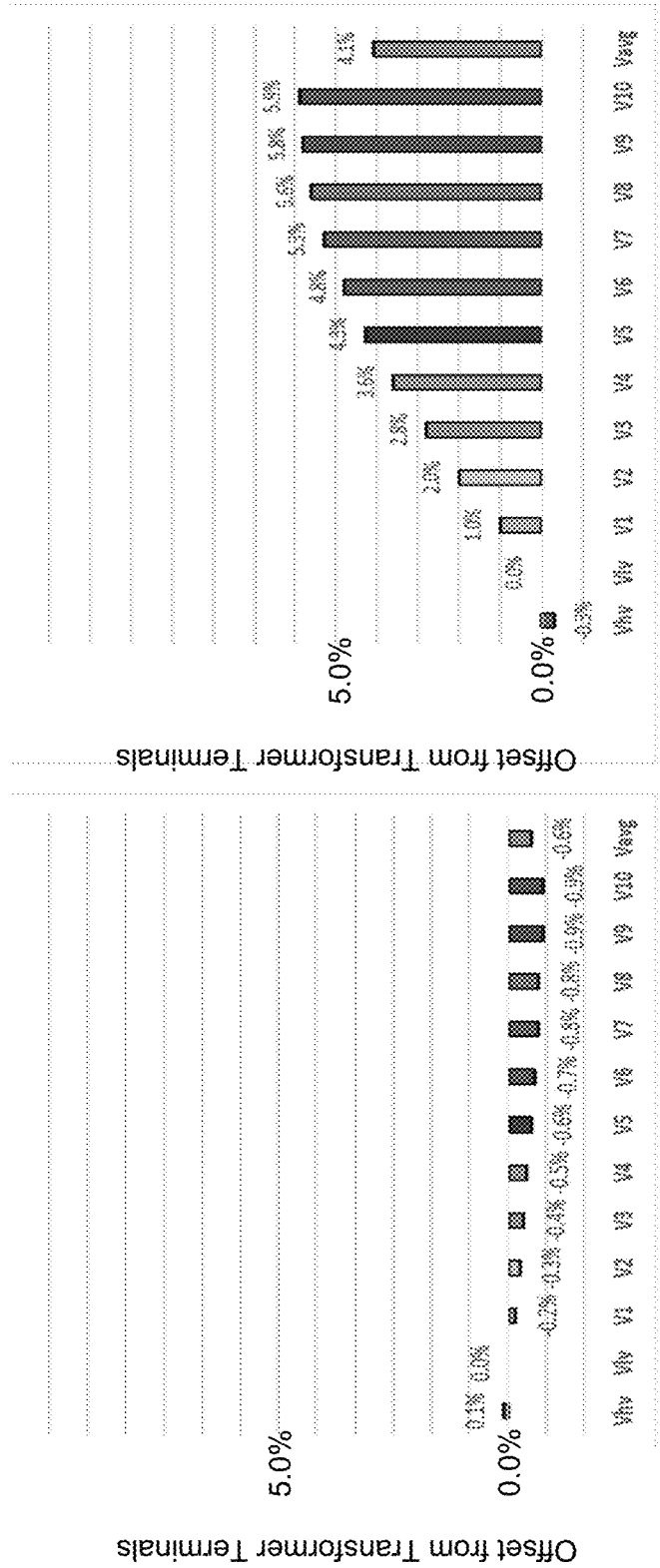
FIGS. 12A and 12B are voltage profile diagrams along an overhead circuit.
Figure 12B:
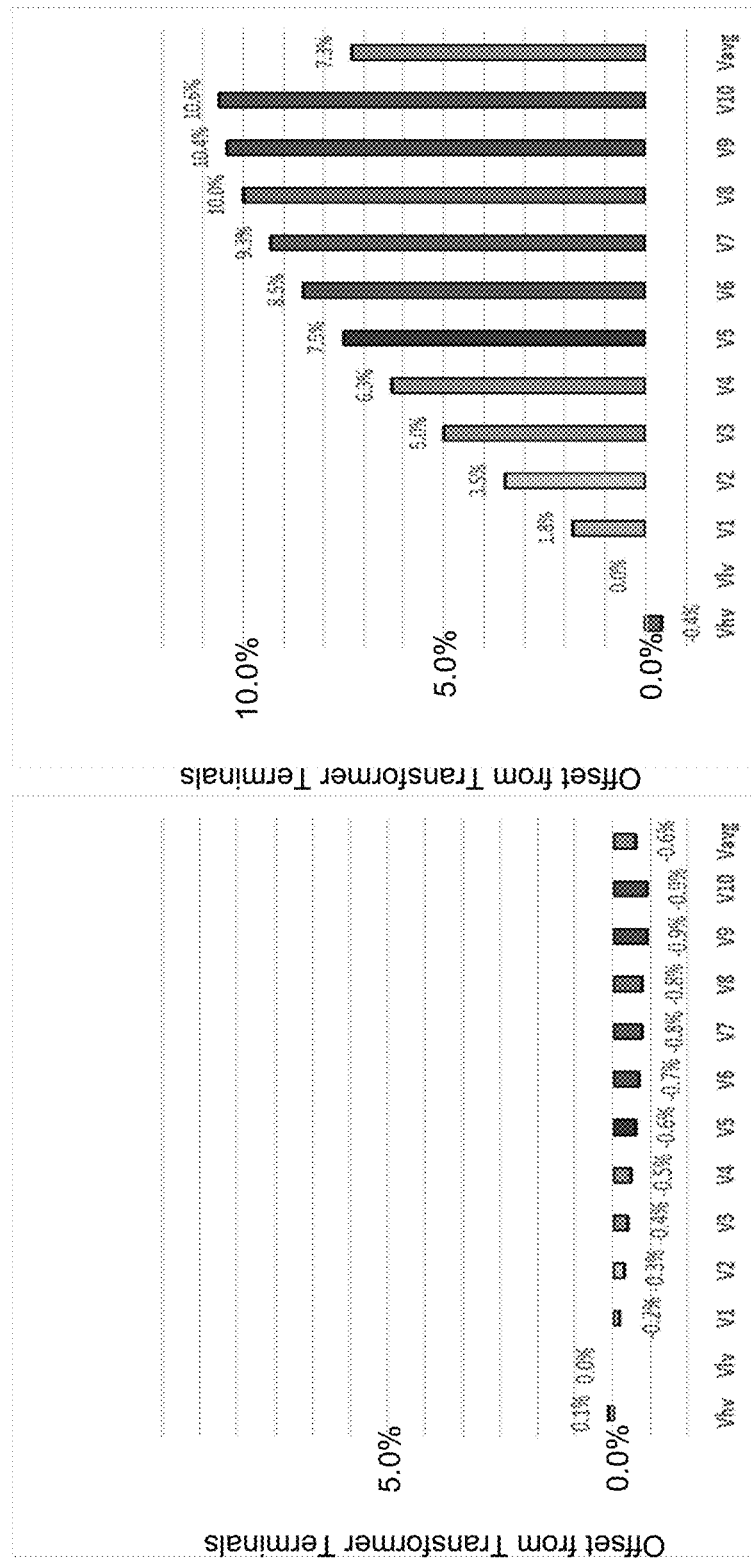

To determine the effect of PV generation on the same network, 5 kW of PV generation is applied at each customer with a minimal daytime load of only 0.5 kW at 0.97 PF. The ADMD of a residential is usually between 0.3 and 1 kW during the middle of the day. FIG. 12A below shows the resultant voltage profile. The voltage profile has reversed from a voltage decrease to a voltage increase. PV generation in excess of 6 kW per customer would see the voltage rise above regulatory limit of +6%. The PV generation is 19% of the transformer rating. Several distribution utilities have set the maximum at 25% of the distribution transformer rating to limit excessive voltage rise. FIG. 12B shows the voltage rise when the PV generation is increased to 10 kW per customer and the total generation is 32% of distribution transformer rating. Increasing the PV generation increases the steady state voltages along the LV circuit. The houses at the end of the circuit/feeder have the highest voltage rise.

Figure 13A:
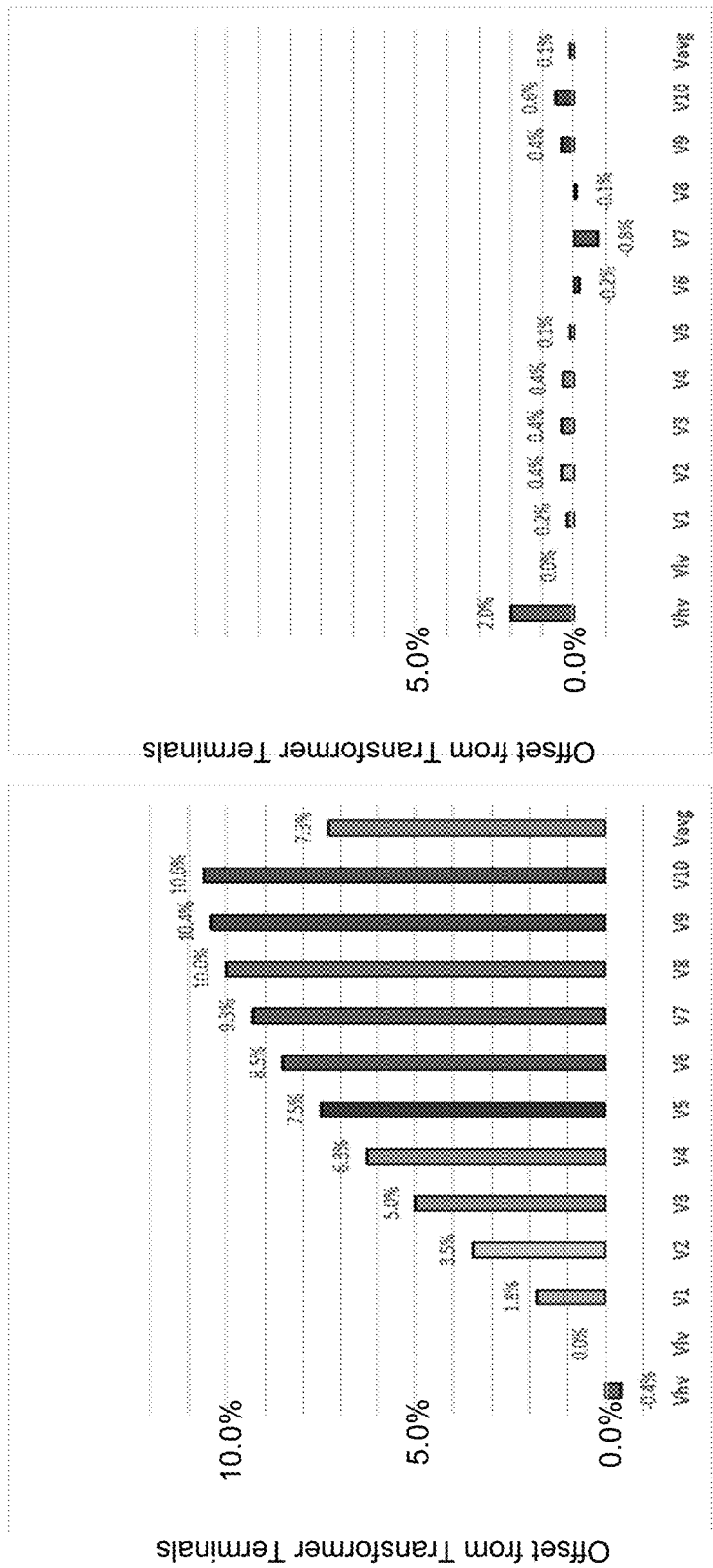
FIGS. 13A and 13B are voltage profile diagrams along an overhead circuit with voltage regulation.

The voltage profile can be improved markedly by adding lagging reactive power at an optimum position, which is a position within the network at which minimal voltage changes can ensure the entire network remains within desired operating limits. FIG. 13A shows the voltage rise along the circuit with the same load and generation as illustrated in FIG. 12B with 50 kVAR of lagging VARs. The voltage profile has improved significantly with all customer voltages with statutory limits and an almost ideal uniform voltage profile along the circuit. The addition of lagging VARs has allowed solar PV generation of 32% of distribution transformer while maintaining statutory voltage regulation.

Figure 13B:
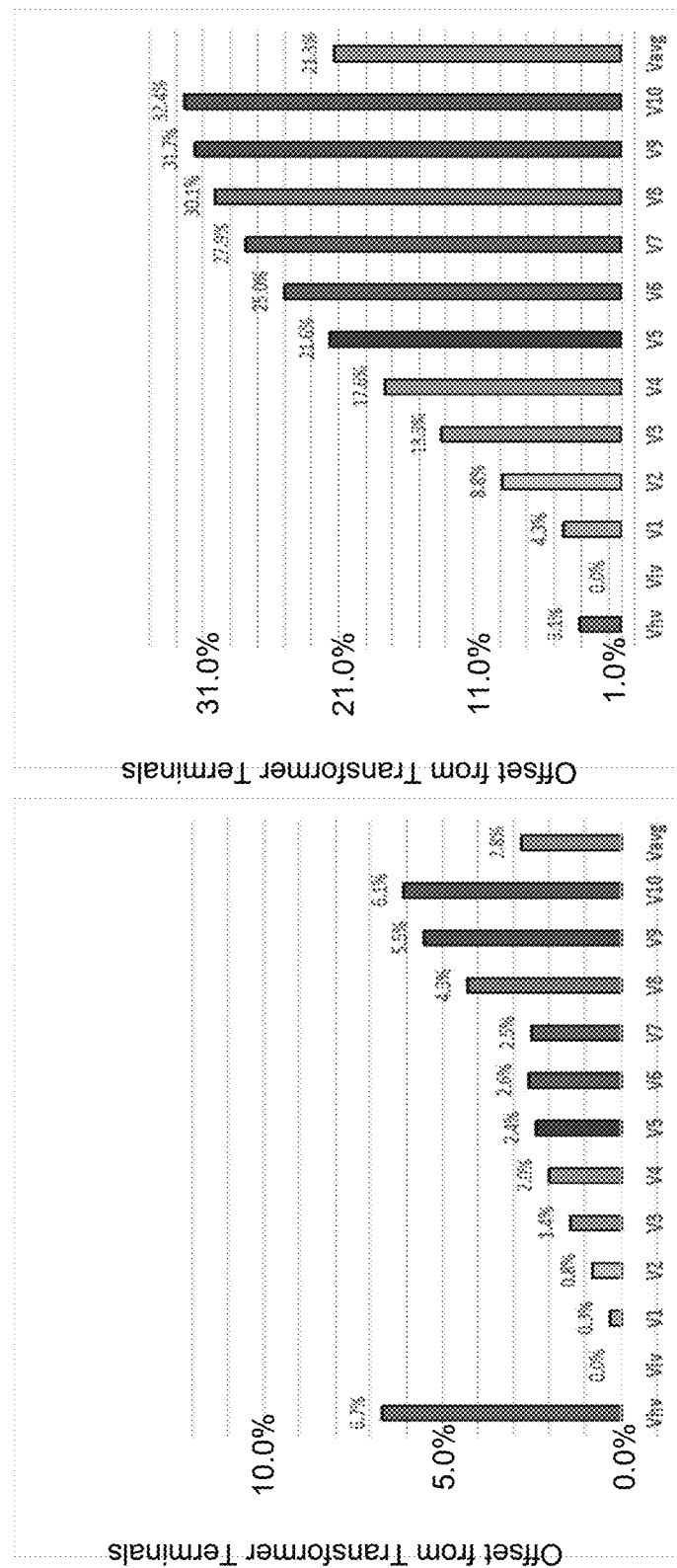

FIG. 13B shows that PV generation of 95% can be exported into the LV network without breaching voltage regulation limits of +6%. Without VAR compensation the voltage would rise 32% above nominal. With lagging VAR compensation at the optimum position the maximum voltage rise is 6% above nominal within the statutory limits. Full PV generation may be achieved by either having 100 kVAR lagging at an optimum position or by charging batteries with a load of 180 kW.

Underground Circuits

Figure 14A:
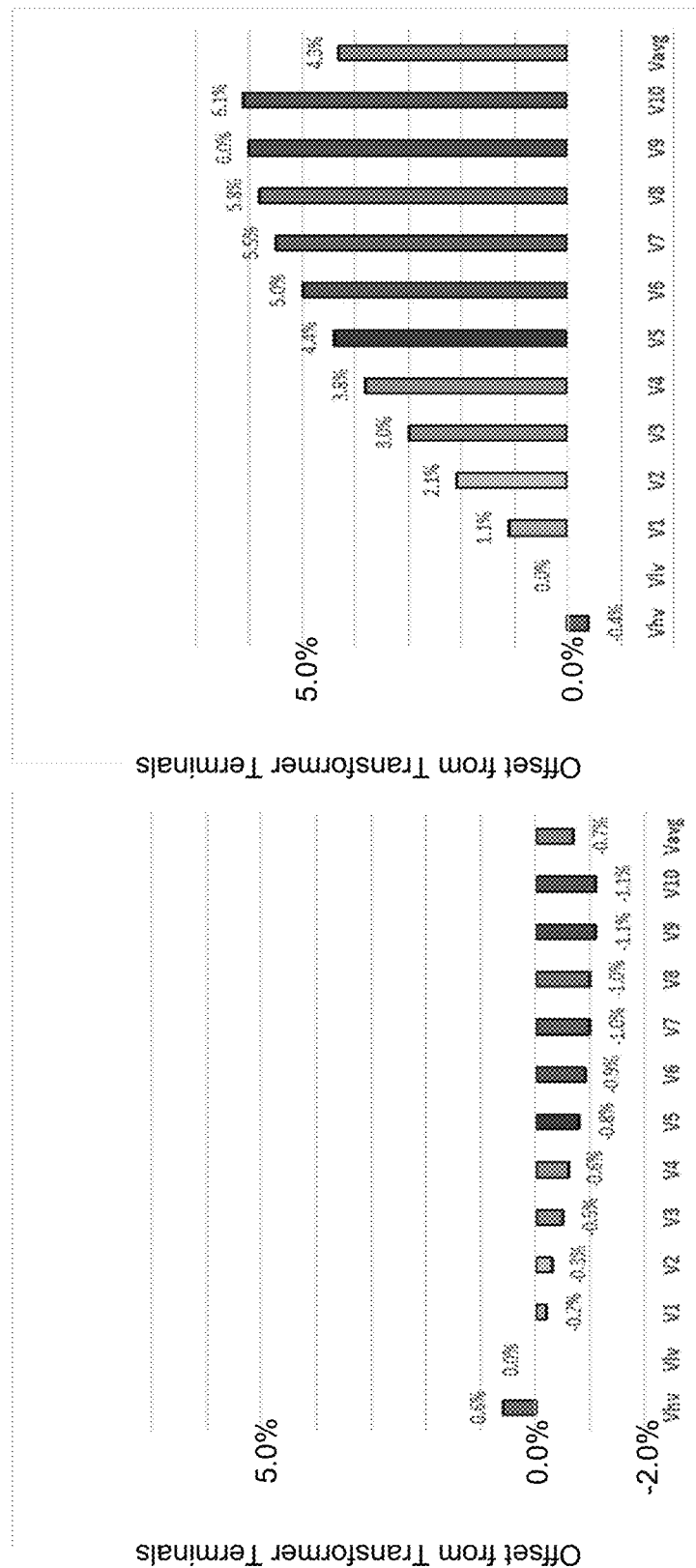
FIG. 14A and 14B are voltage profile diagrams along an underground circuit.
Figure 14B:
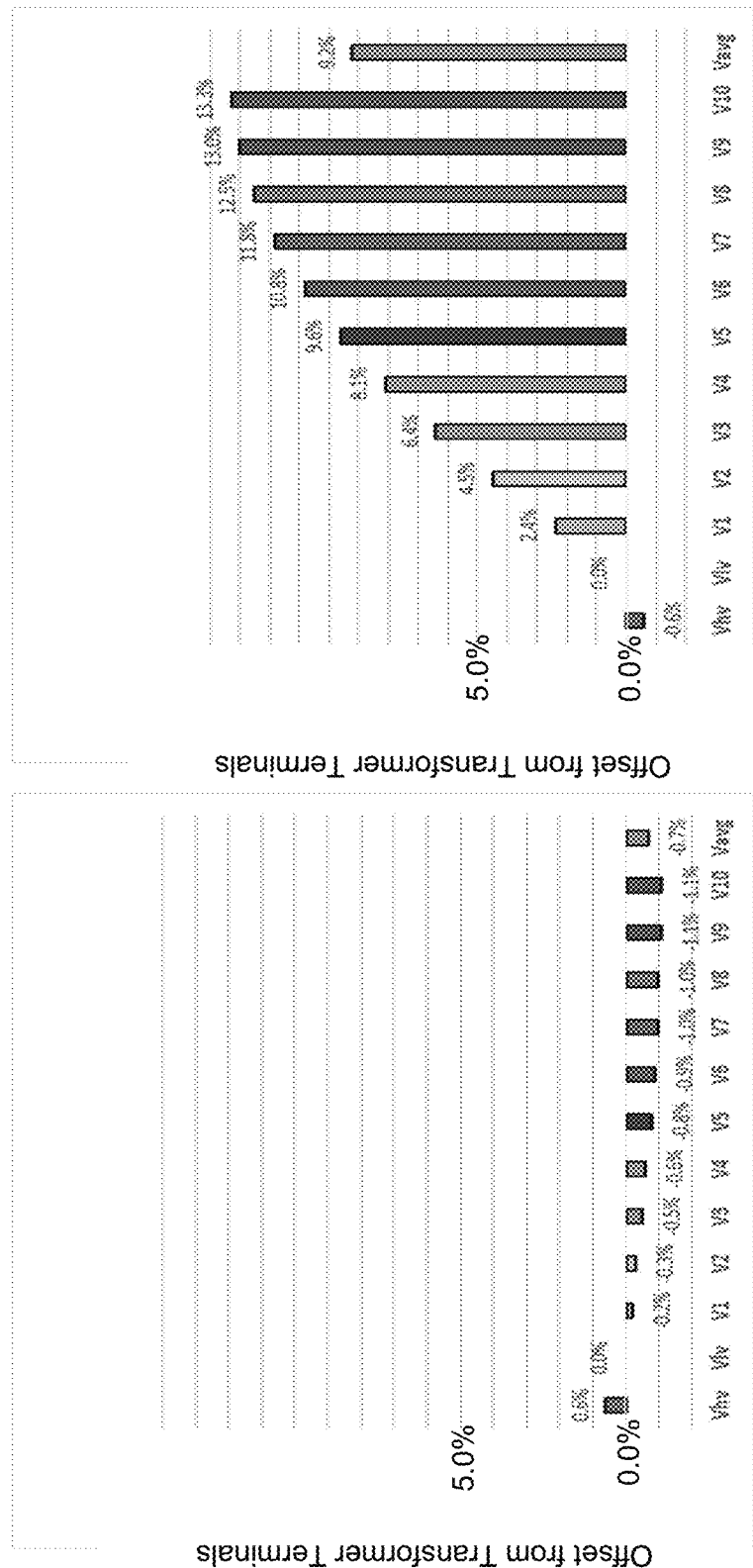

A typical three-phase UG distribution transformer will be 500 kVA (4% impedance) and have up to 4 LV circuits of 240 mm² 4 C Al sectored XLPE. The following analysis is for UG LV distribution circuits. Similar results are obtained for OH circuits. FIG. 14A shows that 10 kW of PV generation per house is required to exceed the voltage regulation limit of +6%. The reason the higher generation threshold is that UG circuits have a lower impedance and X/R ratio compared with OH circuits. The PV generation at this condition is 20% of the DT rating which is similar to the OH threshold of 19%. FIG. 12B shows the voltage profile when the PV generation is at 40% of the DT rating. The voltage rise to 13% above nominal.

Figure 15A:
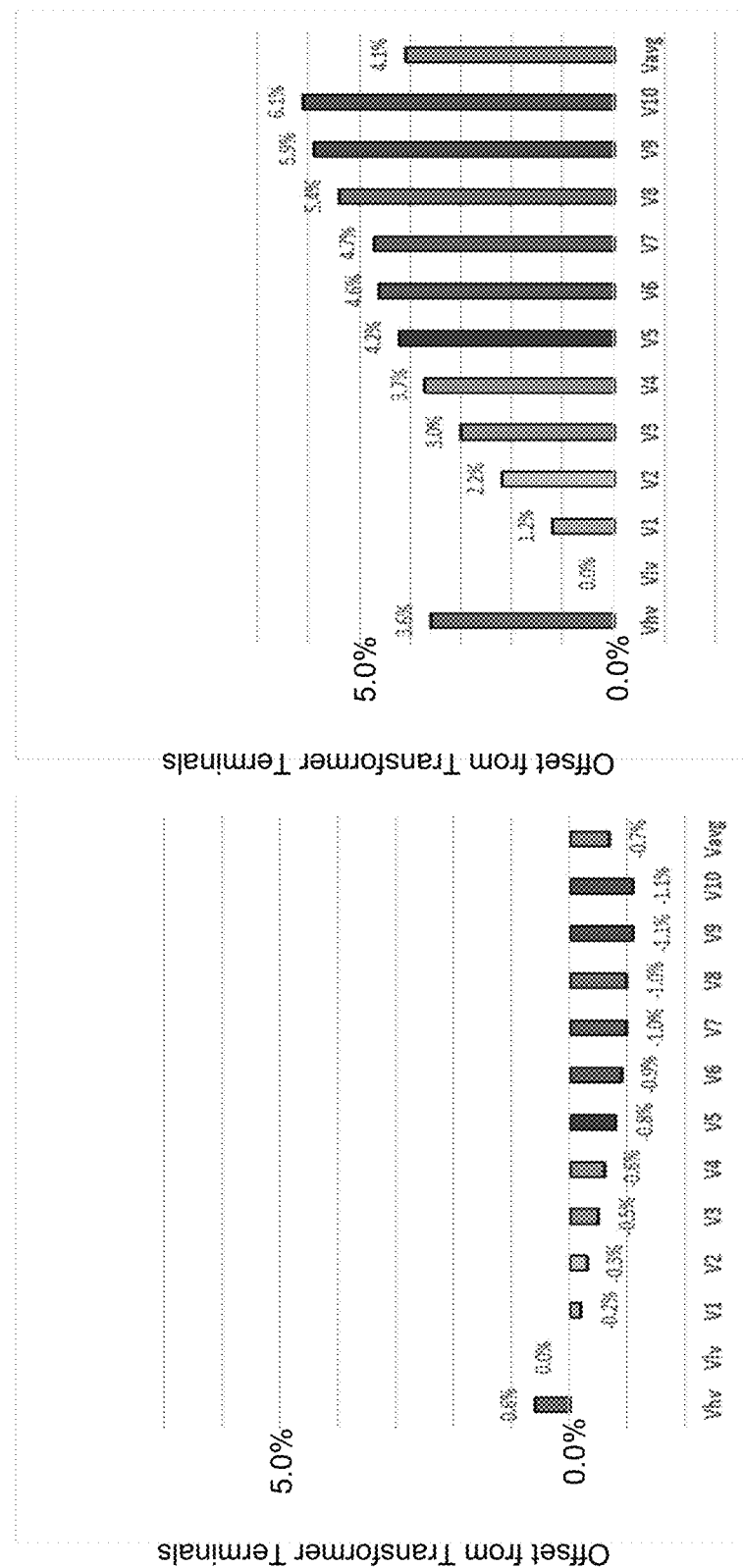
FIGS. 15A and 15B are voltage profile diagrams along an underground circuit with voltage regulation.
Figure 15B:
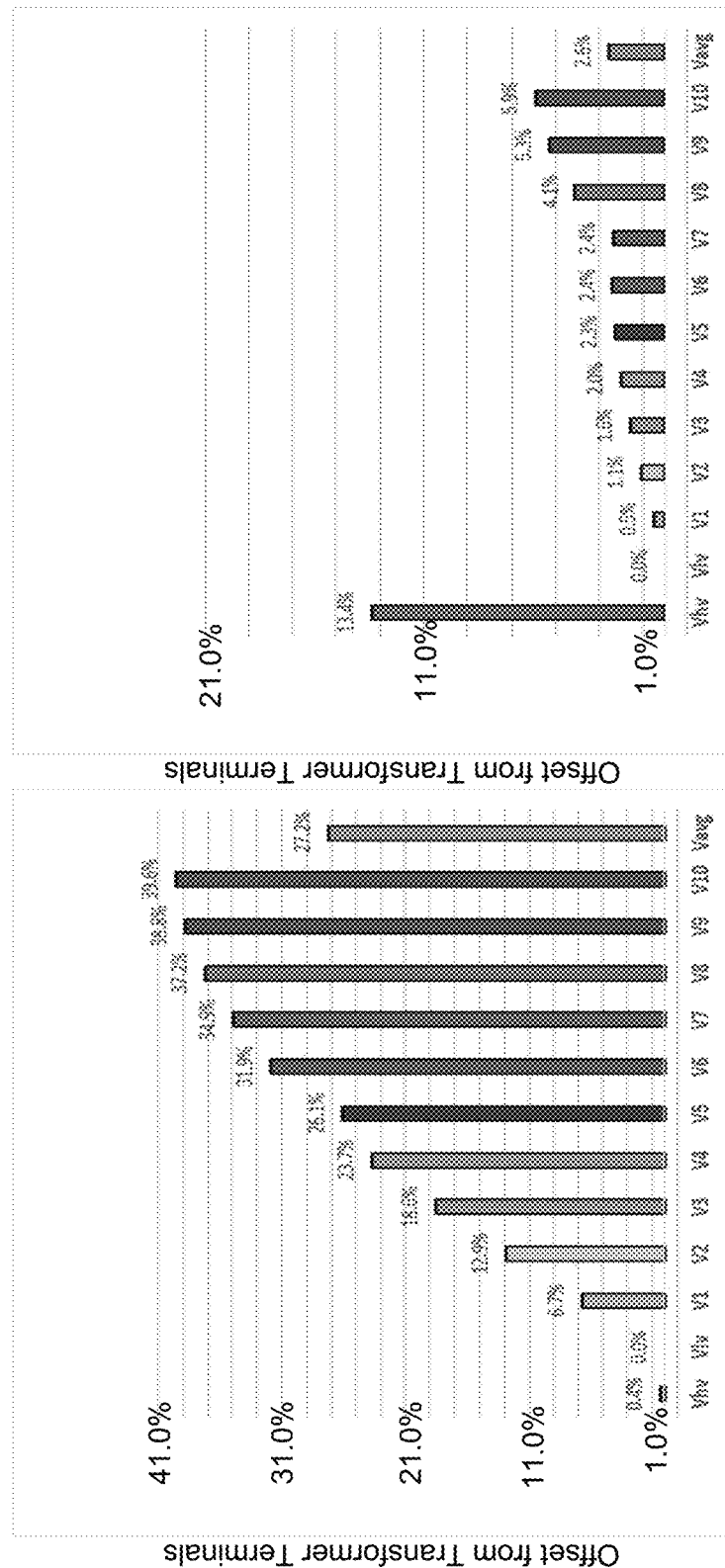

FIG. 15A shows that 140 k VAR lagging compensation is required to bring the voltage back into proper regulation. The lagging compensation is usually higher when compared to OH circuits due to the capacitive characteristic of UG cables. With PV generation at 100% of the distribution transformer rating, the voltage rises to 40% above nominal significantly exceeding the statutory limits. FIG. 15B shows the voltage profile after 424 kVAR lagging compensation is added at the optimum position along the feeder/circuit. The lagging compensation brings the maximum voltage to with statutory limits.

Voltage Management on 11 kV Feeders

VAR management can be shown to produce similar results for all types of 11 kV feeders. The VAR quantum will vary depending on the impedances of the feeders involved. For an 11 kV feeder, the distribution transformer inductance will need to be added to the X of the conductor. Therefore, more VARs may be required to manage the voltage along the 11 kV feeder. Managing 11 kV voltage from the LV is a much more economical solution than using the electrical power regulating apparatus for high voltage (7 KV). The costs for electronic components rise exponentially with voltage. The electrical power regulating apparatus connected to the LV terminals of a distribution transformer to regulate 11 kV voltage may be the most economical solution.

Placement of the Electrical Power Regulating Apparatus

There are many ways to deploy VAR management to maintain network voltage within statutory limits. Placing the electrical power regulating apparatus for VAR sinking/generation either behind the meter at the customer premise or in front of the meter on the DNSP network will achieve the same outcome. The above analysis was perform with the electrical power regulating apparatus placed at the optimum position for regulating voltage for all customers on a single circuit/feeder. The alternative is distributed VAR sinking/generation at each customer. This method may be preferred by DNSP by mandating the application of Volt/VAR and Volt/Watt facilities of smart inverters compliant with AS4777.2.2015.

Voltage Regulation for Peak Loads

Figure 16:
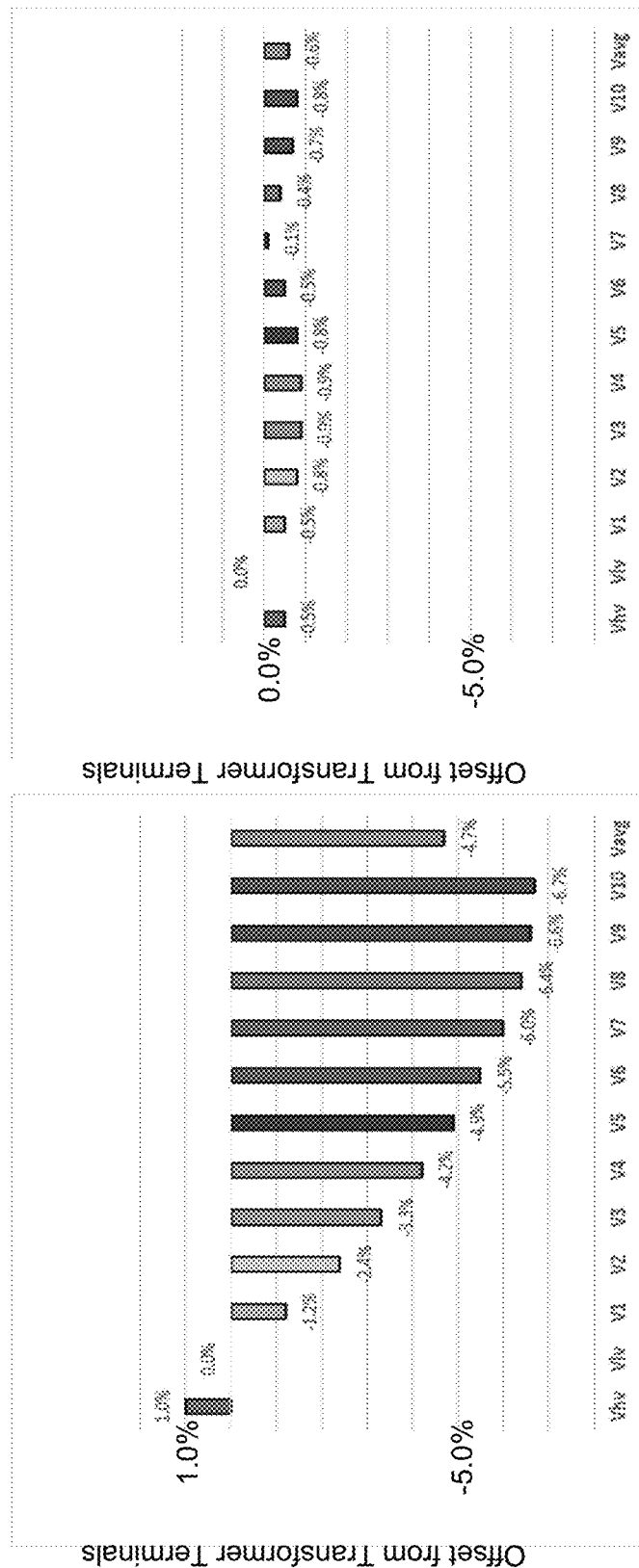
FIG. 16 is a voltage profile diagram down a radial overhead circuit.

FIG. 16 shows the voltage profile along a radial of the LV circuit with an After Diversity Maximum Demand (ADMD) of 5 kW with a power factor of 0.97. The profile is representative of one way grid with typical voltage drop along the circuit. The voltage is just within the prescribe regulation of −6%. The voltage drop can be improved with the generation of leading VARs to compensate for the inductive feeder impedance and load.

By turning the electrical power regulating apparatus into a VAR generator (leading VARs) the voltage on the circuit/feeder can be regulated to stay within statutory limits. The production of leading VARs to bring the demand to unity PF can be used for demand management by bringing the demand to unity power factor. In Australia, even with large penetrations of solar PV the network system peak has not changed and is still in the early evening outside of solar hours. The electrical power regulating apparatus can regulate network voltages outside of solar hours and assist with reducing the peak demand.

Generally, the local system peak is occurring outside of solar hours and voltage drop is still a major concern of all DNSPs. The application of the electrical power regulating apparatus may improve the voltage regulation and bring all customers within regulatory voltage limits. Most solar inverters cannot provide leading VARs without a connected DC source and cannot regulate voltage outside of solar hours.

Voltage Fluctuations

DNSP are rightly concerned with voltage fluctuations from intermittent DER. For solar PV, transient cloud cover can cause the inverter output to fluctuate wildly. Generally this is not an issue to the slow decay of solar output over several second/minutes. Also smart inverters compliant with AS4777.2:2015 have ramping applied which slow the voltage fluctuations. Even without AS4777.2:2015 ramping, the electrical power regulating apparatus could adjust VAR output instantaneously to ameliorate the voltage rise/fall to keep both $P_{st}$ and $P_{lt}$ measures within compliance.

The worst case for voltage fluctuations will be when the inverters are instantaneously shutdown when the upper or lower voltage limits are reach. This circumstance can be compounded when several inverters shutdown together. The electrical power regulating apparatus may prevent excessive voltage fluctuations by maintaining statutory voltage limits preventing inverters from shutting down in the first instance and by sensing the volts rise/fall and instantaneously adjusting the VARs to compensate. As an added benefit to DNSP and customer, the electrical power regulating apparatus also compensate for normal sag/swell instances.

Harmonic Generation and Attenuation

Generally, solar inverters compliant with AS4777.2:2015 have low harmonic output and are not generally an issue for DNSPs. There may be a small number of cases where local resonance can cause an issue. Significant harmonics can be caused by undetected solar inverter equipment failures. Background harmonic problems are more than likely cause by other equipment on the network. The electrical power regulating apparatus may be programmed to attenuate any harmonics up to 24 kHz on a local network. It can also measure harmonic content of the voltage which will give some indication of pending harmonic problems.

Predominately OH distribution network will start to see wide spread voltage regulation issues with DER penetrations in the range 20-30%. For predominately UG networks, the penetration level will be in the range 30-40%. The adoption of VAR management can regulate voltage on an 11 kV or LV network without the need for traditional online tap changers or fixed tap transformers. The use of reactive power management with the electrical power regulating apparatus may maintain 11 kV and LV within regulatory limits. DER generation up to the thermal rating of the network equipment is possible while maintaining voltage within regulatory limits. With the electrical power regulating apparatus, voltage drop can be minimized at peak demand times which may enable longer LV circuit lengths lowering network capital costs.

On a typical LV distribution transformer with multiple circuits, a single electrical power regulating apparatus on each circuit can control the voltage for that circuit in lieu of AS477.2:2015 Volt/VAR settings. Similarly, the voltage on an 11 kv feeder can be controlled from a single electrical power regulating apparatus installation on each circuit, albeit a much larger dSTATCOM. The voltage rise on UG feeders will be lower due to the lower X/R ratio of the feeder. UG feeders should be able to host more DER capacity than OH feeders. In an example, it is preferred for voltage regulation of the 11 kV feeder with the LV electrical power regulating apparatus placed at the LV terminals of the distribution transformer at optimum positions.

Generally, when designing 11 kV and LV networks, voltage drop is a critical design factor. Conductor sizes are usually chosen for voltage drop and not for thermal rating. With the use of the method, many of the traditional design rules are no longer relevant. The length of LV circuits are no longer a determining factor and the LV areas can be built to the ultimate thermal rating of the conductors and distribution transformer. With the increasing penetration of DER including batteries, the maximum demand on distribution transformers are likely to reduce. With reduced maximum demands and voltage drop issues resolved with the electrical power regulating apparatus, LV circuits can be much longer requiring fewer distribution transformers. This would result in significant capital savings for DNSPs.

Voltage regulation on the 11 kV network is achieved with on-load tap changers on the substation transformers. The tap changers are controlled by line drop compensation relay(s) or equivalent algorithm within a substation control system. In urban areas, the sub-transmission transformers have multiple 11 kV feeders with different load curves connected to an 11 kV busbar. This makes 11 kV voltage regulation more difficult and in many instances creates voltage regulation issues that result in customer voltage complaints. With reactive power management, voltage regulation on 11 kV networks can be made much simpler and minimize the need for expensive on-load tap changers on sub-transmission transformers.

Two-Way grid

Solar power continues to grow quickly in Australia and is reducing electricity costs. As utility-scale solar finally makes a serious entry into the market, the majority of solar capacity remains on residential customers' rooftops, and the commercial sector is starting to follow this growth trajectory. Customer-owned distributed solar generation will be a large contributor to our total electricity supply for many years to come. The Electricity Network Transformation Roadmap (ENA and CSIRO, 2016) anticipates that 50% of all electricity will be generated behind the meter by 2050. This is a huge increase from our already world-leading levels of rooftop solar. Most of the DER generation will be in urban areas with establish distribution networks. The distribution network was designed for one-way power flow and the increasing penetration of DER is already highlighting the limitations of the existing distribution networks to accommodating 2-way power flow.

DER is mainly connected to the LV and medium voltage (11 kV) network and DNSPs have 3 major concerns with accommodating large amounts of DER generation. They are
  The first major concern is that any generation exported to these networks will cause voltage rise on that network. Most DNSPs place limitations on the amount of export to contain the voltage to within the statutory limits (230VAC +10%, −6% for LV and ±5% for high voltage of 22 kV or less).
  The second major concern of DNSPs is the reverse power flow upsetting the voltage grading of the one-way network. The existing distribution networks have been designed to boost or buck the voltage to maintain statutory voltage limits under high load and low load conditions. Transformer tap changers have been used to manage the voltage levels on the one-way network.
  The final concern is the identification, location and isolation of a network fault. Most DER generation is current limited to its output rating plus 10% and will continue to feed rated current even when there is a fault on the distribution network, provided the voltage doesn't collapse. So, in cases where high impedance faults occur, and the voltage doesn't collapse DER generation will continue to feed the fault. In the traditional system at medium voltage, sensitive earth fault protection will detect most high impedance faults, but with a large penetration of DER, this may no longer operate as intended, and high impedance faults could be undetected and sustained for a long period, possibly giving rise to dangerous conditions.

All of these concerns are legitimate and need to be addressed if DER is to play a major role in the reduction of greenhouse gases and the expansion of renewable DER in the future. This white paper will show how new technologies can be implemented to overcome the limitations of the one-way grid and establish a fully functioning two-way grid for the future.

Australia's Rooftop Solar Powerhouse

Australia has spectacular amounts of rooftop solar PV generation compared to the rest of the world. Today, Australia has the highest penetration of DER in the world at more than 15% of all dwellings. It is more than double that of the next highest penetration of Belgium. In contrast, Australia's per capita renewable generation is ranked only 8th due to the lower take up of solar and wind in commercial and large scale installations. The residential market has so far driven the steady growth in installed capacity, but now the cost of solar is low enough to encourage commercial and industrial customers to install as much solar as they can. They are driven by a combination of compelling economics to reduce power bills and pressure to meet Corporate Social Responsibility and environmental goals. These customers often have large areas of high-quality roof space ideal for solar PV generation—elevated, contiguous, and unshaded.

The distributed power station created by solar connected "behind the meter" has reached 7 GW of total capacity and is making an important contribution to Australia's electricity supply. It can and should make a growing contribution.

Some state jurisdictions have placed limits on what can be exported into the grid. Especially in Queensland (QLD) and South Australia (SA) where commercial and industrial customers cannot install as much solar as their available roof space would allow due to constraints in the electricity distribution network. Technical impacts of solar input to a grid designed for supplying electricity mean that distribution network service providers (DNSPs) limit the total amount of solar they allow to connect. Commercial customers can be limited to zero export. This severely limits the economic case for solar and results in systems that are often greatly undersized compared to the physical and economic potential—sized according to each customer's peak load rather than the retail energy offset and the export revenue.

Due to the negative political consequences of preventing residential customers from connecting, they usually receive priority and are able to connect a modest system, typically up to 5 kW in an urban setting, without an extensive connection study and procedure. This will not remain the case. The proportion of solar households continues to increase with pockets of very high concentration. Greenfield developments are already proposed with solar on 100% of households, requiring special consideration for distribution network design. This will change the picture in time but for many years most rooftop solar will be on existing roofs connected to existing networks.

This white paper describes how grid limits to solar deployment may be resolved using electrical power regulating apparatus technology and network-integrated controls. It describes the technical issues caused by rooftop solar, available solutions both traditional and new, the situation of DNSPs around the country, and the potential for networks to embrace solar growth as a transformative opportunity for their businesses.

Above paragraphs show that VAR management can manage the voltage on a distribution network with large amounts of DER generation. How this can be achieved is determined by the distribution network that connects it to the grid. In managing assets that were designed to supply one-way power to customers from bulk supply points, distribution network service providers (DNSPs) are having to adapt to reverse power flows from inverter-connected generation.

The following impacts need to be managed:
a widening voltage envelope due to voltage rise at times of peak solar output;
reaching thermal limits of the network at times of peak solar output;
failure of anti-islanding protection when solar output is at a similar level to load; and
harmonic distortion due to a high concentration of inverters using fast switching.

Of these, voltage rise is front-of-mind for most DNSPs and requires immediate attention in network areas with high solar penetration. There is no threat to network stability because all standard-complying inverters will trip off when voltage is outside statutory limits. Available data show that 25-35% of inverters are tripping off in some areas. This is not acceptable to customers who need to manually reset their inverters and who are not achieving anticipated returns on investment due to reduced revenues from solar exports.

This is happening with existing amounts of rooftop solar, producing 5.3% of Australia's electricity, which is not even close to predicted 50%. Growth in solar PV to that level will be a big transformation indeed.

Australian DNSPs exhibit a variety of responses to the impacts of solar exports. These include limiting the number of solar connections, imposing zero or other export requirements on solar systems, and requiring additional investment by customers to cover network costs incurred. These measures feed the "death spiral" for network businesses because customers will have a greater incentive to use technologies that reduce their dependence on the grid. Alternatively, DNSPs can make traditional network-side investments to strengthen their grids to accommodate more rooftop solar. But this also feeds the death spiral because these measures are costly and this is passed on to customers through their tariffs over time, making grid supplied electricity less attractive.

Solutions are available without requiring DNSPs to make large, network-side investments that are expensive and put upwards pressure on customer bills. Many DNSPs are demonstrating technologies that allow active management of customer generation to manage power flow and voltage. Network voltage can be controlled using reactive power which has much less impact on customer exports than curtailing solar output. Reactive power can be provided by using the capabilities of solar and storage inverters, to the extent they are able. However, reactive power can be provided more comprehensively by electrical power regulating apparatus which are power electronic devices specifically designed to provide reactive power with high efficiency.

Using smart inverters or electrical power regulating apparatus connected at customer sites manages voltage bottom up through local intelligent control. It can also give DNSPs full visibility of their network performance through a suitable communications interface but because control is local, it does not require SCADA-quality controls. This represents both cost savings and simplicity in contrast to distributed energy resource management systems (DERMS) that most DNSPs are not presently ready to integrate with their operational controls. It allows a tiered approach to voltage management, solving voltage issues effectively on a site-by-site basis behind customer meters, and then using DERMS over time to manage thermal limits when they arise. Demonstrations at zone substation scale in each state will show DNSPs that this approach makes commercial and practical sense and future-proofs their networks as they transform to major solar supplies.

In summary, it can be noted that:
Voltage Regulation is a mandatory pre-requisite for a DER network
Voltage regulation unlocks the real benefits of DER.
VAR management is more economical than traditional alternatives to maintain voltages
Traditional One Way Grid Voltage Regulation
FIG. 17 below shows the configuration of a typical medium voltage network. The substation transformers usually have an on-load tap changer to regulate the 11 kV bus for all load conditions. There are two control methodologies commonly used in Australia.

Constant substation voltage—The tap changer position will be varied depending on the load condition to maintain a steady voltage at the substation, compensating for the voltage changes that occur in the sub transmission network as the load varies.

Regulated feeder voltage—The 11 kV bus voltage will be increased during high load conditions to approximately 103%, and decreased during low load conditions to approximately 100%. The tap changing is determined by a Load Drop Compensation Relay (LDC) or a Volt VAR Regulation (VVR) algorithm which is usually associated with a real time SCADA system. The LDC relay simulates the impedance (resistance and inductance) of the 11 kV feeders and models the voltage along the feeder to determine when to change taps and regulate feeder voltage to a constant value at a position approximately ⅓ of the way along the feeder.

The VVR algorithms are similar to LDC but have facilities to accommodate capacitor and regulator switching.

The distribution transformers usually have fixed off-load tap changers and have a major part to play in voltage regulation of the 11 kV and LV networks. The voltage at the beginning of the 11 KV feeder will be higher than the voltage at the end of the feeder so the distribution taps are set to decrease the voltage at the terminals of the distribution transformers at the beginning of the feeder and increase the voltage at the LV terminal of the distribution transformers at the end of the feeder. Generally, the tap is set to 245VAC at the LV terminals of the distribution transformer under low load conditions. This configuration is fairly typical for urban areas.

In rural areas the 11 kV feeders are generally much longer and may have one or more voltage regulators along the feeder. The voltage regulators will boost or buck the voltage depending on the load.

Voltage regulation can be applied to a single distribution feeder or to multiple feeders. For single feeders a voltage regulator situated at the beginning of the feeder and the LDC relay will regulate the voltage on each feeder independently. For multiple feeders on a common bus, the LDC load current is the sum of all of the feeders and common bus is regulated from an on-load tap changer.

Although widely used, LDC schemes do have many shortcomings. Some shortcomings are:
  LDC systems are generally only configured to control voltage if power flow is one way outwards from the control bus.
  LDC voltage assumes the loads are equally distributed along the feeder or feeders.
  LDC controls only one notational feeder as determined by the R and X settings.
  For LDC controlling multiple feeders, it is assumed that each feeder has equally distributed loads and has the same load profile for each feeder, but this is often not the case, so compromises result.
  Distributed series or shunt capacitor banks downstream make voltage regulation more difficult.

LDC and the Two Way Grid

LDC will always be an impediment to having a true two-way grid where power can flow in any direction at any time. Conventional LDC will only produce correct results when the power flow is one way outward from the control bus/regulator system. This is another reason why DNSPs restrict DER generation export into the LV and MV networks. The situation is further exacerbated when one or more feeders are importing power into the control bus while other feeders are exporting power from the control bus. Under these circumstances the voltage cannot be correctly controlled along any feeder with the LDC control scheme.

Requirements of a True Two Way Grid

For a true two way grid the voltage for each circuit/feeder has to be controlled independently of the loads or generation within that circuit/feeder. VAR management is the only viable method which has suitable technology available at this time. In the first white paper 'Is the Grid Full', it was shown how the voltage on an LV feeder could be managed within statutory limits for both load and generation conditions. Any LV network can accommodate DER up to 200% of the rating of the distribution transformer whilst maintaining grid voltages within statutory limits. The 200% consists of 100% being exported into the HV grid and the other 100% being consumed by the customers on that LV feeder. At night time when generation is at a minimum and load is at a maximum the voltage can be maintained by generating leading VAR's to compensate for voltage drop due to increased loads. With the use of electrical power regulating system the voltage can be maintained autonomously at all times without the need for remote sensing.

In the first white paper 'Is the Grid Full', it was shown that there is an optimum point along a circuit/feeder where the placement of an electrical power regulating apparatus can regulate the voltage for that circuit/feeder instead of a distributed VAR management using droop control algorithms. The electrical power regulating apparatus can be placed before the meter or behind the meter and solves many of the technical and commercial inequities of distributed VAR management at each load/generation site.

In summary, it can be noted that:
  Existing distribution networks are designed for one-way power flow only
  A two-way distribution network would require each feeder/circuit to have independent voltage control to manage power flows
  Existing voltage controls like LDC would need to be disabled and replaced by independent voltage control mechanisms
  Reverse power flow in a one-way network will cause more voltage problems due to the tapered distribution transformer tap grading Electrical Power Regulating Apparatus Characteristics The electrical power regulating apparatus has been designed specifically to address many of the network problems facing the introduction of DER into the distribution network. The main issues facing the DNSP are:
  Voltage management, in particular voltage rise due to generation in the lower voltage levels on the network
  Voltage fluctuations from intermittent generation
  Fault identification and location
  Voltage balance between phases
  Harmonic mitigation
  Network reliability.

The electrical power regulating apparatus is an advanced four quadrant, three phase, 4 wire inverter which uses the latest Silicone Carbide and polypropylene capacitor technology to give an expected life of 20 years. The electrical power regulating apparatus inverter has the following features:
  True three phase 380-480VAC inverter in one package. The electrical power regulating apparatus is a four-wire device with the neutral being modulated to simulate 3 independent phase outputs. Each phase output can have different voltages and currents up to the rating of the phase.
  Can be configured as a 3 phase 4 wire or single phase 2 wire. 2 phases can be paralleled to produce a single phase and neutral inverter.
  Variable frequency or fixed 50 Hz-60 Hz. The electrical power regulating apparatus frequency can be fixed at 50 Hz or 60 Hz to suit existing networks. For remote pumping or motor starting the electrical power regulating apparatus can be configured to be a variable frequency drive.
  DC input range 600-980VDC. A large DC voltage range is required to enable the output at maximum voltages when the battery is at 80% DoD.
  Full 4 quadrants—capable of sourcing/sinking VARs and import/exporting kW to full rating.
  Four wire three phase with individual phase current balancing. By modulating the neural, power can be shifted between phase to balance phase voltages and act like a power conditioner.

Battery charging and discharging of energy storage devices.

Power conditioning compensation for grid sag/swell and voltage fluctuations. The electrical power regulating apparatus can be used as a power conditioner to improve the quality of supply. It is capable of regulating the phase voltages to particular voltage and bandwidth. Sags and swell will be corrected by first sourcing or sinking VARs to correct voltage excursions and if a battery is present will correct the voltage by generating or consuming real power.

Programmable harmonic sink. The electrical power regulating apparatus can be programmed to sink harmonic frequencies up to 25 kHz.

Selectable current source or voltage source inverter. The electrical power regulating apparatus is a grid forming inverter which can be in either current mode when connected to a network or in voltage mode for off-grid applications. The change over time is less than 2 cycles.

Power factor correction. The electrical power regulating apparatus can be configured to be a fixed leading or lagging power factor correction device or a variable leading or lagging VAR generator with droop curve if required.

Power flow regulation. The electrical power regulating apparatus can be programmed to limit import or export to specified levels.

Uninterruptable Power Supply (UPS) function. The electrical power regulating apparatus can be a line interactive or online UPS. In line interactive mode the electrical power regulating apparatus can change from current mode to voltage mode in less than 2 cycles.

Off grid operation. In conjunction with DER generation and a backup generator, the electrical power regulating apparatus can be partial on-grid or totally off-grid power supply.

Directional sequence protection. Being a true four wire device, the electrical power regulating apparatus can calculate the positive, negative and zero sequence voltages and current which can be used to detect line to line and line to ground faults and isolate from the network.

Network reliability. The electrical power regulating apparatus can improve network reliability SAIDI by providing customers with an independent UPS for network outages.

Uninterruptable Power Supply (UPS) function. The electrical power regulating apparatus can be a line interactive or online UPS. In line interactive mode the electrical power regulating apparatus can change from current mode to voltage mode in less than 2 cycles.

Off grid operation. In conjunction with DER generation and a fossil fuel backup the electrical power regulating apparatus can be partial on-grid or totally off-grid power supply.

Directional sequence protection. Being a true four wire device, the electrical power regulating apparatus can calculate the positive, negative and zero sequence voltages and current which can be used to detect a line to line and line to ground faults and isolate from the network.

Network reliability. The electrical power regulating apparatus can improve network reliability SAIDI by providing customers with an independent UPS for network outages.

230VAC Voltage Standards

Most jurisdictions in Australia have adopted the new voltage standard of 230VAC+10%-6%. As an interim measure the system is structured to align with previous 240VAC±6% standard, as this fits within the new standard. The intention is to fully move to the international voltage standard of 230VAC+10/−6% at some time in the future. The interim 230VAC+10%-6% standard has nearly the same upper voltage limit of 253VAC versus 254VAC, but has a much lower limit of 216VAC compared with the previous lower limit of 225VAC. It has been suggested that moving to the interim 230VAC standard, the PV hosting capacity of the network can be increased. This is only true if the tap settings on the distribution transformers set to a nominal 230VAC. This would be costly exercise (it costs approximately $2000, to send a crew to change a distribution transformer tap setting, and is un-necessary if the electrical power regulating apparatus is used to manage the voltage. In paragraphs below. It can be shown that VAR management by the electrical power regulating apparatus can achieve the international 230VAC±6% without any changes to the existing distribution networks.

Voltage Management of a Two-Way Grid

Below are several case studies to demonstrate the capability of a LV electrical power regulating apparatus to manage the voltage on a two-way grid. The case studies have been chosen to show the feasibility of VAR Management to regulate the voltage on a two-way grid. The electrical power regulating apparatus's are all placed on the LV network either at the terminals of the distribution transformer or at the optimum point along the LV feeder. There are many permutations of load and generation that are possible of a two-way grid. To demonstrate the applicability of the electrical power regulating apparatus VAR Management for all permutations of load and generation, only the extreme conditions (i.e. maximum load and maximum generation) are analyzed. Two load cases are explored below:

where there is maximum generation from DER on the LV network up to the thermal rating of equipment where there is no DER generation and only maximum loads up to the rating of the distribution equipment. This situation would simulate the evening peak where there is no DER generation.

In each of these cases the LDC/VVR 11 kV voltage is disabled, and all voltages are managed though the electrical power regulating apparatus VAR control on the LV network. A load flow package was used to calculate the voltage profiles shown in the figures below.

Typical Substation Configuration

Figure 17:
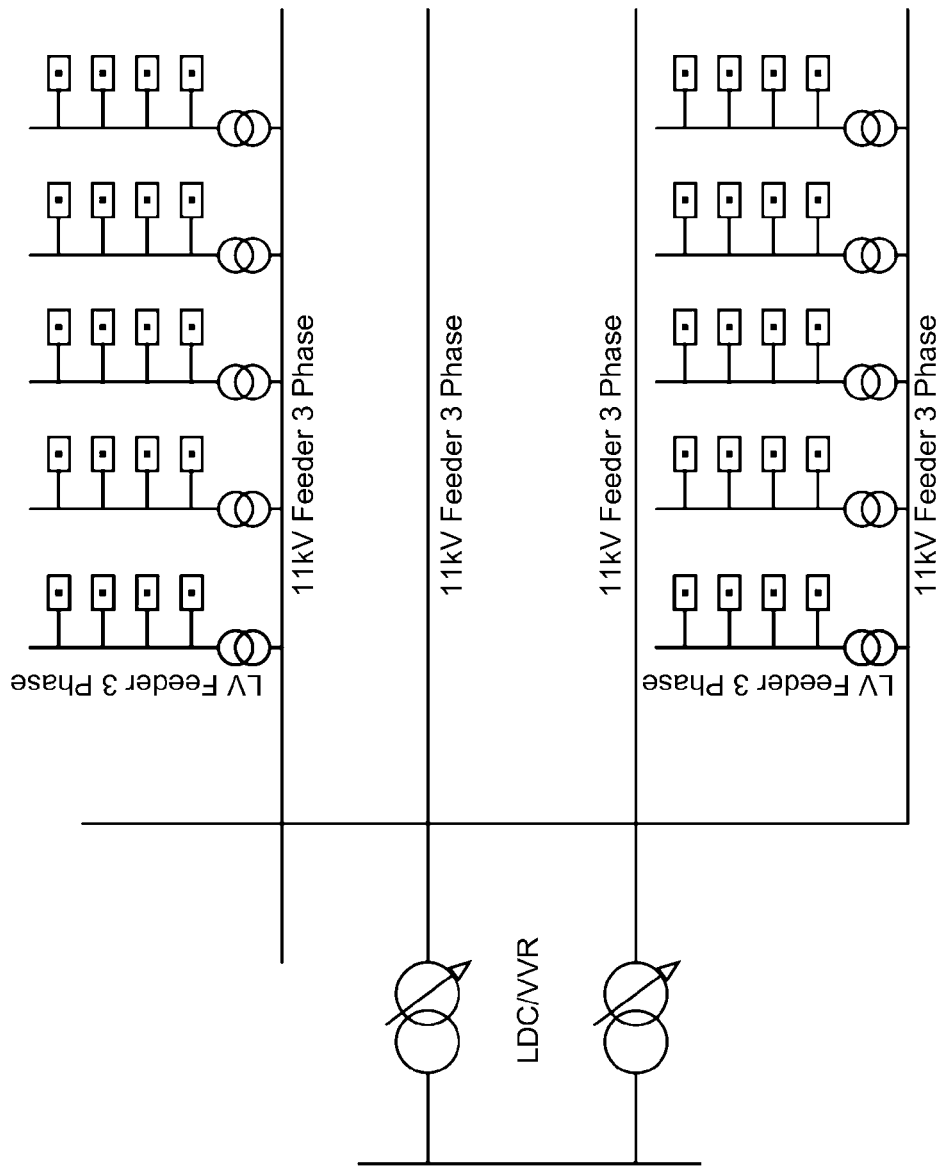
FIG. 17 is a schematic diagram of a medium voltage substation.

FIG. 17 shows a typical MV substation used in this report. The substation consists of 2 sub-transmission transformers (33/11 kV in our studies) connected in parallel with the 11 kV bus. The 11 kV bus would have several 11 kV feeders connected to the bus to distribute power to the surrounding areas. Each 11 kV feeder has 25 distribution transformers spaced at 400 m intervals connected to each 11 kV OH feeder. Each OH 11 kV feeder is 3 phase with Moon conductor (AAC 7/4.75) along its entire length. Each 11 kV feeder has 25 distribution transformers with a rating of 315 kVA and voltage ratio of 11000/415 in delta/wye arrangement. Moon conductor has a rating of over 400 A (7.8 MVA) for a 1m/sec wind speed. Typically, 11 kV feeder will have a peak demand utilization of 60-70% (4.5-5.3 MVA). All of the 'maximum' load/generation cases analyzed in this report are using 7.8 MVA per feeder which will cover all of the operational situations in a DNSP.

The worst voltage regulation of the 11 kV feeder will occur at the end of the feeder for both generation and load situations. Normally, the 11 kV is maintained at 11±5% kV with a LDC/VVR voltage regulation. Also, the voltage along the 11 kV feeder is design to be within ±5% of nominal. The allowed voltage drops or rise along an 11 kV feeder is 5%.

The LV voltage regulation has been modeled with a single LV 3 phase, 4 wire, Moon conductor circuit consisting of 10 nodes, each and 40 m apart to give a total LV circuit length of 400 m. Typically, there would be at least 2 LV circuits originating from each distribution transformer. Two LV topologies have been modeled
- circuits from the distribution transformer with equal generation of 15.75 kW at unity PF at each of 10 generation points. Each circuit is 400 m long.
- one LV circuit is connected to the LV terminals of the distribution transformer with a length of 400 m and 31.5 kW generation at each of 10 generation point equally spaced along the circuit. This 'maximum' situation will produce the maximum voltage rise or drop compared to a normal 2 circuit topology.

To assess the impact of the DER generation, the voltage regulation on the first distribution transformer and the last distribution transformer are shown in detail. The VARs needed to maintain correct regulation for the LV networks should be maximum at the last distribution transformer on the 11 kV feeder. For all voltage regulation analyses, a nominal 230VAC was used. In Australia, the current statutory voltage limits are 230+10%-6%.

Two conditions for the substation are analyzed in detail one where the maximum generation from the DER is equal to the thermal rating of the distribution transformer and the other where the maximum load on each distribution transformer is equal to the thermal rating of the distribution transformer ie 315 kVA. In the exemplary substation 11 kV feeder F1 will have maximum generation and F2 will have maximum load. This configuration will demonstrate the power of VARs to manage network voltages under all load and generation conditions. F1 will represent the maximum generation condition where lagging VARs will be used to manage voltage within statutory conditions. F2 will represent the situation where the feeder is under maximum load conditions where leading VARs will be used to manage voltage within statutory limits.

For the maximum generation analyses, it is assumed that the local load at time of maximum generation is supplied from the DER generation and full generation is supplied back through the distribution transformer.

This simple topology and the analyses below will demonstrate the application of VAR management to successfully regulate the voltage of the 11 kV and the LV networks of a substation without limiting generation export to control the voltage as is the case today for many DNSPs. The generation would represent a 'midday' situation where DER generation from solar PV is maximum and the voltage rise can be maintained with existing regulation limits. The peak demand would represent the evening peak where there is no DER generation and voltage drop on the 11 kV and LV network is maximum.

In all analyses, a LV electrical power regulating apparatus is used to generate either lagging VARs to reduce voltage or leading VARs to increase the voltage. For the 11 kV voltage control, the electrical power regulating apparatus is placed at the LV terminals of distribution transformer DT17 and for LV voltage control the electrical power regulating apparatus is placed at position 7 along the LV circuit. It was demonstrated in previous paragraphs that the optimum placement of VAR control is at the 66% load balance point along a circuit. All VAR management analysis have been conducted with VAR management at or close to the Load balance point of 66%.

Figure 18:
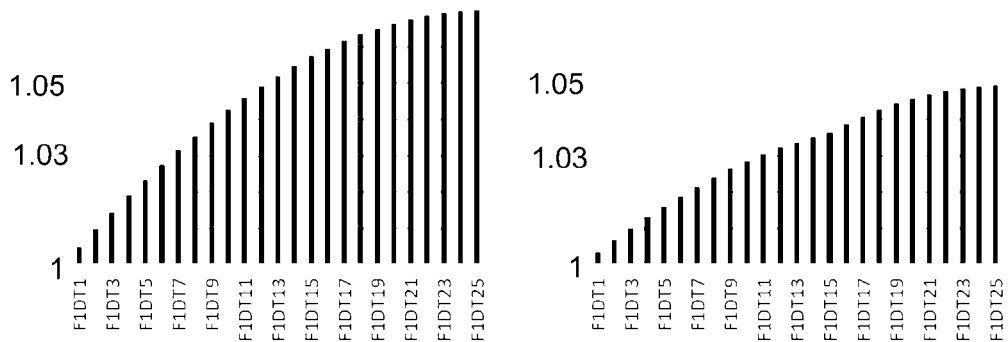
FIG. 18 is voltage profile diagrams along a medium voltage distribution feed line.

Voltage Management of a Single OH 11 kV (MV) Feeder with 2 LV Circuits for Each DT
Maximum Generation Analyses FIG. 18 shows voltage profile along a single 11 kV with and without VAR management. Each distribution transformer has 315 KW at PF1 generating back into the 11 kV feeder for a total generation of 7.8 MVA. The voltage rise at the end of the 11 kV feeder without any VAR management is approaching 7% above the 11 kV bus voltage. When a dStatcom is added at the LV terminals of the distribution transformer at position 17 generating 1000 kVAR of lagging VARs, the voltage at the end of the feeder is reduced to +4.9%, which is within the 11 kV voltage regulation limits.

Figure 19:
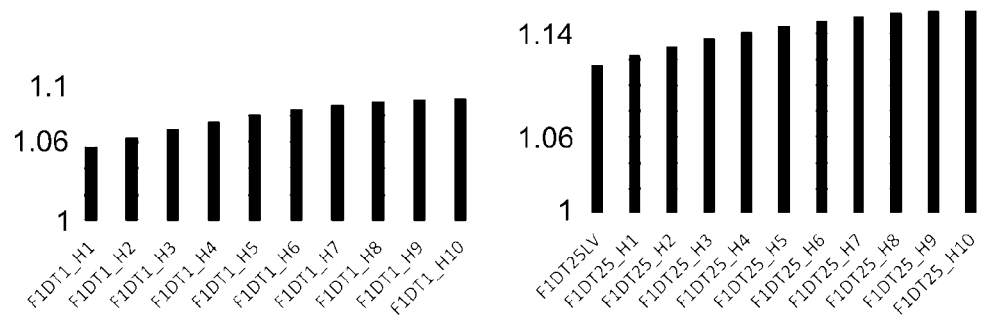
FIG. 19 is voltage profile diagrams along a low voltage distribution feed line.

The voltage regulation without any VAR compensation on the LV circuits at DT1 and DT25 are shown in FIG. 19. The LV circuit voltage regulation of distribution transformer1 was 9.3% just within the permitted voltage regulation limit of 230VAC+10%. As expected, the voltage regulation at DT25 was greater than the permitted limit of 230VAC+10% and was 15.8%.

Figure 20:
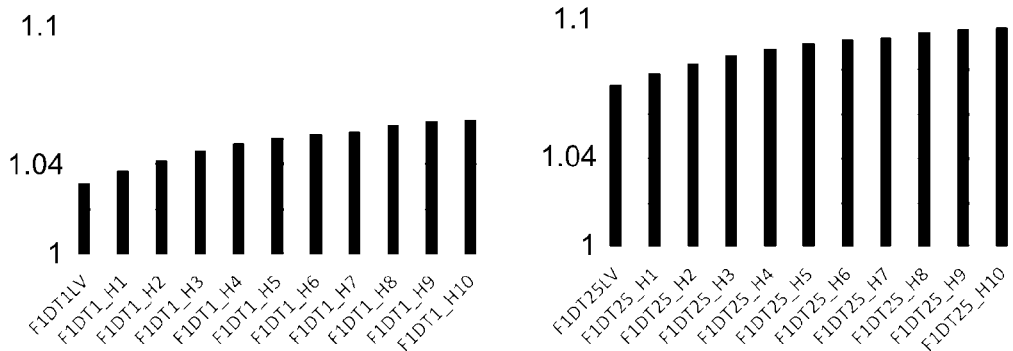
FIG. 20 is voltage profile diagrams along a low voltage distribution feed line.

To bring the LV voltages back to within statutory limits requires VAR Management along the LV circuits. FIG. 20 below shows the LV voltage regulation at DT1 and DT25 when 25 kVAR of lagging VARS is applied to all of the LV circuits or 50 kVAR per distribution transformer along F1. The voltage regulation at the end of each circuit on DT25 was 9.9%. At DT1 the voltage regulation was only 5.9%.

The power factor of each distribution transformer along the F1 with 25 kVAR on each circuit was in the range 0.964 to 0.962. These power factors are similar to those experienced in one way grids for typical peak load conditions. The 11 kV feeder F1 power factor was 0.923.

FIG. 20 demonstrates that full voltage regulation can be managed on a complete 11 kV feeder by VAR management only on each LV circuit. An alternative would be to combine VAR management on the 11 kV and the LV circuits. As shown in FIG. 4, the 11 kV voltages and the associated LV terminal voltage can be managed by VAR management directly on the 11 kV feeder through the LV bus of distribution transformers. The following analyses show that the LV voltage regulation can be achieved though voltage regulation of both the 11 kV and the LV circuits.

Figure 21:
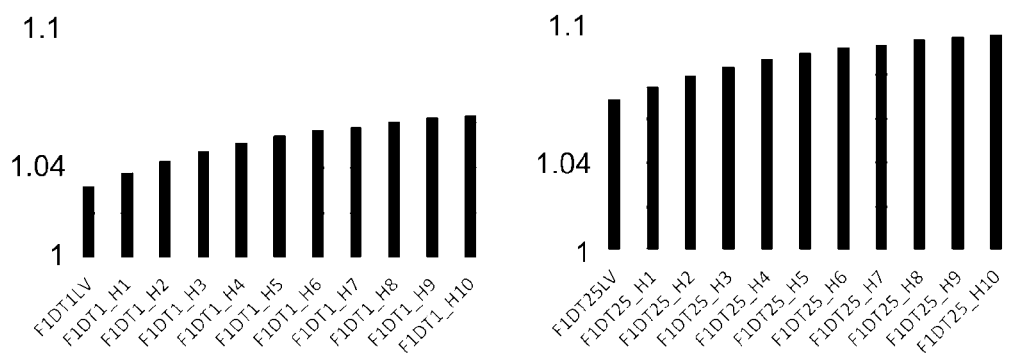
FIG. 21 is voltage profile diagrams along a low voltage distribution feed line.

FIG. 21 shows the voltage regulation on DT1 and DT25 with 20 kVAR on each LV circuit and an additional 400 kVAR on the LV terminals of DT17. The 400 kVAR at DT17 lowers the LV terminal voltages on all distribution transformers. The lower terminal distribution transformer LV terminal voltages results in a lower VAR compensation to maintain voltage regulation.

VAR Management Efficiency

Voltage regulation can be achieved by VAR management on LV circuits alone or by a combination of VAR management of both the 11 kV and the LV. To determine which method of VAR management is more efficient would be to calculate the total VARS required for each option. In the cases described in FIGS. 19 and 20 the total VARs required to maintain statutory limits is 1250 kVAR (25×50 kVAR) and 1400 kVAR (25×40+400) respectively. For our simple case of uniform generation and uniform impedances, the LV circuit VAR management alone is more efficient.

Figure 22:
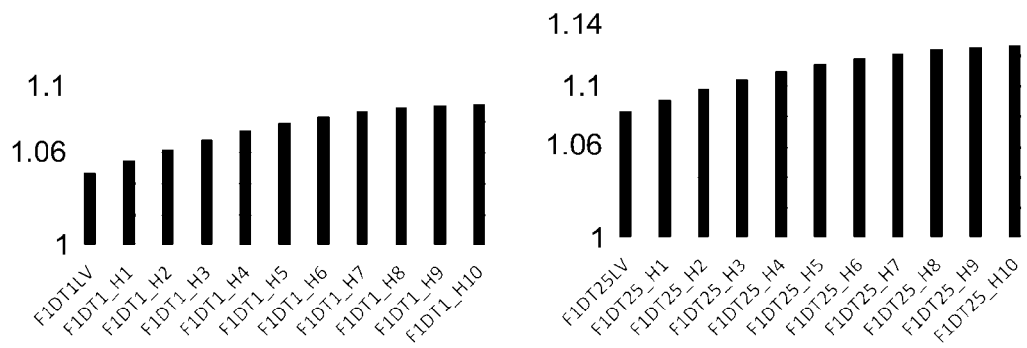
FIG. 22 is voltage profile diagrams along a low voltage distribution feed line.

Voltage Management of a Single OH 11 kV (MV) Feeder with 1 LV Circuit for Each DT It is typical for most large distribution transformers with a rating greater than 100 kVA to have more than 1 LV circuit, but for smaller rating distribution transformer one LV circuit is typical. To assess the universal application of VAR management to all configurations, a single LV circuit situation is analyzed. The following analyses shows the applicability of VAR management for 'maximum' case where only one LV circuit is connected to each 315 kVA distribution transformer and with generation of 31.5 kW per house for a total of 315 kW per distribution transformer. FIG. 22 shows the voltage rise along the circuit connected to DT1at the beginning of the feeder and DT25 at the end of the feeder. The voltage rise for DT1 is within the +10% limit whereas the maximum voltage at the end of the single circuit od DT25 is 12.7% and exceeds the +10% limit.

Figure 23:
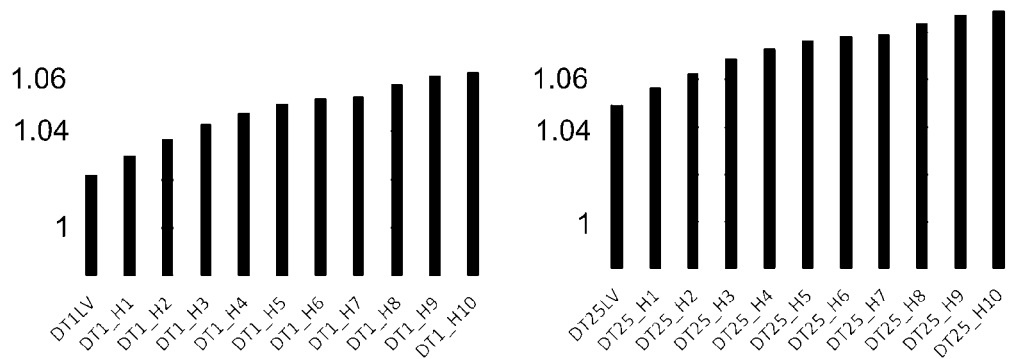
FIG. 23 is voltage profile diagrams along a low voltage distribution feed line.

FIG. 23 shows the voltage rise along DT1 and DT25 with VAR compensation of 60 kVAR at H7 on each distribution transformer. Voltage regulation of the LV is maintained within statutory limits for each distribution transformer. The voltage regulation for the 11 kV feeder is 2.4% with 60 kVAR at H7 on each distribution transformer.

For a single circuit 60 kVAR is required to keep the LV voltage within statutory limits compared to 25 kVAR for each circuit for two LV circuits per distribution transformer. The results are similar but an extra 10 kVAR is required to manage the more severe voltage rise for a single circuit.

Hosting Capacity

From the above results the maximum DER hosting capacity is greater than 100% of the distribution rating, 100% DER generation can be exported and DER generation for the local loads which could be up to 100%.

In summary, it should be noted that:
With the electrical power regulating apparatus, VAR Management the DER hosting capacity is greater than 100% of distribution transformer rating.
LV statutory voltage limits can be maintained while exporting DER generation equal to the thermal rating of a distribution transformer.
The 11 kV feeder voltages are within ±5% for full export of each distribution transformer.
Both 11 kV and LV VAR management can be used to regulate the 11 kV and LV voltages.
LV VAR compensation only requires less VARs than a combination of 11 kV and LV VAR management.
For 100% DER export the distribution transformer PF is >0.95 and the 11 kV PF is >0.9.
On the analysis presented above the lagging VAR requirement for 100% der export is less than 200VAR per kVA of distribution transformer rating.

Voltage Regulation for a Feeder with Maximum Load

The electrical power regulating apparatus is capable of exporting VARS to raise the voltage of a circuit. When feeders are heavily loaded, the voltage drops along the feeder. In a one-way grid, the tap changer of the distribution transformer is used to regulate the voltage under maximum load conditions. The distribution transformer LV terminal voltage is set higher than at the beginning of the feeder to compensate for the voltage drop under maximum load conditions. In addition to distribution transformer tap changer to regulate voltage drop, shunt capacitors have been used to limit voltage drop along a feeder as well as improving power factor.

Analyses of 2 Circuits Per Distribution Transformer with 7.8 MW Load

Figure 24:
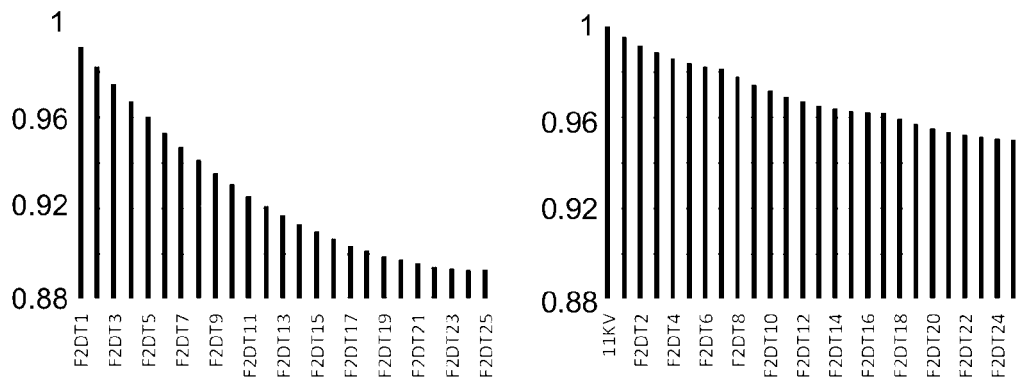
FIG. 24 is voltage profile diagrams along a medium voltage distribution feed line.

FIG. 24 shows the 11 kV voltage drop with a load of 315 kW on each distribution transformer along the feeder for a total load of 7.8 MW. With all distribution transformer taps set at nominal the voltage regulation over feeder is 10.3%. If 2MVAR of leading VAR are placed on the LV terminals of distribution transformer7 and distribution transformer17 the voltage regulation improves to 4.9%.

Figure 25:
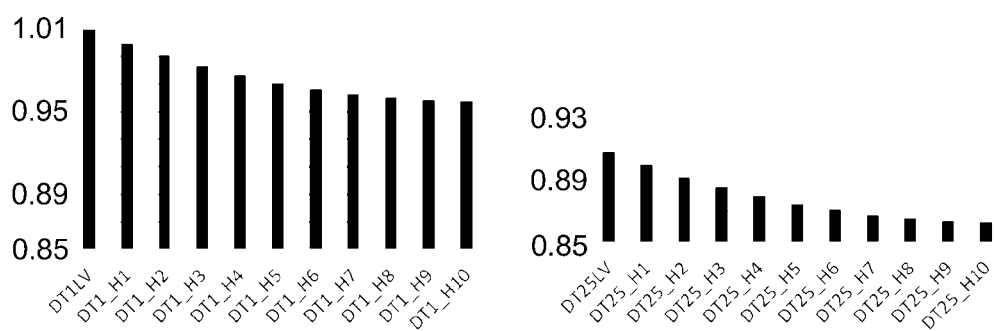
FIG. 25 is voltage profile diagrams along a low voltage distribution feed line.

The LV voltage regulation on DT1 and DT25 is shown in FIG. 25 with 2 CCT each with 157.5 kW of load. DT1 is within the −6% allowed under statutory limits whereas DT25 is well outside of statutory limits with a −13.7% voltage drop.

Figure 26:
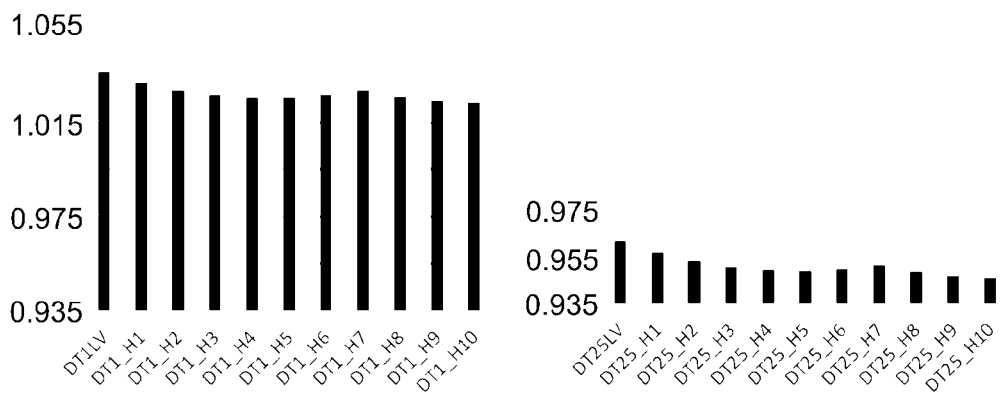
FIG. 26 is voltage profile diagrams along a low voltage distribution feed line.

FIG. 26 shows the voltage regulation along LV CCT of DT1 and DT25 with leading VAR compensation. With 60 kVAR at H7 on each circuit the voltage is maintained within the −6% statutory limit.

Figure 27:
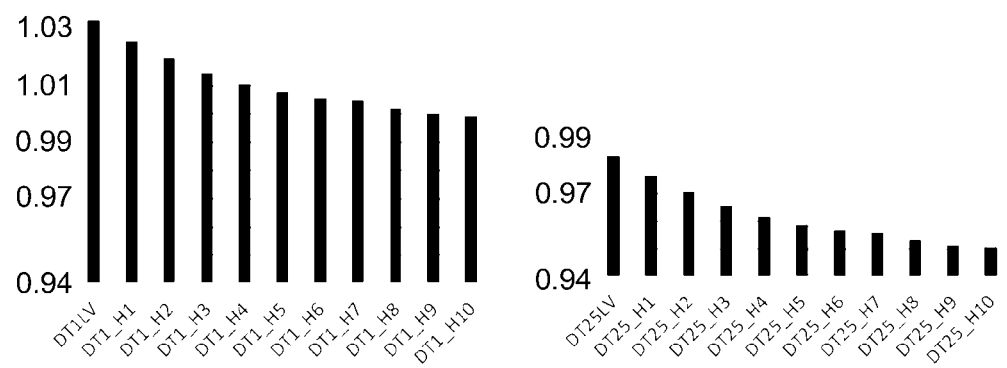
FIG. 27 is voltage profile diagrams along a low voltage distribution feed line.

Another option to regulate the LV voltage drop is to increase the distribution transformer LV terminal voltage so less LV leading VAR compensation is required to regulate the LV circuit voltage. FIG. 27 below shows the voltage regulation on DT1 and DT25 with 2MVAR leading at LV terminals of DT17. The 2MVAR raises the distribution transformer LV terminal voltages by 2-5% which results in less leading VARs to compensate the LV voltage drop. The power factor of the 11 kV feeder is 0.98 and the power factor of the distribution transformer is in the range 0.994 to 0.998. Even though only one position was used on the 11 kV to demonstrate the effectiveness of 11 kV voltage compensation, several 11 kV injection sites along the 11 kV feeder could be used. In practice, several C&I sites could be appropriate to use existing transformer capacity.

VAR Efficiency

The total VARS required to meet regulatory limits of 230VAC+10%-6% can be meet in two ways:
Leading VARS on the LV circuits only (FIG. 25)
A combination of leading VARs to improve 11 kV voltage regulation and LV leading VARS to improve LV voltage regulation (FIG. 26).

The total VARS required for LV leading VARS only is 3000 kVAR whereas for the combination of 11 kV and LV VARs is 2750 kVAR. The combination is more efficient than the LV VARS only.

Analyses of 1 Circuit Per Distribution Transformer with 7.8 MW Load

Figure 28:
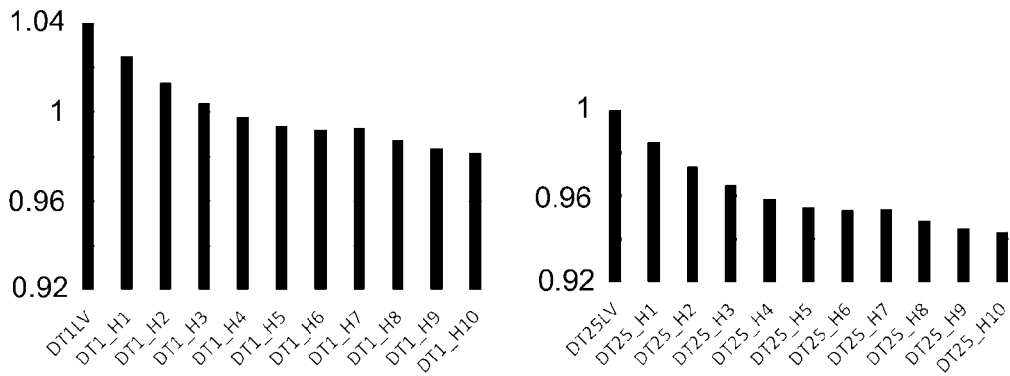
FIG. 28 is voltage profile diagrams along a low voltage distribution feed line.

FIG. 28 shows the voltage regulation of 1 circuit per distribution transformer but with a full load of 315 kW per distribution transformer. The load is equally spread across 10 loads of 31.5 kW each. A LV leading VAR solution only could not be found due to the severe 11 KV voltage drop along the feeder. The 11 kV voltage drop had to be improved to less than −6% to get acceptable leading VAR solution for the LV circuit. One solution is presented in FIG. 27 with 1MVAR at distribution transformer7LV and 2MVAR at distribution transformer17LV and 90 kVAR at H7 on each LV circuit.

In summary, it should be noted that:
With the electrical power regulating apparatus, VAR Management the DER hosting capacity is greater than 100% of distribution transformer rating.
LV statutory voltage limits can be maintained while exporting DER generation equal to the thermal rating of a distribution transformer.
The 11 kV feeder voltages are within ±5% for full export of each distribution transformer.
Both 11 kV and LV VAR management can be used to regulate the 11 kV and LV voltages.
LV VAR compensation only requires less VARs than a combination of 11 kV and LV VAR management.
For 100% DER export the distribution transformer PF is >0.95 and the 11 kV PF is >0.9.
On the analysis presented above the lagging VAR requirement for 100% der export is less than 200 VAR per kVA of distribution transformer rating.

Two-Way Grid Discussion

From the above analysis, an 11 kV feeder with 2 LV circuit per distribution transformer and exporting 100% DER generation requires 1250 kVAR to maintain statutory voltage limits. Whereas the same feeder with no generation and full load equal to the total distribution transformer rating requires 2750 kVAR to maintain statutory voltage limits.

The exporting VARS required to manage voltage drop for a two-way grid is much more than the absorbing VARs required to manage voltage rise from generation. The main reason is that the distribution transformer impedance and the line impedances are predominately inductive and need to be canceled before leading VARs can regulate the voltage. For a two-way grid, the amount of VARs required for voltage regulation is driven by the voltage drop when DER generation is not available and not by VARs to limit voltage rise.

All of the analysis above it was assumed that all distribution transformer tap setting were on neutral tap and the transformer had a ratio of 11000/415.

In summary, it should be noted that:
VAR management by the electrical power regulating apparatus can maintain statutory voltage limits on a two-way distribution network under all generation and load conditions up to the thermal rating of equipment.
With the electrical power regulating apparatus VAR Management the DER hosting capacity can be increased to 100% of the distribution transformer thermal rating. Statutory voltage limits can be maintained when generating and exporting power up to the thermal rating of a distribution transformer.
Only one electrical power regulating apparatus is required if place at the optimum position to maintain statutory voltage limits for the whole feeder/circuit.
VAR management by the electrical power regulating apparatus can regulate the voltage on both the 11 kV and the LV networks when fully loaded power up to the full rating of the distribution transformers while maintaining statutory voltage limits VAR management is more economical than traditional alternatives to maintain voltages.

Moving to 230VAC±6% Standard

In the paragraphs above, it was shown that the VAR management can regulate the voltage on a distribution network when power is flowing in any direction. The standard used was the interim Australian Standard of 230VAC+10%-6%. In this section it will be shown that the voltage can be regulated to the International Standard of 230VAC±6%. Only the generation voltage rise regulation is analyzed as the results for maximum load in section 7 above will be the same i.e. 230VAC-6%.

Figure 29:
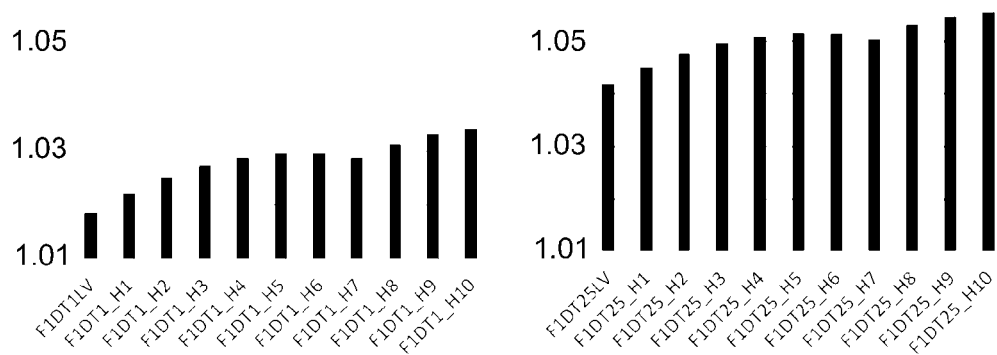
FIG. 29 is voltage profile diagrams along a low voltage distribution feed line.

FIG. 29 shows the voltage regulation at the beginning and end of the 11 kV feeder with 315 kW of being exported at each of the 25 distribution transformers. Under the maximum generation condition, 45 kVAR of lagging VARs was required to maintain the voltage regulation to 230VAC±6% for each LV circuit. A total of 90 kVAR was required for each distribution transformer.

Figure 30:
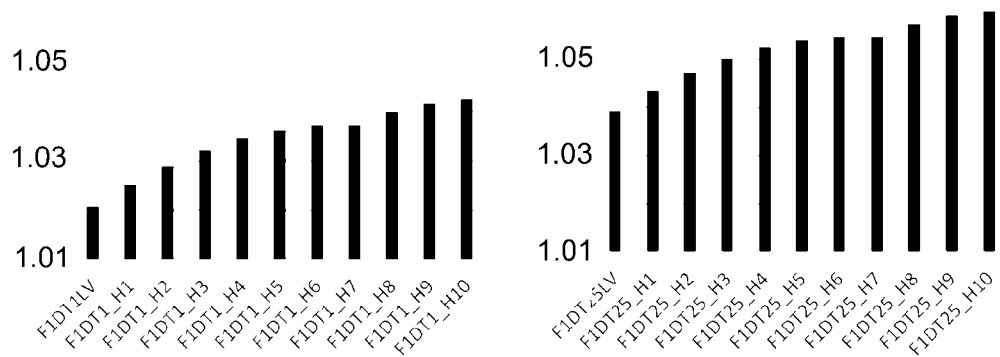
FIG. 30 is voltage profile diagrams along a low voltage distribution feed line.

FIG. 30 shows an alternate VAR management arrange where 600 kVAR of the electrical power regulating apparatus lagging VARs are injected at low voltage terminals of DT17. This reduced the LV terminal voltage at each distribution transformer along the 11 kV feeder and reduced the VAR requirement along the LV circuits to 35 kVAR instead of the previous 45 kVAR. This arrangement increased the total 11 kV feeder VAR requirement to 2350 kVAR compared with only 2250 kVAR when placed along each LV circuit.

To manage the maximum load voltage regulation, at least one 11 kV leading VAR injection was necessary to regulate to voltage along the feeder. Because the 11 kV VAR injection is necessary, then the combination of 11 kV and LV VAR injection would be the most efficient outcome.

In summary, it should be noted that
VAR management by an electrical power regulating apparatus can maintain statutory voltage to the international standard of 230VAC±6% on a two-way distribution network under all generation and load conditions up to the thermal rating of equipment.

Limiting Voltage Fluctuations

DNSP are rightly concerned with voltage fluctuations from intermittent DER. Generally, intermittent cloud is not an issue due to the slow decay of solar output over several second/minutes. The worst case for voltage fluctuations will be when the inverters are instantaneously shutdown when the upper or lower voltage limits are reach. This circumstance can be compounded when several inverters shutdown together. The sharp decrease in generation can cause voltage fluctuations for all customers on the LV feeder. Smart inverters compliant with AS4777.2:2015 have ramping applied which slow the voltage fluctuations. The electrical power regulating apparatus could adjust VAR output instantaneously to ameliorate the voltage rise/fall to keep both Pst and Plt measures within compliance.

The electrical power regulating apparatus can prevent excessive voltage fluctuations by maintaining statutory voltage limits preventing inverters from shutting down in the first instance and by sensing the volts rise/fall and instantaneously adjusting the VARs to compensate.

As an added benefit to DNSP and customer, the electrical power regulating apparatus also compensates for normal sag/swell instances.

In summary, it should be noted that
The electrical power regulating apparatus can ameliorate voltage fluctuation on both the LV and 11 kV feeders to maintain regulation voltage fluctuations limits.

Limiting Harmonics

Generally, solar inverters compliant with AS4777.2:2015 have low harmonic output and are not generally an issue for DNSPs. There may be a small number of cases where local resonance can cause an issue. Significant harmonics can be caused by undetected solar inverter equipment failures. Background harmonic problems are more than likely caused by other equipment on the network.

The electrical power regulating apparatus can be programmed to attenuate any harmonics up to 24 kHz on a local network. It can also measure harmonic content of the voltage which will give some indication of pending harmonic problems.

Electrical Power Regulating Apparatus Simulations

An electrical power regulating apparatus was configured in voltage mode to generate not only the 50 Hz fundamental but also some 5th and 7th harmonic to distort the 50 Hz waveform. It was directly connected to another electrical power regulating apparatus configured in current mode. The current mode electrical power regulating apparatus has firmware which calculates the harmonic currents for each selected harmonic and varies the canceling harmonic currents in real time with a PI controller. The correction time interval is 20 msecs or 1 cycle of the 50 Hz fundamental. All of the following measurements were taken at the terminals of the current mode electrical power regulating apparatus.

Figure 31:
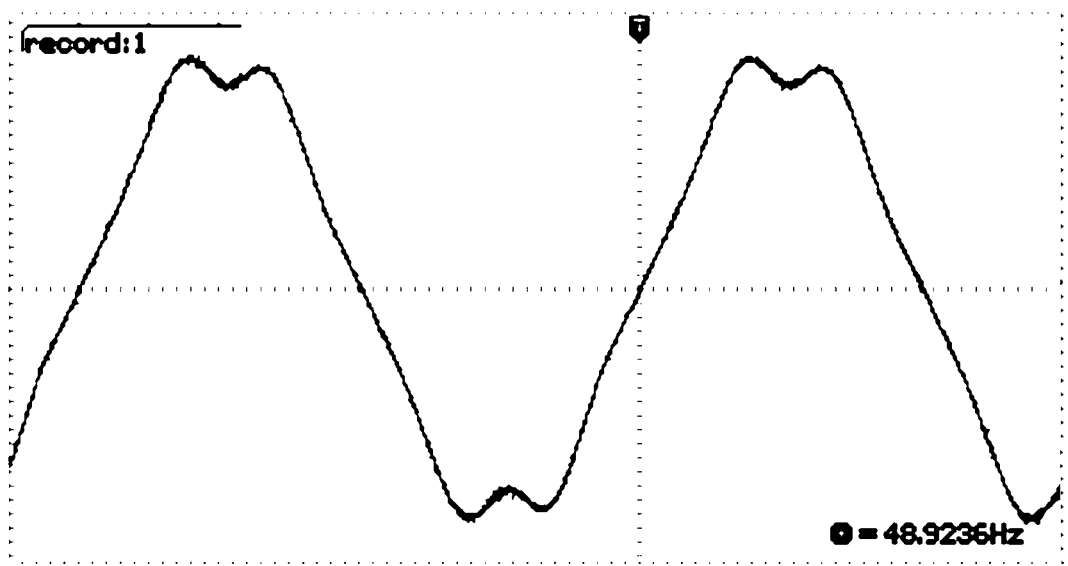
FIG. 31 shows a voltage waveform with 14 Vrms of 5th harmonic and 6 Vrms of 7th harmonic; and, FIG. 32 shows a terminal voltage at current mode.

FIG. 31 shows the output of the voltage source electrical power regulating apparatus with 14 Vrms of 5th harmonic and 6 Vrms of 7th harmonic. The flat waveform is typical a 50 Hz waveform with multiple odd harmonics.

Figure 32:
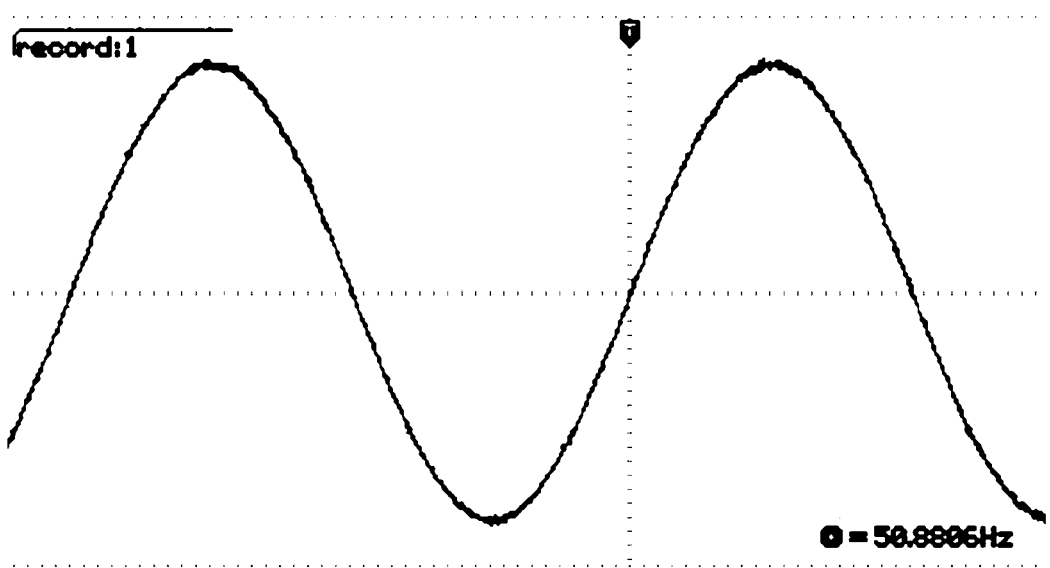

FIG. 32 shows the results of voltage waveform when the current mode electrical power regulating apparatus was turned on to cancel the 5th and 7th harmonics shown in FIG. 31. The 5th and the 7th harmonics have been shunted to the neutral and only the 50 Hz 230 Vrms remains.

When placed on an LV network an electrical power regulating apparatus can sink any odd or even harmonics up to 24 kHz. It will remove all harmonics for the whole LV feeder as it will be the lowest impedance compared to the distribution transformer impedance.

In summary, it should be noted that

The electrical power regulating apparatus can sink all harmonics up to 24 kHz from a whole LV feeder or customer installation.

Distribution Transformer Tap-Changing Strategies

In a one-way network the fixed distribution transformer tap-changer settings are designed to compensate for voltage drop at peak demand. Generally, distribution transformer tap-changer settings would lower the distribution transformer LV terminal voltage in the first third of the feeder, the middle third would be on nominal tap and the last third would raise the LV terminal voltage. Even with a one-way network, this typical tap setting design is not ideal. When 11 kV feeders are re-configured the tap settings invariably need to be changed at considerable expense.

With DER generation on the LV network the typical distribution transformer tap settings exacerbate the voltage regulation issue but at the same time are required to support the voltage in the non-generation hours. So using the fixed distribution transformer tap-changer are no longer a viable engineering solution for future DER networks.

An alternative would be to have a distribution transformer with an on-load tap-changer. This solution has been proposed but found to be not economical. The electrical power regulating apparatus VAR management system is the most economic and practical solution with current technologies. If an existing one-way network was to convert to an electrical power regulating apparatus two-way network the ideal distribution transformer tap setting would be neutral tap. Although not demonstrated in this white paper, existing one-way network distribution transformer tap settings can be accommodated by varying the size of the electrical power regulating apparatus VARs.

A new two-way power network design approach would not require distribution transformers with tap-changing equipment.

The above demonstrates how to convert a traditional one-way distribution grid into a two-way distribution grid to allow Distributed Energy Resources (DER) generation to be shared amongst all connected customers. It outlines the electrical power regulating apparatus technology which enables the hosting capacity of DER to be increased to equal the thermal rating of the existing grid equipment. There are several technical issues which limit the installation of DER on the LV distribution network. They are:

Voltage regulation
Voltage fluctuations
Harmonic generation

Voltage Regulation

Voltage regulation is perhaps the greatest issue restricting the DER hosting capacity today. Network capacity is generally limited by voltage regulation issues more often than by thermal capacity limitations. In a network that was designed for a one-way power flow, DER generation will increase the network voltage at the connection point and ultimately increase the steady state voltage beyond the upper statutory voltage limits. The typical DNSP response to voltage regulation is to restrict export from DER into the network or require costly equipment upgrades to the distribution network. The limits on DER export restrict the development of a renewable energy market and limit the reduction of carbon emissions.

Voltage Fluctuations

The intermittency of renewable energy can cause voltage fluctuations on the network and affect all customers on the LV feeder. As cloud cover travels over a solar installation the output transitions from a high level before the cloud causes any shading, to a low, or close to zero level, when the solar cells are in complete shade, and then back to a high level once the cloud passes. These changes in solar output have a direct impact on the network voltage, resulting in a dip in voltage for the duration of the shading. If significant enough, this can result in variations in lighting levels and may result in irritation to people in homes, warehouses and offices.

Harmonics

Nearly all DER generators use a power electronic inverter which can generate harmonics if not properly designed. Although voltage fluctuations and harmonics are secondary to the voltage regulation issue, they are technical issues that need to be addressed before DER can become mainstream technology.

For the last 80 years, all distribution grids were design as one-way networks with generation at one end and loads at the other end. Transformer tap-changers in zone substations and transmission substations have been used to maintain the network voltage to within statutory limits. With the installation of DER, generation now occurs at both ends of the grid which is not compatible with a traditional one-way grid. The distribution network of the future has to be a 'true' two-way grid to accommodate DER generation.

This white paper shows how the electrical power regulating technology can turn a traditional one-way grid into a true two-way grid for all generation and load conditions. DER generation can be exported back through the distribution transformer and along the 11 kV feeder to supply other 11 kV feeders or back through the zone substation transformers and into the sub-transmission network. The electrical power regulating technology uses VAR management to regulate the voltage on the 11 kV and LV networks to increase hosting capacity to 100% export for other customers and 100% local customer use (200%). The electrical power regulating system can regulate the voltage for all generation and load conditions on a LV or 11 kV feeder/circuit from one position.

The electrical power regulating system can also reduce voltage fluctuations and harmonics which solves all of the issues for increasing DER hosting capacity on distribution networks.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A two-way electrical power distribution network including:
   a) an electrical power distribution bus connected to a high voltage transformer;
   b) a plurality of medium voltage electrical power feed lines connected to the electrical power distribution bus;
   c) a plurality of low voltage distribution lines connected to each feed line, wherein the low voltage distribution lines are connected to at least one of:
      i) one or more loads; and
      ii) one or more sources; and,
   d) at least one medium voltage electrical power regulating apparatus connected to at least one of the plurality of the feed lines, wherein the medium voltage electrical power regulating apparatus includes:
      i) a DC contactor having DC terminals configured to be connected to a DC device;
      ii) a transmission network connector configured to be connected to the medium voltage electrical power feed line and including:
         (1) at least one live terminal configured to be connected to at least one live connection of the medium voltage electrical power feed line; and,
         (2) a neutral terminal configured to be connected to at least one of a neutral or earth of the medium voltage electrical power feed line;
      iii) a plurality of switches connected to the DC contactor; and,
      iv) one or more electronic controlling devices coupled to the switches and being configured to control the switches to selectively connect the DC terminals and the at least one live terminal and the neutral terminal to thereby independently regulate electrical power on each of the at least one live connection and the neutral connection of the medium voltage electrical power feed line to thereby maintain a voltage in the electrical power distribution bus during different load and source conditions.

2. The two-way electrical power distribution network according to claim 1, wherein the one or more electronic controlling devices are configured to:
   (1) receive a voltage reading of the at least one live connection;
   (2) calculate an average of the voltage reading for the at least one live connection;
   (3) if the average is larger than a predetermined upper value, control the switches to selectively connect the at least one live connection to the DC device and thereby reduce voltage on the at least one live connection; and,
   (4) if the average is less than a predetermined lower value, control the switches to selectively connect the at least one live connection to the DC device and thereby increase voltage supplied on the live connection.

3. The two-way electrical power distribution network according to claim 1, wherein at least one of:
   a) a voltage on the electrical power distribution bus and the medium voltage electrical power feed lines is at least one of:
      i) about 5 kV;
      ii) about 7.2 kV;
      iii) about 10 kV;
      iv) about 11 kV;
      v) about 12.47 kV;
      vi) about 15 kV;
      vii) about 20 kV;
      viii) about 22 kV;
      ix) about 25 kV;
      x) about 33 kV;
      xi) about 34.5 kV; and,
      xii) about 35 kV;
   b) a voltage on the low voltage distribution line is at least one of:
      i) about 220V to 240V;
      ii) about 100V to 120V;
      iii) about 400V; and,
      iv) about 240V;
   c) the low voltage distribution line is connected to a low-voltage electrical power regulating apparatus;
   d) the predetermined upper value is 5% above a nominal value;
   e) the predetermined lower value is 5% below a nominal value;
   f) the medium voltage electrical power feed line is a multi-phase transmission network and the one or more electronic controlling devices are configured to alter the voltage of multiple live connections independently of each other;
   g) the medium voltage electrical power regulating apparatus is configured to be connected to the medium voltage electrical power feed line at an optimal position;
   h) an accumulated voltage differential from a high voltage connection to the optimal position is about 40% to 60% of a total accumulated voltage differential along the medium voltage electrical power feed line;
   i) an accumulated voltage differential from a high voltage connection to the optimal position is about 50% of a total accumulated voltage differential along the medium voltage electrical power feed line;
   j) the medium voltage electrical power regulating apparatus further includes one or more filters for suppressing noise on the at least one connection;
   k) the medium voltage electrical power regulating apparatus further includes a snubber circuit connected between the one or more filters and the DC contactor for suppressing noise;
   l) the neutral connection is decoupled from an earth;
   m) the switches include a plurality of silicon carbide MOSFET switches;
   n) the switches include a plurality of symmetrical half-bridge topology arms connecting to the at least one live connection and the neutral connection; and,
   o) the one or more filters include at least one of:
      i) an electromagnetic interference (EMI) choke;
      ii) a differential-mode choke connected to the at least one live connection and the neutral connection for filtering noise; and,
      iii) a common-mode choke connected to the switches for suppressing interference.

4. The two-way electrical power distribution network according to claim 1, wherein the one or more electronic controlling devices are configured to at least one of:
  a) increase the voltage by at least one of:
    i) sourcing a reactive power;
    ii) increasing a reactive power;
    iii) absorbing a real power; and,
    iv) decreasing a real power;
  b) decrease the voltage by at least one of:
    i) sourcing a real power;
    ii) increasing a real power;
    iii) absorbing a reactive power; and,
    iv) decreasing a reactive power;
  c) receive the voltage reading at least one of:
    i) at least every microsecond;
    ii) every 15-25 milliseconds;
    iii) every 35-65 milliseconds;
    iv) every 100-200 milliseconds;
    v) every 500-700 milliseconds;
    vi) at least every second;
    vii) between every microsecond and every second; and,
    viii) every 2-5 seconds;
  d) calculate a moving average at least one of:
    i) within a window of 2 minutes;
    ii) within a window of 6 minutes;
    iii) within a window of 10 minutes;
    iv) within a window of 15 minutes;
    v) within a window of 20 minutes; and,
    vi) within a window of a microsecond, with subsequent stability averaging occurring at least every 10 minutes;
  e) control the switches to operate in a current mode or a voltage mode; and,
  f) control the switches to change between operating in a current mode and a voltage mode.

5. The two-way electrical power distribution network according to claim 4, wherein the total accumulated differential voltage is an average of at least one of:
  a) a total accumulated voltage differential at maximum feed-in;
  b) a total accumulated voltage differential at minimum feed-in;
  c) a total accumulated voltage differential at minimum load;
  d) a total accumulated voltage differential at maximum load;
  e) a total accumulated voltage differential at maximum feed-in and minimum load; and,
  f) a total accumulated voltage differential at minimum feed-in and maximum load.

6. The two-way electrical power distribution network according to claim 5, wherein at least one of:
  a) when in the current mode, the one or more electronics controlling devices are configured to control the switches so that each of the least one live terminals or the DC terminals have a predetermined current waveform; and,
  b) when in the voltage mode, the one or more electronics controlling devices are configured to control the switches so that each of the least one live terminals or the DC terminals have a predetermined voltage waveform.

7. The two-way electrical power distribution network according to claim 1, wherein at least one of:
  a) the switches have a plurality of capacitors configured smooth to fluctuations in DC power; and,
  b) the plurality of capacitors are connected to a failsafe mechanism to discharge the capacitors in the event of a fault.

8. The two-way electrical power distribution network according to claim 7, wherein the capacitors are connected through an interleaving structure with a multi-layer printed circuit board (PCB).

9. The two-way electrical power distribution network according to claim 8, wherein at least one of:
  a) the interleaving structure includes one or more through-holes connecting a positive contact of one of the capacitors to one or more positive layers of the PCB and a negative contact of one of the capacitor to one or more negative layers of the PCB;
  b) the multi-layer PCB defines alternating polarity layers to cancel generated magnetic fields;
  c) the multi-layer PCB includes eight electrically conductive layers;
  d) the multi-layer PCB has at least two outer electrically conductive negative layers;
  e) the failsafe mechanism includes at least one of:
    i) a hardware failsafe mechanism being configured to disconnect the DC contactor or the transmission network connector in the event of a fault; and
    ii) a software failsafe mechanism, in the event of a fault, being configured to at least one of:
      (1) rapidly connect and disconnect the capacitors to earth; and
      (2) turn off the DC contactor or the transmission network connector.

10. The two-way electrical power distribution network according to claim 1, wherein at least one of:
  a) the one or more electronic controlling devices include a master controller and a slave controller;
  b) the DC device includes at least one of:
    i) a battery;
    ii) a solar power generator;
    iii) a hydrokinetic power generator; and,
    iv) a wind power generator;
  c) the transmission network connector includes at least one of:
    i) an AC contactor;
    ii) an AC relay; and,
    iii) an AC circuit breaker for each of the at least one live terminal;
  d) the medium voltage electrical power regulating apparatus further includes a load connector configured to be connected to a load and including:
    i) at least one load terminal configured to be connected to the load; and,
    ii) a load neutral terminal configured to be connected to at least one of a neutral or earth of the load,
  e) the load connector includes a DC circuit breaker for each of the at least one load terminal; and,
  f) the medium voltage electrical power regulating apparatus further includes a communication interface connected to the one or more electronic controlling devices for communicating with an external device the DC device includes at least one of:
    i) a battery;
    ii) a solar power generator;
    iii) a hydrokinetic power generator; and,
    iv) a wind power generator;

g) the transmission network connector includes at least one of:
   i) an AC contactor;
   ii) an AC relay; and,
   iii) an AC circuit breaker for each of the at least one live terminal;
h) the medium voltage electrical power regulating apparatus further includes a load connector configured to be connected to a load and including:
   i) at least one load terminal configured to be connected to the load; and,
   ii) a load neutral terminal configured to be connected to at least one of a neutral or earth of the load,
i) the load connector includes a DC circuit breaker for each of the at least one load terminal; and,
j) the medium voltage electrical power regulating apparatus further includes a communication interface connected to the one or more electronic controlling devices for communicating with an external device.

11. A method of providing a two-way electrical power distribution network, the method including connecting an electrical power regulating apparatus to a medium electrical power feed line being connected to an electrical power distribution bus, the electrical power regulating apparatus including:
   i) a DC contactor having DC terminals configured to be connected to a DC device;
   ii) a transmission network connector configured to be connected to the medium voltage electrical power feed line and including:
      (1) at least one live terminal configured to be connected to at least one live connection of the medium voltage electrical power feed line; and,
      (2) a neutral terminal configured to be connected to at least one of a neutral or earth of the medium voltage electrical power feed line;
   iii) a plurality of switches connected to the DC contactor; and,
   iv) one or more electronic controlling devices coupled to the switches and being configured to control the switches to selectively connect the DC terminals and the at least one live terminal and the neutral terminal to thereby independently regulate electrical power on each of the at least one live connection and the neutral connection of the medium voltage electrical power feed line to thereby maintain a voltage in the electrical power distribution bus during different load and source conditions.

12. The method according to claim 11, wherein the one or more electronic controlling devices are at least one of:
   a) configured to:
      i) receive a voltage reading of the at least one live connection;
      ii) calculate an average of the voltage reading for the at least one live connection;
      iii) if the average is larger than a predetermined upper value, control the switches to selectively connect the at least one live connection to the DC device and thereby reduce voltage on the at least one live connection; and,
      iv) if the average is less than a predetermined lower value, control the switches to selectively connect the at least one live connection to the DC device and thereby increase voltage supplied on the live connection; and,
   b) configured to receive the voltage reading at least one of:
      i) at least every microsecond;
      ii) every 15-25 milliseconds;
      iii) every 35-65 milliseconds;
      iv) every 100-200 milliseconds;
      v) every 500-700 milliseconds;
      vi) at least every second;
      vii) between every microsecond and every second; and,
      viii) every 2-5 seconds.

13. The method according to claim 11, wherein at least one of:
   a) a voltage on the electrical power distribution bus and the medium voltage electrical power feed lines is at least one of:
      i) about 5 kV;
      ii) about 7.2 kV;
      iii) about 10 kV;
      iv) about 11 kV;
      v) about 12.47 kV;
      vi) about 15 kV;
      vii) about 20 kV;
      viii) about 22 kV;
      ix) about 25 kV;
      x) about 33 kV;
      xi) about 34.5 kV; and,
      xii) about 35 kV;
   b) the predetermined upper value is 5% above a nominal value;
   c) the predetermined lower value is 5% below a nominal value;
   d) the electricity transmission network is a multi-phase transmission network and the method includes altering the voltage of multiple live connections independently of each other;
   e) the medium voltage electrical power regulating apparatus is configured to be connected to the medium voltage electrical power feed line at an optimal position;
   f) the method of increasing the voltage includes at least one of:
      i) sourcing a reactive power;
      ii) increasing a reactive power;
      iii) absorbing a real power; and,
      iv) decreasing a real power;
   g) the method of decreasing the voltage includes at least one of:
      i) sourcing a real power;
      ii) increasing a real power;
      iii) absorbing a reactive power; and,
      iv) decreasing a reactive power;
   h) the method of calculating the average includes, in the one or more electronic controlling devices are configured to calculate a moving average at least one of:
      i) within a window of 2 minutes;
      ii) within a window of 6 minutes;
      iii) within a window of 10 minutes;
      iv) within a window of 15 minutes;
      v) within a window of 20 minutes; and,
      vi) within a window of a microsecond, with subsequent stability averaging occurring at least every 10 minutes.

14. The method according to claim 11, wherein an accumulated voltage differential from a high voltage connection to the optimal position is about 40% to 60% of a total accumulated voltage differential along the medium voltage electrical power feed line.

15. The method according to claim 11, wherein an accumulated voltage differential from a high voltage connection to the optimal position is about 50% of a total accumulated voltage differential along the medium voltage electrical power feed line.

16. The method according to claim 14, wherein the total accumulated differential voltage is an average of at least one of:
   a) a total accumulated voltage differential at maximum feed-in;
   b) a total accumulated voltage differential at minimum feed-in;
   c) a total accumulated voltage differential at minimum load;
   d) a total accumulated voltage differential at maximum load;
   e) a total accumulated voltage differential at maximum feed-in and minimum load; and,
   f) a total accumulated voltage differential at minimum feed-in and maximum load.

17. The method according to claim 11, wherein the method includes, in the one or more electronics controlling devices, controlling the switches to operate in a current mode or a voltage mode.

18. The method according to claim 11, wherein the method includes, in the one or more electronics controlling devices, controlling the switches to change between operating in a current mode and a voltage mode.

19. The method according to claim 17, wherein, when in the current mode, the method includes, in the one or more electronics controlling devices, controlling the switches so that each of the least one live terminals or the DC terminals have a predetermined current waveform.

20. The method according to claim 17, wherein, when in the voltage mode, the method includes, in the one or more electronics controlling devices, controlling the switches so that each of the least one live terminals or the DC terminals have a predetermined voltage waveform.

\* \* \* \* \*